(12) United States Patent
Friedberg

(10) Patent No.: US 6,662,184 B1
(45) Date of Patent: Dec. 9, 2003

(54) LOCK-FREE WILD CARD SEARCH DATA STRUCTURE AND METHOD

(75) Inventor: Stuart A. Friedberg, Aloha, OR (US)

(73) Assignee: International Business Machines Corporation, Armonk, NY (US)

(*) Notice: Subject to any disclaimer, the term of this patent is extended or adjusted under 35 U.S.C. 154(b) by 430 days.

(21) Appl. No.: 09/668,776

(22) Filed: Sep. 22, 2000

Related U.S. Application Data

(60) Provisional application No. 60/156,017, filed on Sep. 23, 1999.

(51) Int. Cl.[7] .............................................. G06F 17/30
(52) U.S. Cl. ................................... 707/100; 707/103 R
(58) Field of Search ............................. 707/100, 103 R, 707/103 Y, 103, 103 Z

(56) References Cited

U.S. PATENT DOCUMENTS

| | | | | |
|---|---|---|---|---|
| 5,220,325 A | * | 6/1993 | Ackland et al. ............... 341/67 |
| 5,404,513 A | * | 4/1995 | Powers et al. ............... 707/102 |
| 5,546,390 A | * | 8/1996 | Stone ......................... 370/408 |
| 5,832,224 A | * | 11/1998 | Fehskens et al. ........... 709/223 |
| 5,857,169 A | * | 1/1999 | Seide ......................... 704/256 |
| 5,857,196 A | * | 1/1999 | Angle et al. ................. 707/102 |
| 6,041,053 A | * | 3/2000 | Douceur et al. ............ 370/389 |
| 6,092,065 A | * | 7/2000 | Floratos et al. ................ 707/6 |
| 6,230,269 B1 | * | 5/2001 | Spies et al. .................. 713/182 |
| 6,247,014 B1 | * | 6/2001 | Ladwig et al. .............. 707/100 |
| 6,298,340 B1 | * | 10/2001 | Calvignac et al. ............. 707/3 |
| 6,335,935 B2 | * | 1/2002 | Kadambi et al. ........... 370/396 |
| 6,359,886 B1 | * | 3/2002 | Ujihara et al. .............. 370/392 |
| 6,401,088 B1 | * | 6/2002 | Jagadish et al. ................ 707/6 |
| 6,411,957 B1 | * | 6/2002 | Dijkstra ....................... 707/100 |
| 6,434,620 B1 | * | 8/2002 | Boucher et al. ............ 709/230 |

OTHER PUBLICATIONS

G.H. Gonnet et al., Section 3.4.4 of Handbook of Algorithms and Data Structure, 2nd Edition (Addison–Wesley 1991), pp. 133–143.

W. Stevens et al., vol. 2, Chapter 18 of TCP/IP Illustrated (Addison–Wesley 1995), pp. 559–600.

K. Sklower, "A Tree–Based Packet Routing Table for Berkeley UNIX," pp. 1–14.

B. Lampson et al., "IP Lookups Using Multiway and Multicolumn Search," vol. 7, No. 3 of IEEE/ACM Transactions on Networking (Jun. 1999), pp. 324–334.

D. Knuth, vol. 3, Section 6.3 of The Art of Computer Programming (Addison–Wesley 1973), pp. 451–505.

* cited by examiner

*Primary Examiner*—Safet Metjahic
*Assistant Examiner*—Hanh Thai
(74) *Attorney, Agent, or Firm*—Rochelle Lieberman

(57) ABSTRACT

A data structure adapted for storage in a computer memory for receiving executable instructions. The data structure is a modified binary tree in the form of a quaternary tree guaranteeing at least two of four way branching at each internal node. In addition to the binary nodes, the tree may comprise a wildcard node and/or an epsilon node. The wildcard nodes point at keys of arbitrary descendants, and epsilon nodes reference an end of a data string at a specific length. In addition to the data structure, a method of traversing the data structure is disclosed for searching and retrieving data stored thereon. A method of modifying the data stored on the data structure is also disclosed. The searching algorithms include flags for controlling the tightness of a search and filters for searching prefixes and suffixes of a string. In conjunction with traversing the tree, a method of modifying the data structure is disclosed. The modification process includes a insertion process for adding data to the data structure, and a deletion process for removing data from the data structure. Both the insertion and deletion processes maintain and guarantee the two of four way branching of the data structure. Accordingly, the novel data structure is designed to permit users to access the data structure at the same time as a modification is occurring.

31 Claims, 93 Drawing Sheets

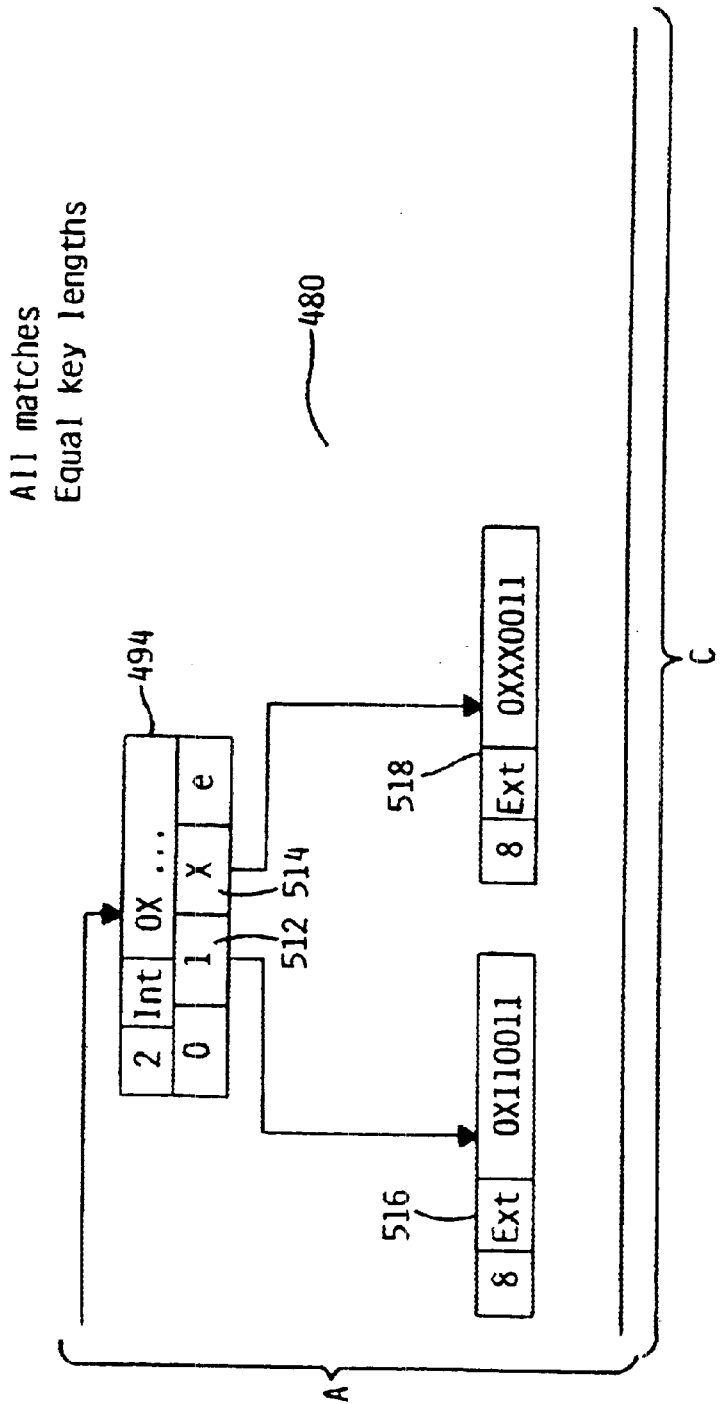

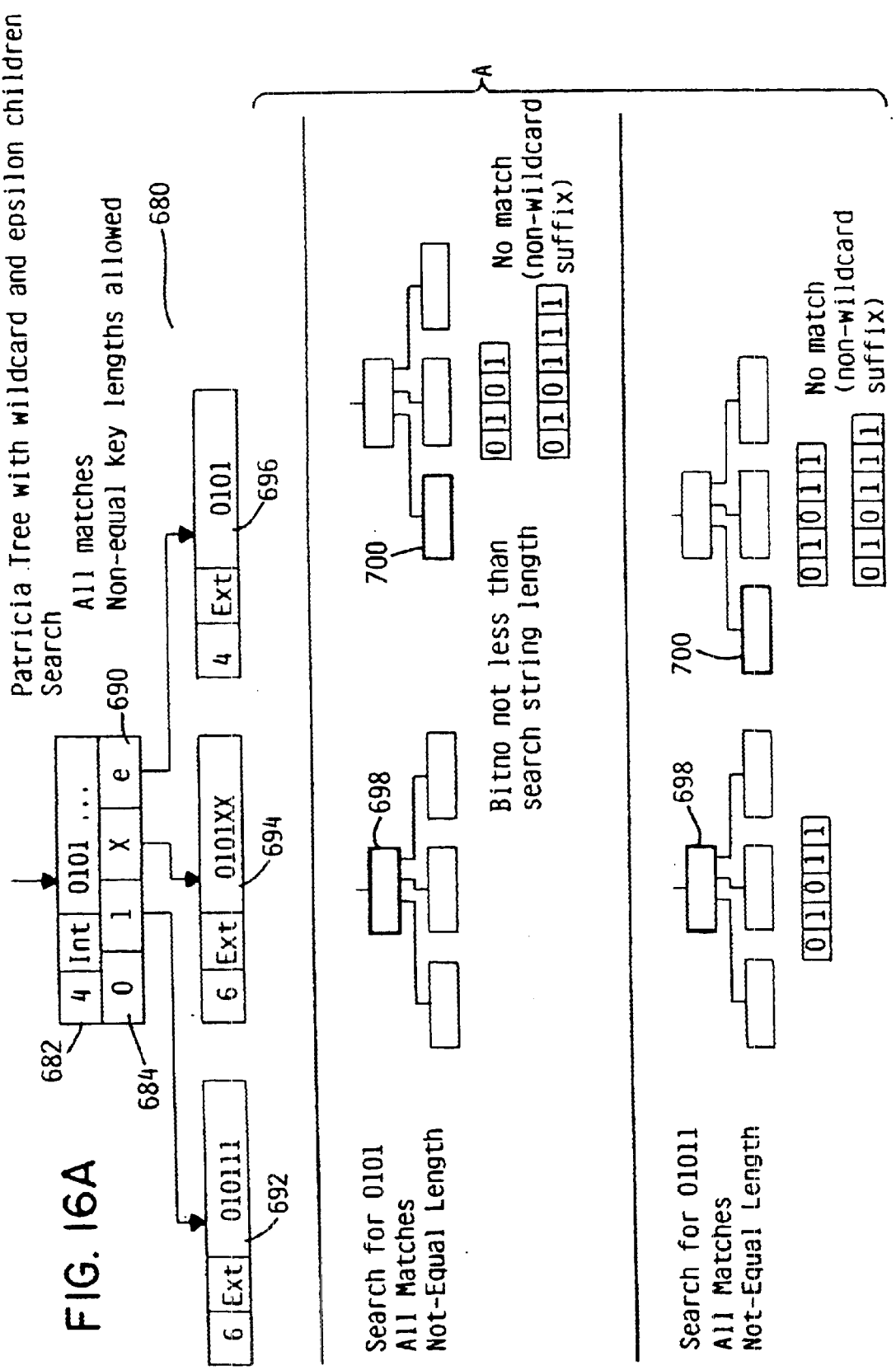

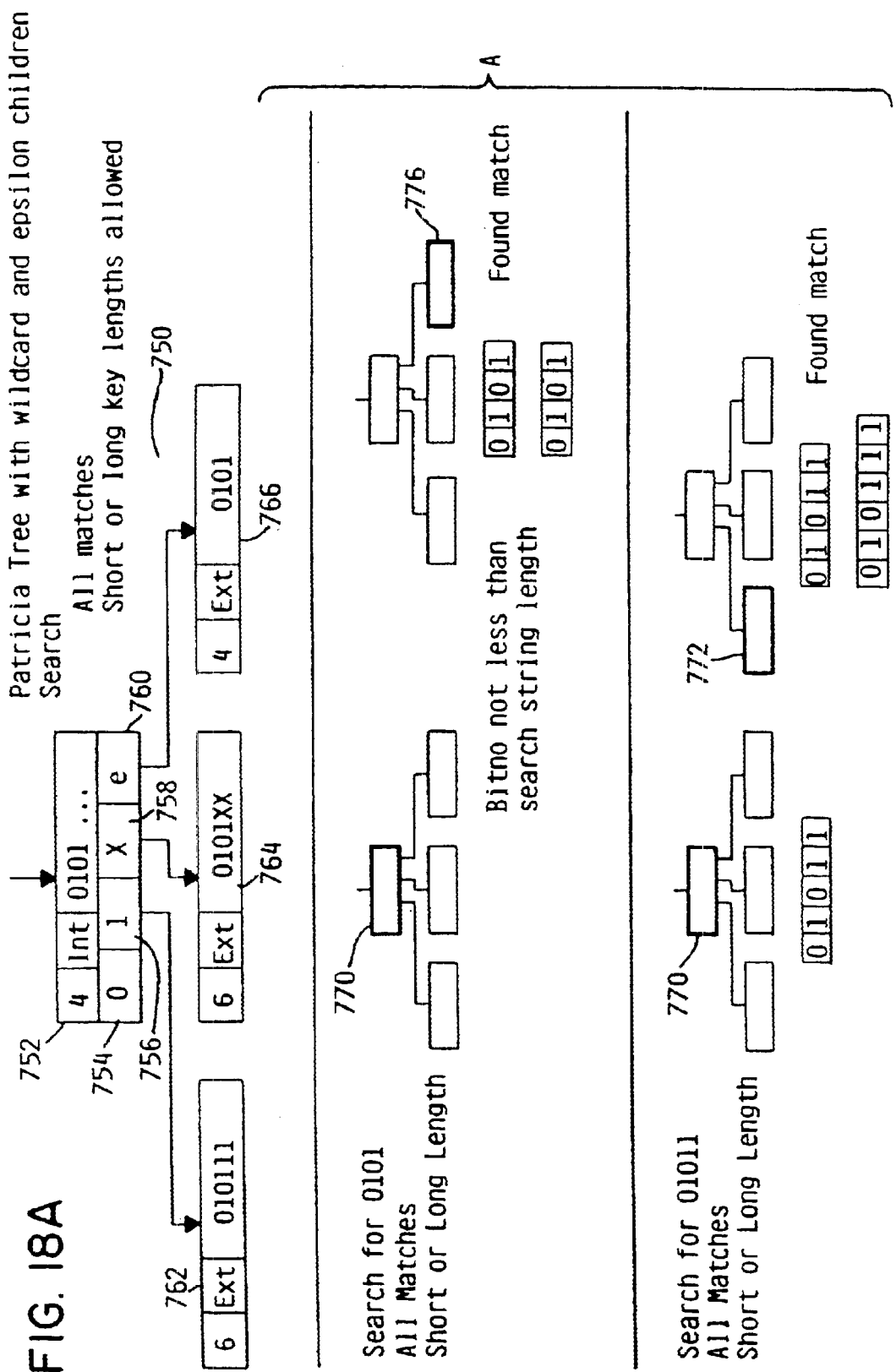

Patricia Tree with wildcard and epsilon children
Deletion

Node is not root of tree
    Node is not a sibling of a previous node
    Node does not have a sibling
    Parent has a single remaining child
    Parent is root of the tree Make cousin the root of the tree Patricia Tree with wildcard and epsilon children
Deletion
    Node is not root of tree
    Node is not a sibling of a previous node
    Node does not have a sibling
    Parent has a single remaining child
    Parent is not root of the tree Grandparent bitno: 4    Link cousin to grand-parent as "B" child B is X   | 0 | 1 | 0 | 1 | X | X | 0 | 1 |

Patricia Tree with wildcard and epsilon children
Release a persistent reference to an external node Patricia Tree with wildcard and epsilon children
Validate a persistent reference to an external node

LOCK-FREE WILD CARD SEARCH DATA STRUCTURE AND METHOD

CROSS REFERENCE TO RELATED APPLICATION(S)

This is a non-provisional utility patent application claiming benefit of the filing date of U.S. provisional application Ser. No. 60/156,017 filed Sep. 23, 1999, and titled LOCK-FREE WILD CARD SEARCH DATA STRUCTURE AND METHOD.

BACKGROUND OF THE INVENTION

1. Technical Field

This invention relates to a data structure apparatus in the form of a binary digital tree and method of searching and modifying the data structure. More particularly, this invention relates to building a routing table that allows both specific and general entries, and incorporates a data structure in the form of a modified Practical Algorithm to Retrieve Information Coded in Alphanumeric Tree ("Patricia Tree") for building, searching and modifying the routing table with wildcard support. The invention further incorporates procedures for searching and modifying the wildcard routing table, wherein the procedures include filters and flags for focusing the scope of the search, and insert and delete procedures for modifying the table without affecting the integrity of any ongoing searches.

2. Description of the Prior Art

In recent years the world has come into the electronic era. A global network of interconnected computers now allows people from all over the world to communicate via electronic mail messages and to establish locations on the network for dissemination of information. As such, the ability to send and receive messages in a reasonable amount of time is becoming more cumbersome as the network continues to experience rapid growth.

Sending of electronic mail and exploring the global electronic network require proper routing of network messages to their intended destinations. Almost all transactions conducted on the global electronic network involve an exchange of messages between one computer and another. Every computer connected into the global computer network has at least one network address, and similar to a postal address for standard mail delivery, the network address is necessary to accommodate correct delivery of electronic messages through the network. When an application on an individual computer sends a network message, there are three possible scenarios that may occur: the message could be addressed to another application that runs on the same computer, the message could be addressed to a different computer that can be accessed directly, or the message could be addressed to a distant computer that requires the assistance of the global electronic network to be reached. In a conventional application, the first scenario is equivalent to handing a letter to a person who lives in the same house, the second scenario is equivalent to carrying a letter to a person who lives in the same building or neighborhood, and the third scenario is equivalent to sending a letter to the post office for delivery. Accordingly, for each of the scenarios the network must decide which case is applicable to the message and take the appropriate action.

Each computer recognizes its own address(es) and delivers internal messages immediately. A standard desktop computer has one network interface for direct connection to a local network. The standard network interface for a personal computer is in the form of an Ethernet card or a dial-up modem. In addition, a desktop computer may be a part of a local area network ("LAN") wherein messages addressed to any of the other computers on the LAN remain within the LAN. These messages are recognized as being targeted at addresses that are part of the LAN and are delivered within the LAN. However, for messages that are not being transmitted to addresses within a LAN, the computer requires locating an appropriate gateway for message delivery, wherein the gateway is a computer within the network that accepts messages for delivery to more distant locations. Use of the proper gateway for sending messages to distant computers is paramount for timely delivery of messages. The routing of messages involves effective selection of an outbound network interface. Frequently, the network traffic within the global electronic network favors the selection of gateways for routing of messages to the proper end destination. This may translate into the use of multiple gateways which act as delivery conduits which the messages pass through prior to reaching the intended destination. Accordingly, with the abundance of network addresses a simple table with entry of every address within the global electronic network is neither an effective nor efficient tool for managing delivery of messages over the global electronic network.

Conventional tables for storing data, such as words and numbers, contain only exact entries. Some tables only support searches for exact and complete values, while other tables support searches for inexact values as well. An inexact value may come in the form of a wildcard which can stand for any symbol or string of symbols. Routing tables generally contain inexact entries and support only searching with an exact target, wherein the search always begins with an exact and complete address. Accordingly, in using wildcard values in a routing table it is important to develop and/or utilize a data structure for efficiently building the tables.

Data structures in the form of trees are known as efficient tools for building routing tables and supporting searches beginning with a known prefix. A tree is a data structure accessed first at the root node. Each subsequent node can be either an internal node with further subsequent nodes or an external node with no further nodes existing under the node. An internal node refers to or has links to one or more descending or child nodes and is referred to as the parent of its child nodes, and external nodes are commonly referred to as leaves. The root node is usually depicted at the top of the tree structure and the external nodes are depicted at the bottom.

Tree structures are often defined by the characteristics of the tree. For example, a Binary Tree is a tree with at most two children for each node. A Digital Tree is a rooted tree where the leaves represent strings of digital symbols. The Patricia Tree is a Digital Tree with suppression of one way branching that prohibits keys which are strict prefixes of other branches. In general, a Patricia Tree is always a digital tree, but only a binary tree when the symbol alphabet is binary. The internal nodes represent a common prefix to a set of strings, and each child of that node corresponds to a choice of the next symbol to follow the common prefix. A Patricia Tree can take the form of both a Binary Tree and a Digital Tree where all internal nodes have at least two children.

As mentioned above, a Patricia Tries is an acronym for "Practical Algorithm to Retrieve Information Coded in Alphanumeric" and is suitable for dealing with extremely long variable length keys such as titles or phrases stored within a large bulk file. The Patricia Tree adheres to two primary concepts. The first of these concepts is the concept of semi-infinite strings. These are strings with a particular starting position in a document which are then considered to continue indefinitely in the forward direction of the string. The second concept is that of being based on symbol-by-symbol comparison of data. In an algorithm developed for traversing such a tree, the decision on traversal direction is taken based on the value of the alphabetic symbol currently in consideration.

Within the Patricia Tree structure, internal nodes where there exists only one choice of the next symbol are omitted from the data structure. Patricia Trees keep track of the missing nodes by recording the distance from the beginning of the string at every node of the tree. The basic idea behind a Patricia Tree is to build a Digital Tree that avoids one-way branching by including in each node the number of symbols to skip over before making the next test. A Patricia Tree does not search for strict equality between key and argument, rather it will determine whether or not there exists a key beginning with the argument and proceed from there. More specifically, the Patricia Tree considers a single symbol at each internal node, and makes a comparison for string equality only at an external node. Accordingly, since traditional routing of electronic messages on a global computer network is based on sets of addresses with common prefixes, Patricia Trees are a well known and widely used method for building network routing tables.

All Digital Trees, including Patricia Trees, are effective at finding prefixes of strings. However, such trees require special treatment to record a string which is also a prefix of other strings. In a Binary Tree there are only two symbols, 0 and 1, and they both appear at any point in a binary string. There are no symbols to reserve for an end marker to a string, and enlarging the alphabet to add one more symbol doubles the size of the strings in computer applications since two bits must be used for every symbol instead of one. There are other encoding techniques that are more efficient in space, but they radically transform the original binary data. Accordingly, it is desirable to use an internal symbol to identify the end of a data string.

There have been recent modifications to the applications of search trees for addressing the issue of Internet Protocol ("IP") address lookup. The Lampson et al. document, "IP Lookups Using Multiway and Multicolumn Search," shows how a binary search can be adapted for solving the best matching prefix problem. The basic binary search technique requires encoding a prefix as the start and end of a range, and precomputing the best-matching prefix associated with a range. The search includes a binary search on the number of possible prefixes as opposed to the number of prefix lengths. The data structure is encoded using both the start and end range of the data strings supported in the table, and effectively partitioning the single binary search table into multiple binary search tables for each value of the first x bits. Accordingly, Lampson et al. restructures the conventional binary tree data structure to allow multi way searching instead of binary searching The Sklower document, "A Tree-Based Packet Routing Table for Berkeley Unix," discloses assembling a collection of prototype addresses into a variant of a Patricia Tree, which is a binary radix tree with one way branching removed. The tree has internal nodes and external nodes, referred to as leaves, wherein the leaves represent address classes and contain information common to all possible destinations in each class. The leaves contain a prototype address and at least one mask, i.e. a pattern indicating which of the bits of the prototype address are relevant and which bits are wildcarded. The searching technique disclosed is a variant of a Patricia Tree with backtracking for general masks, when appropriate. However, Patricia Trees may only be efficient for supporting tables with wildcards wherein the wildcarded bits are isolated at the end of the prototype address. Accordingly, what is desirable is a modification to the Patricia Tree to efficiently support wildcard asks within the prototype address.

Doeringer et al., Waldvogel et al, Degermark et al., Nilsson et al., and Srinivasan et al. each disclose techniques for building and searching the routing table. Each of the techniques focus on the problem of Internet routing and are therefore limited to searching for address ranges with a common prefix. Readings of the routing tables are efficient, however updating the tables generally require building an entire new table and then replacing the existing table with the new table. Accordingly, since large server computers with rapidly changing sets of connected clients must update routing tables frequently, the data structures disclosed by Doeringer et al., Waldvogel et al., Degermark et al., Nilsson et al., and Srinivasan et al. are not appropriate for these large computers.

Accordingly, what is desirable is a data structure that allows both specific and general data entries and selects the most specific data for matching purposes. Such a data structure must be efficiently consulted for every network message, while allowing the contents of the data structure to change at a slower pace. The data structure must be especially efficient on large, shared-memory multiprocessor computers and should not be too strictly specialized for network routing problems so that it can be applied to other searching and matching techniques. In addition, the data structure must support concurrent reading among multiprocessors as well as support updating of the data structure while reading of the data structure is taking place. Accordingly, an efficient data structure is desirable for use on multiprocessor computers in conjunction with a read-copy update procedure which supports reading in conjunction with table updating without delay or interference from changes to the structure contents.

SUMMARY OF THE INVENTION

It is therefore an object of the invention to provide a digital tree in the form of a modified Patricia Tree for combining a prototype address and a mask into a ternary data string. It is a further object of the invention to provide a method for searching the modified Patricia Tree of the invention. It is a further object of the invention to provide a method for modifying the modified Patricia Tree of the invention. It is even a further object of the invention to provide a method for removing nodes from the data structure. Other objects of the invention include providing a computer system and article of manufacture for use with the search tree of the invention.

The invention resides in a search tree data structure which can be used to classify data in a computer system. The search tree has multiple internal nodes, and each internal node includes at least four pointer fields. At least two of the pointer fields correspond to specific alphabetic values, which are preferably (but not necessarily) bit values. A third, "wildcard" pointer field corresponds to all of the alphabetic values. A fourth, "epsilon" pointer field corresponds to the data string ending at a specific length. Each internal node includes pointers in at least two of the four pointer fields, which guarantees that the search tree provides at least two way branching at each internal node.

The invention also resides in a method for classifying data using the data structure summarized above. A preferred searching method incorporates filters and flags for focusing the parameters and for enabling searching data strings of incomplete values. A preferred insertion method ensures that each node within the data structure has at least two way branching from a previous node.

Other features and advantages of this invention will become apparent from the following detailed description of the presently preferred embodiment of the invention taken in conjunction with the accompanying drawings.

DESCRIPTION OF THE PREFERRED EMBODIMENT

Overview

In view of the growth of the global computer network and the abundant number of electronic messages generated on a daily basis, it is critical to properly and efficiently route the electronic messages in a safe and effective manner through the use of the IP address lookup table provided for routing of information over. the global computer network. This invention incorporates a modified Patricia Tree to both read and write to such a table. The invention supports the ability for readers to search the table simultaneously with a writer modifying the table. Accordingly the invention enables concurrent writing and searching of the table to enable fast and efficient use of tables and associated structures.

Technical Background

Figure 2:
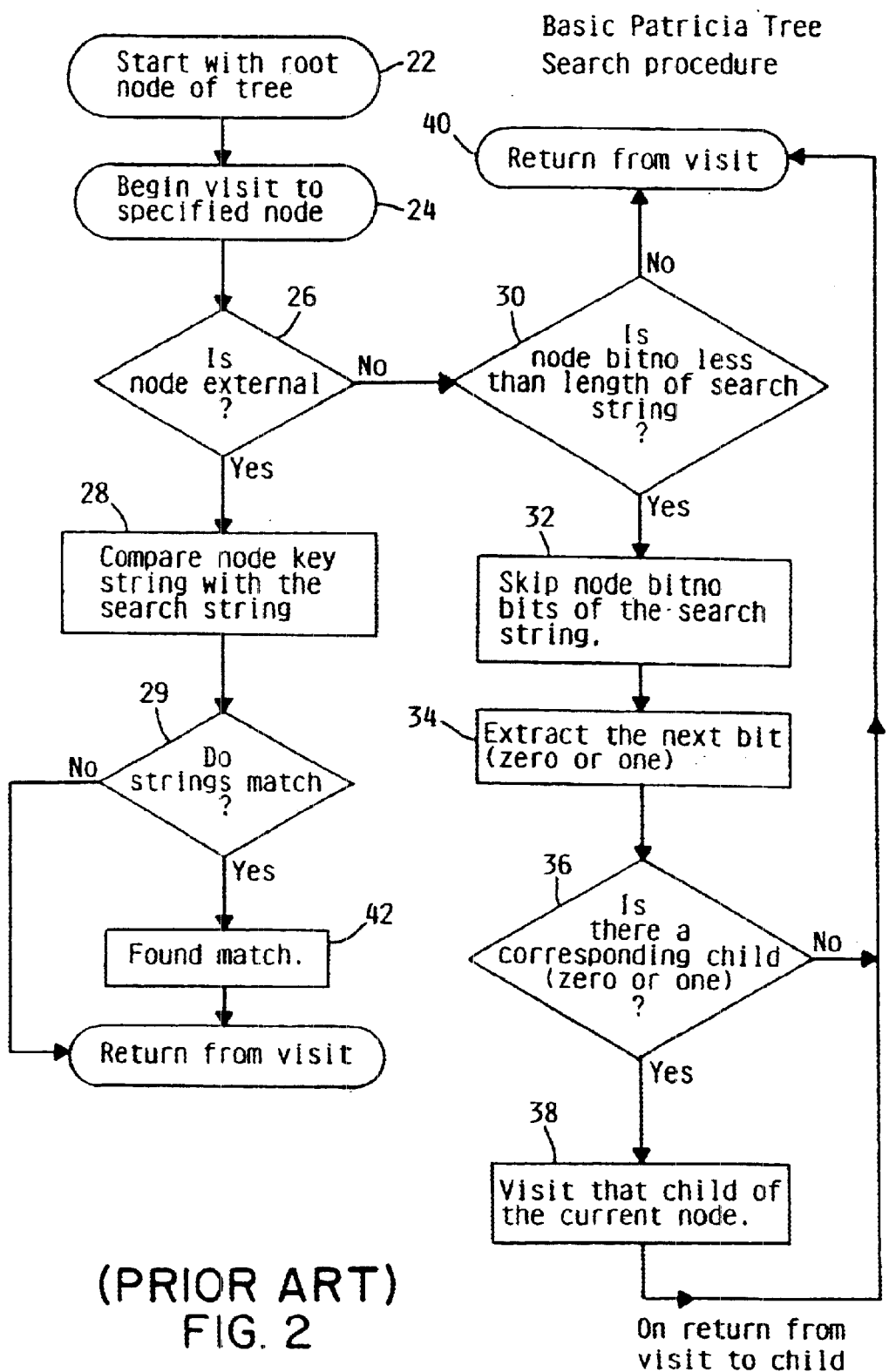
FIG. 2 is a flow chart illustrating a classic Patricia Tree search procedure.

The following discussion is specific to binary trees, although the same data structure may be applied to alphanumeric, ASCII or other symbol libraries. A basic Patricia Tree is an algorithm designed to search symbol strings and is frequently used for search strings or alphanumeric characters. The Patricia Tree examines one symbol of the string at internal nodes, and compares the entire string at external nodes. FIG. 2 is an illustration of a basic Patricia Tree search,procedure. As discussed in the background of the prior art, all searches in a Patricia Tree start at the root of the tree 22, and functions within the tree with at least two way branching being provided at each node. Each internal node in the tree includes the number of bits to skip over before making the next test. This number is referred to as the "bit number."

As shown in FIG. 2, all searches are initiated at the root of the tree 22. Immediately upon visiting any node 24, the first test is to determine whether the first node is an external node 26. If it is an external node, a comparison between the node key string and the search key string is performed 28 to determine if the strings match. Upon a positive determination at 29, a match 42 between the search string and the node key string is returned. If the node is not an external node, a comparison as to whether the bit number is less than the length of the string 30. Only if the bit number at this node is less than the length of the string may the search continue.

If the bit number at this node is less than the length of the string, that many bits of the search string are skipped, and the next bit is extracted from the string 34. A comparison 36 is then conducted to determine is there is a child node that matches the search string symbol at the specified node. That is, the pointer field labeled with the search string symbol is examined. If the field is empty, there is no corresponding child node. If the field contains a reference to a subsequent node, that node is the child corresponding to the search string symbol. If there is a corresponding child 36 that node is visited 38 and a return 40 to step 24 is conducted. If there is no corresponding child then a return from the visit is conducted. Essentially, if the bits match at the current node then the algorithm is repeated from 24, otherwise the search is concluded with the result of "no matches found" being returned. Accordingly, the basic Patricia Tree illustrated in FIG. 2 is a searching algorithm which uses an index at each node to indicate the bit used for that node's branching.

Figure 3A:
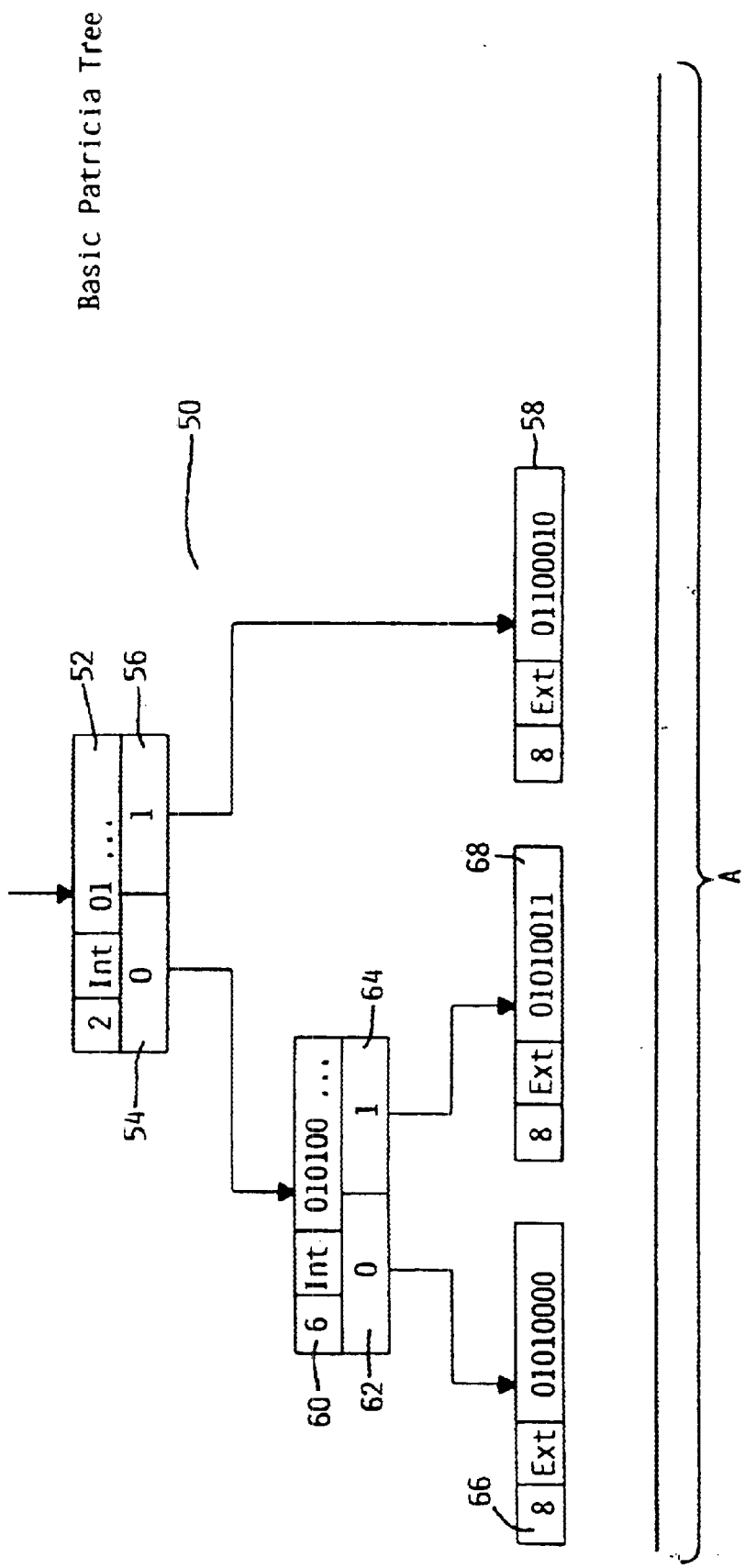
FIG. 3 is an example of a search conducted with a classic Patricia Tree.
Figure 3B:
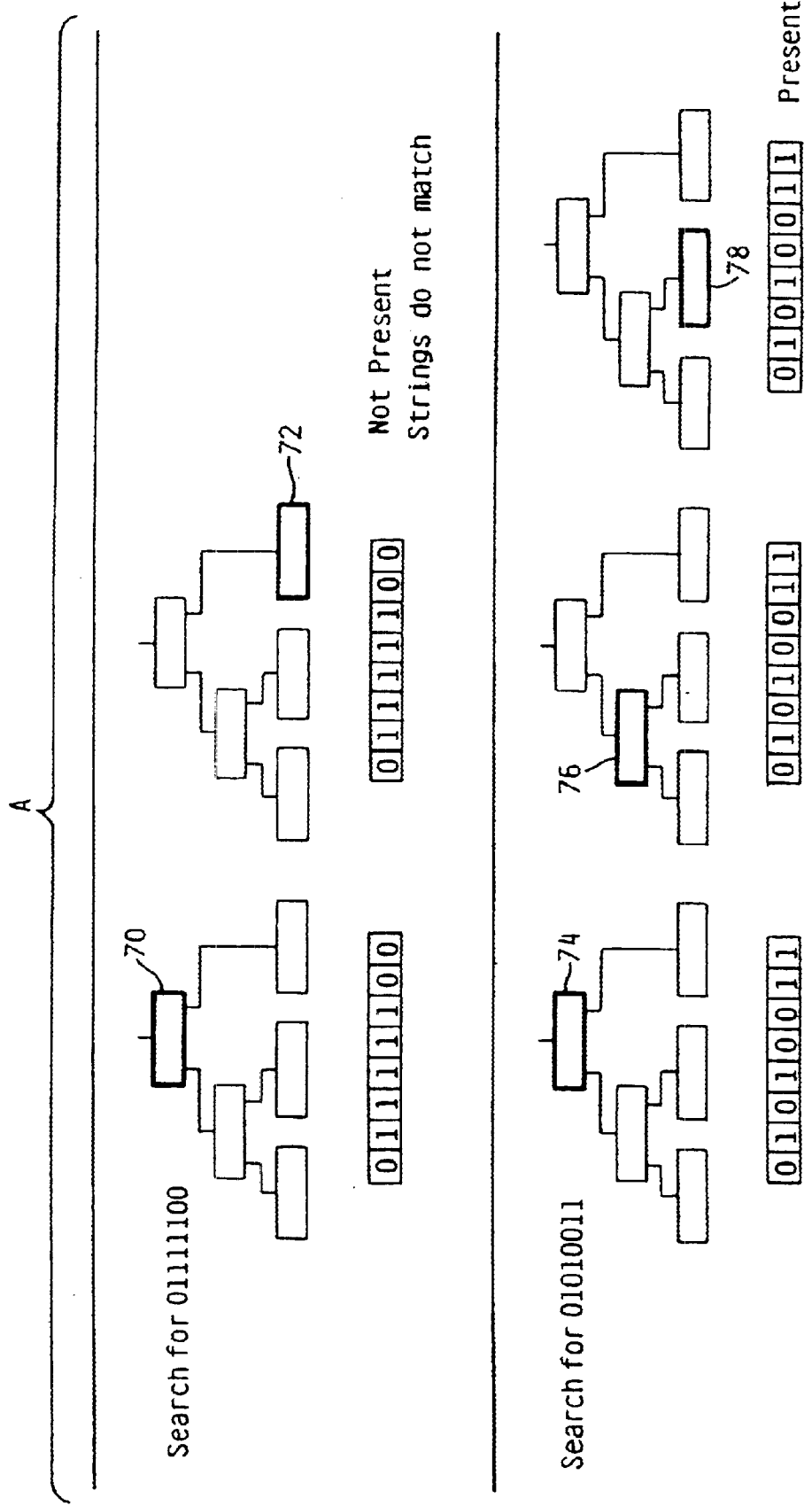

FIG. 3 is an illustration of two separate examples of the search of a specified string using the classic Patricia Tree algorithm as shown in FIG. 2. The tree structure provided is shown at 50. The root of the tree 52 has a bit number of two representing a choice after the second bit position. The pointer fields 54 and 56, labeled with symbols "0" and "1" respectively, represent the choices after the second bit position, wherein the "1" symbol 56 branches to an external node 58 with an eight bit key string, and the zero bit value 54 branches to an internal node 60 with bit number six. Internal node 60 represents a choice after six bits. Both pointer fields 62 and 64, labelled with symbols "0" and "1" respectively, represent the choices after the sixth bit position, and branch to external nodes 66 and 68, respectively, which as illustrated, obviously contain different key strings. For illustration, the first search with the structure provides the string "01111100". All searches start at the root of the tree 52, 70. This node has a bit number of 2 representing a choice after two bits. The third bit in the key string has a value of "1" which points to an external node 58, 72 containing the bit string "01100010". A comparison of the search key string "01111100" and the string stored at the external node "01100010" is then conducted. Since they do not match, a "no matches found" result is returned.

In a second search example of the same illustrated Patricia Tree 50, a search for the string "01010011" is conducted. The root of the tree 52, 74 is the first specified node, which represents a choice after two bits. The third bit of the key string is "0" which points to an internal node 60, 76 representing a choice after the 6-bit prefix "010100". The seventh bit value of the key string must be extracted, i.e. skipping six bits and extracting the next bit, and compared to the labelled pointer fields. In this example, the bit value at the seventh position of the search string is a one. The pointer field labelled one 64 points to an external node 68, 78 containing the bit string "01010011." Accordingly, there is a match between the data key string and the data stored at 68, 78 of the sample Patricia Tree.

Figure 4A:
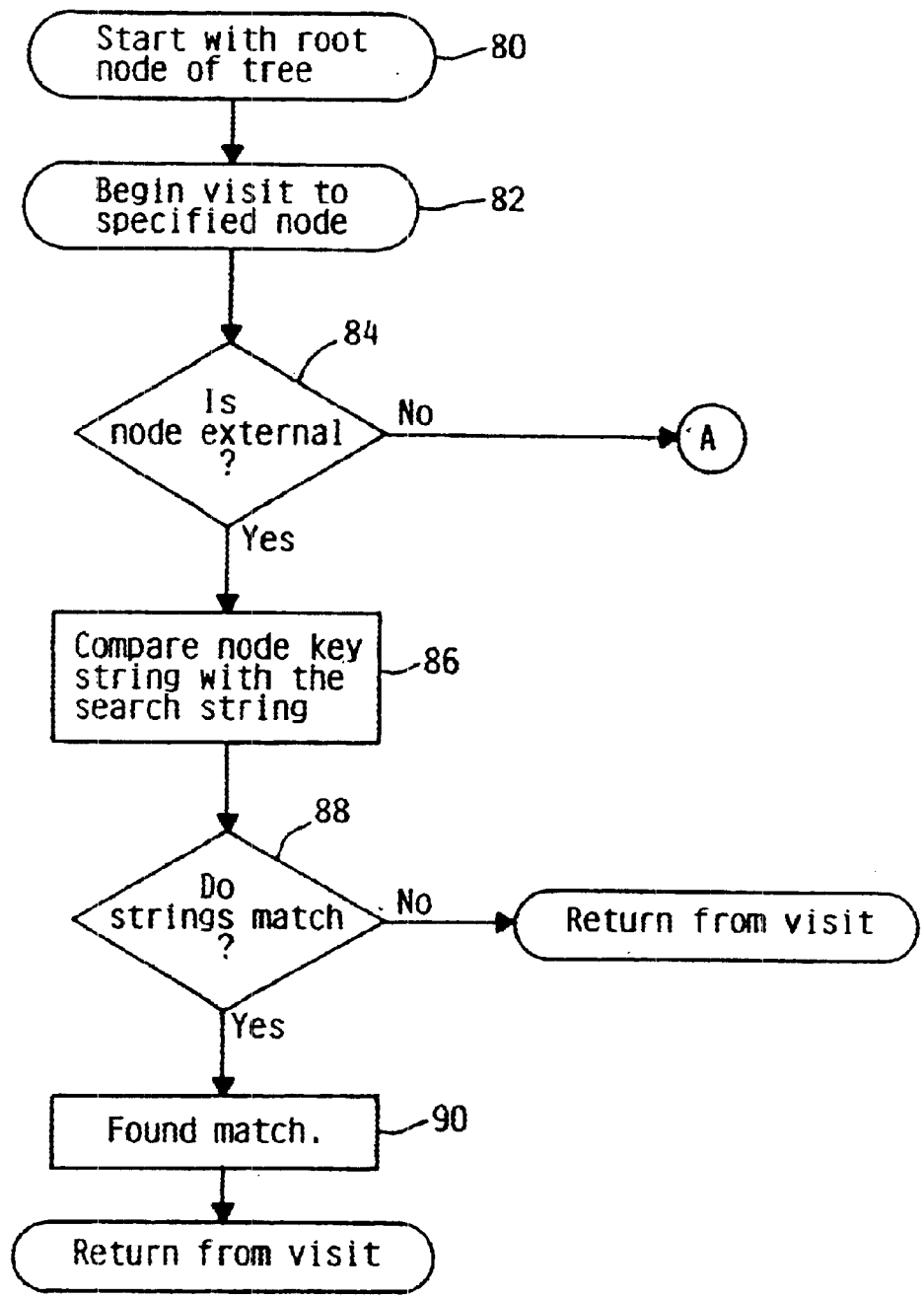
FIG. 4 is a flow chart illustrating a modified Patricia Tree search procedure with Epsilon children.
Figure 4B:
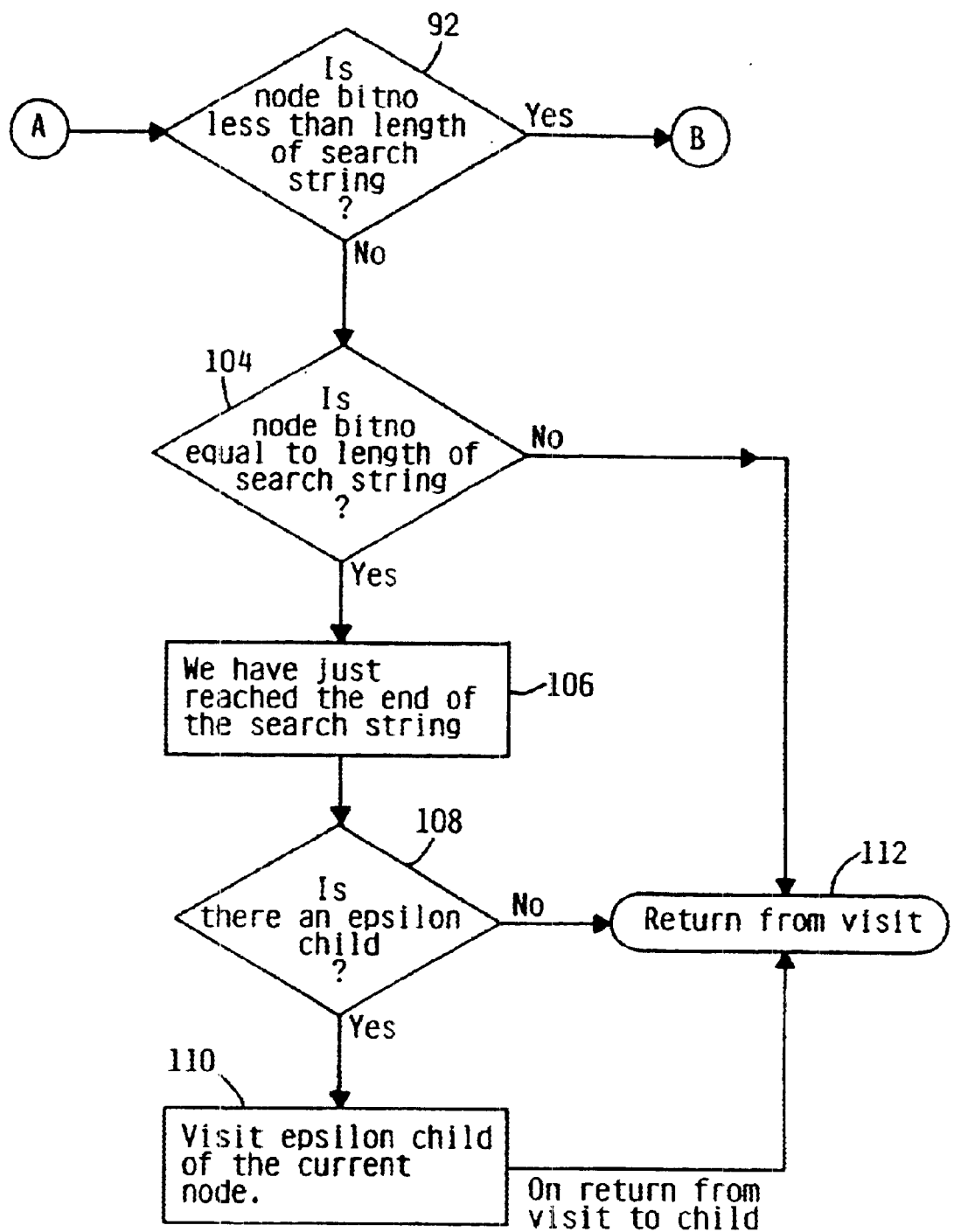
Figure 4C:
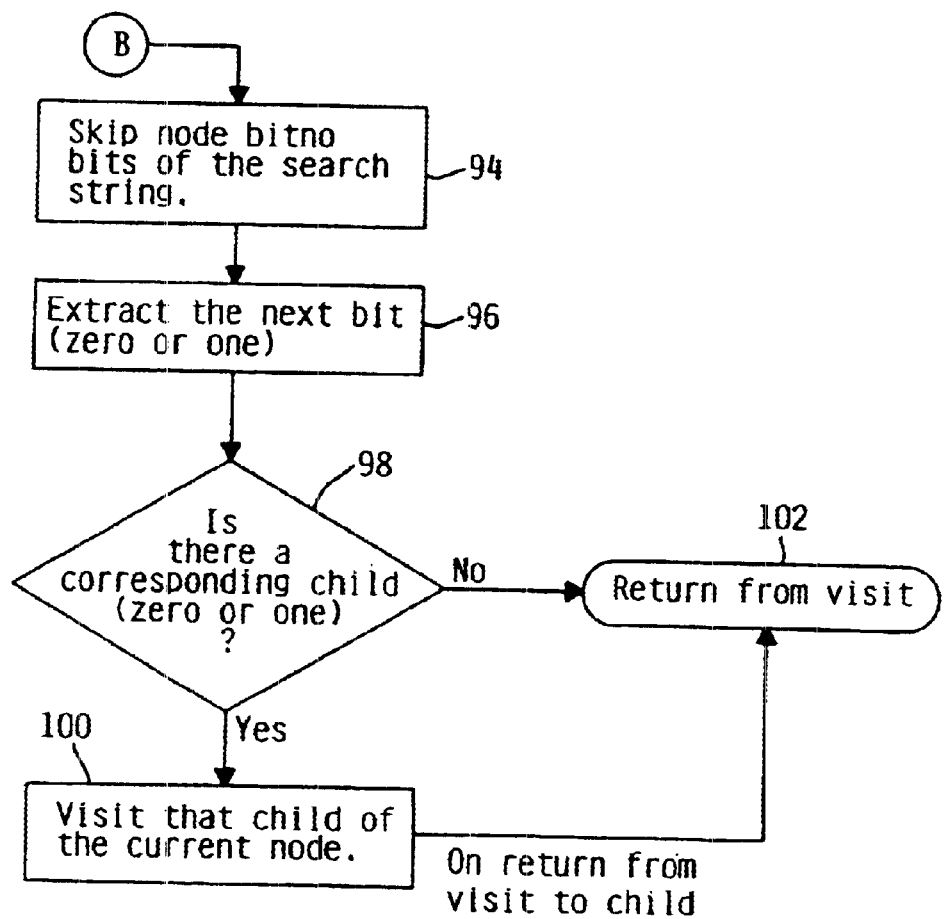
Figure 5A:
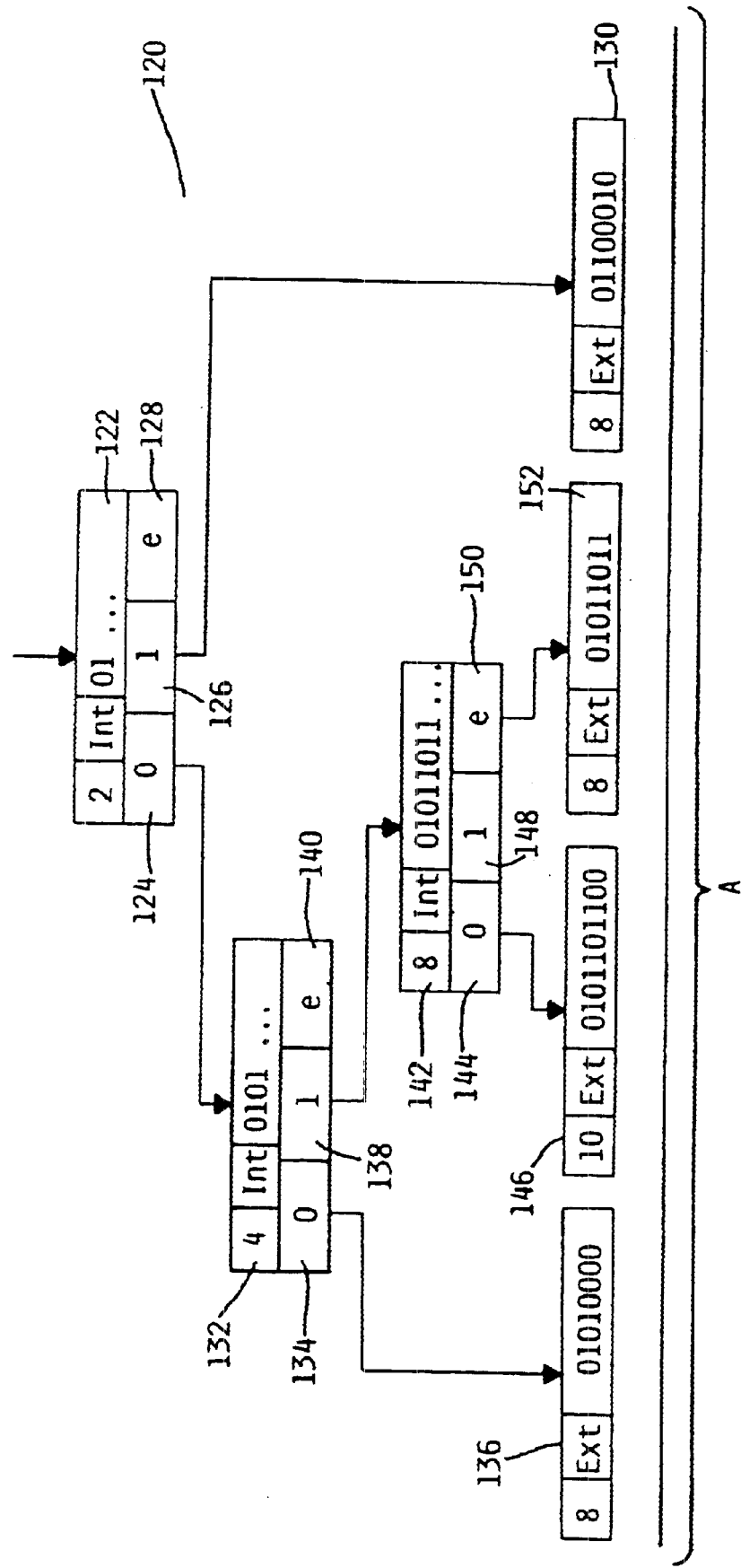
FIG. 5 is an example of a search conducted with a Patricia Tree with epsilon children and supporting strict prefixes.
Figure 5B:
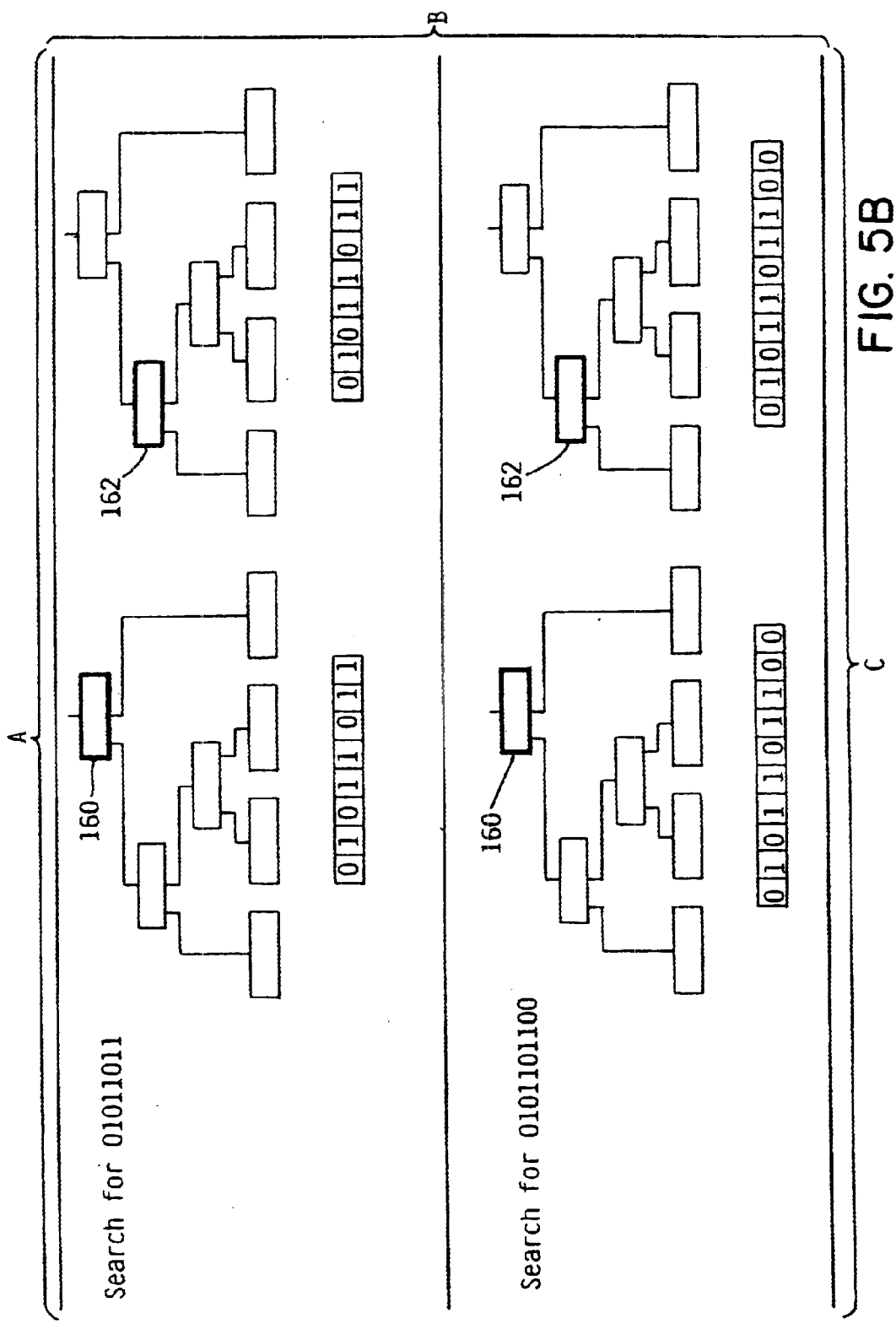
Figure 5C:
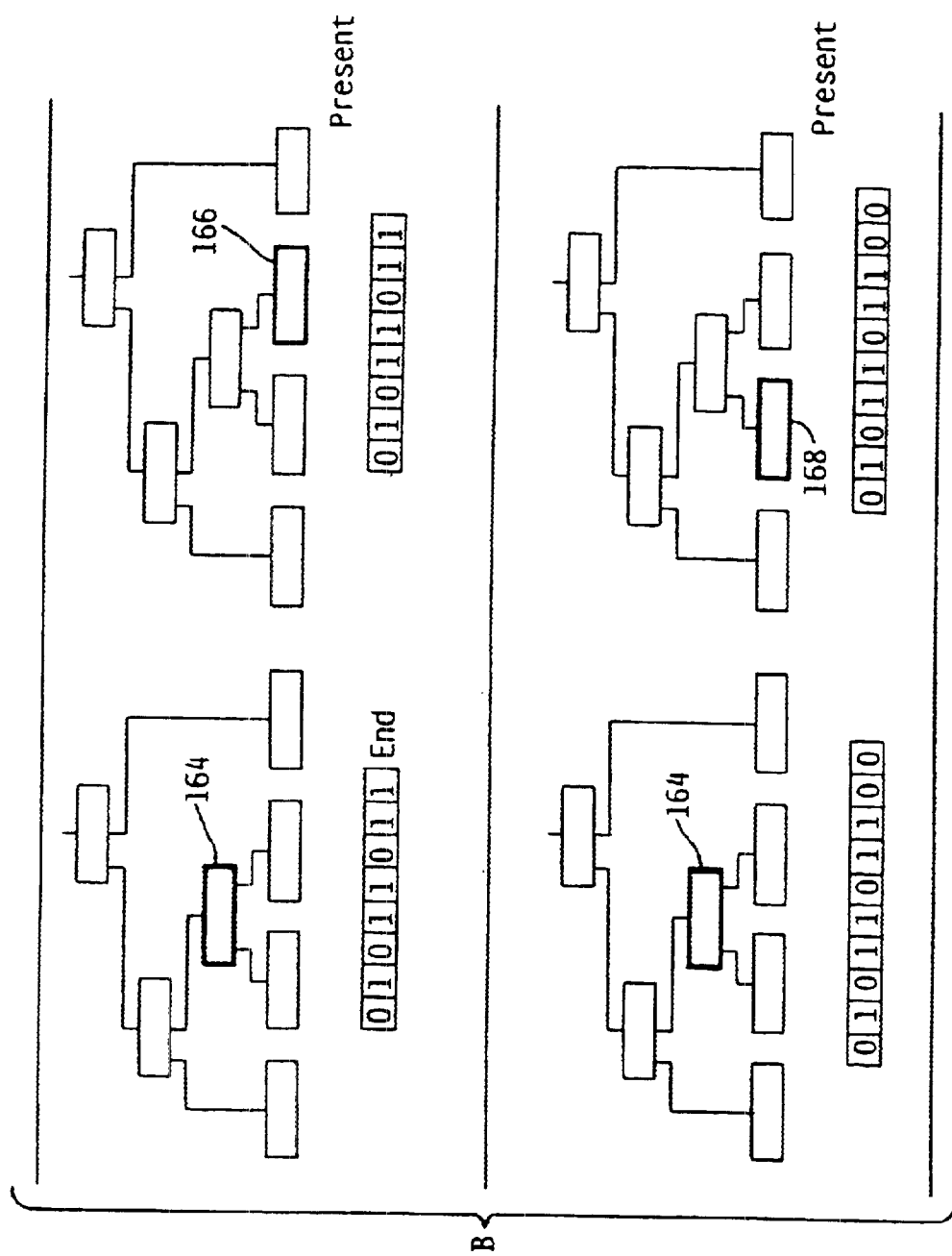
Figure 5D:
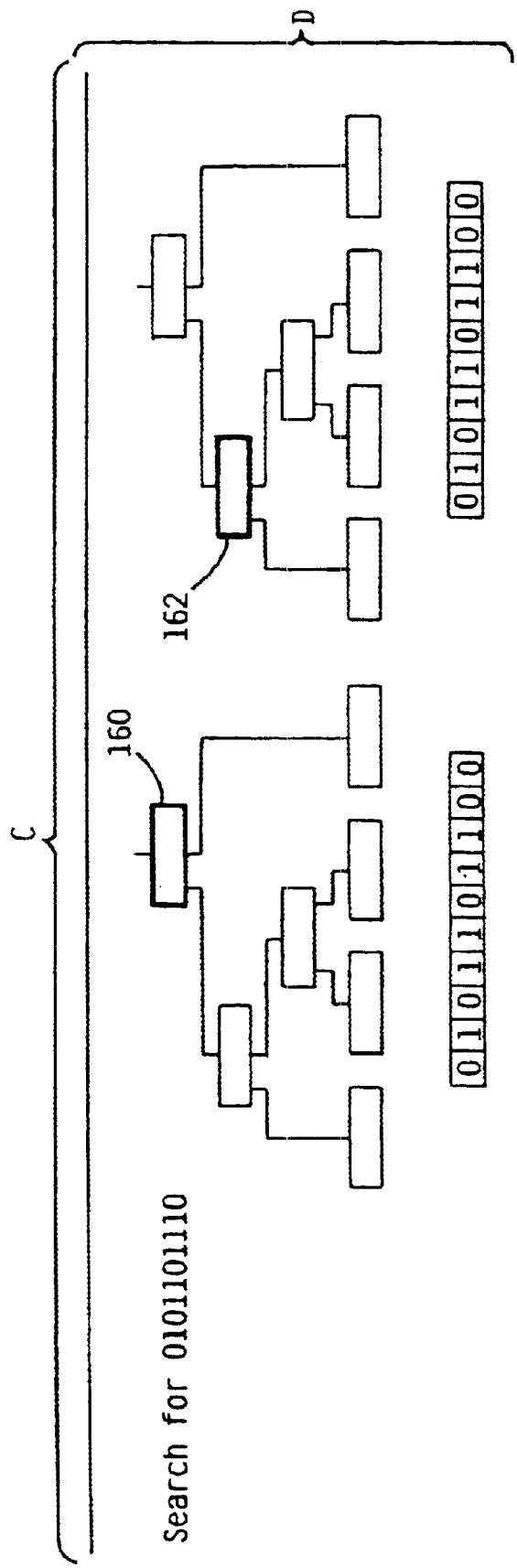
Figure 5E:
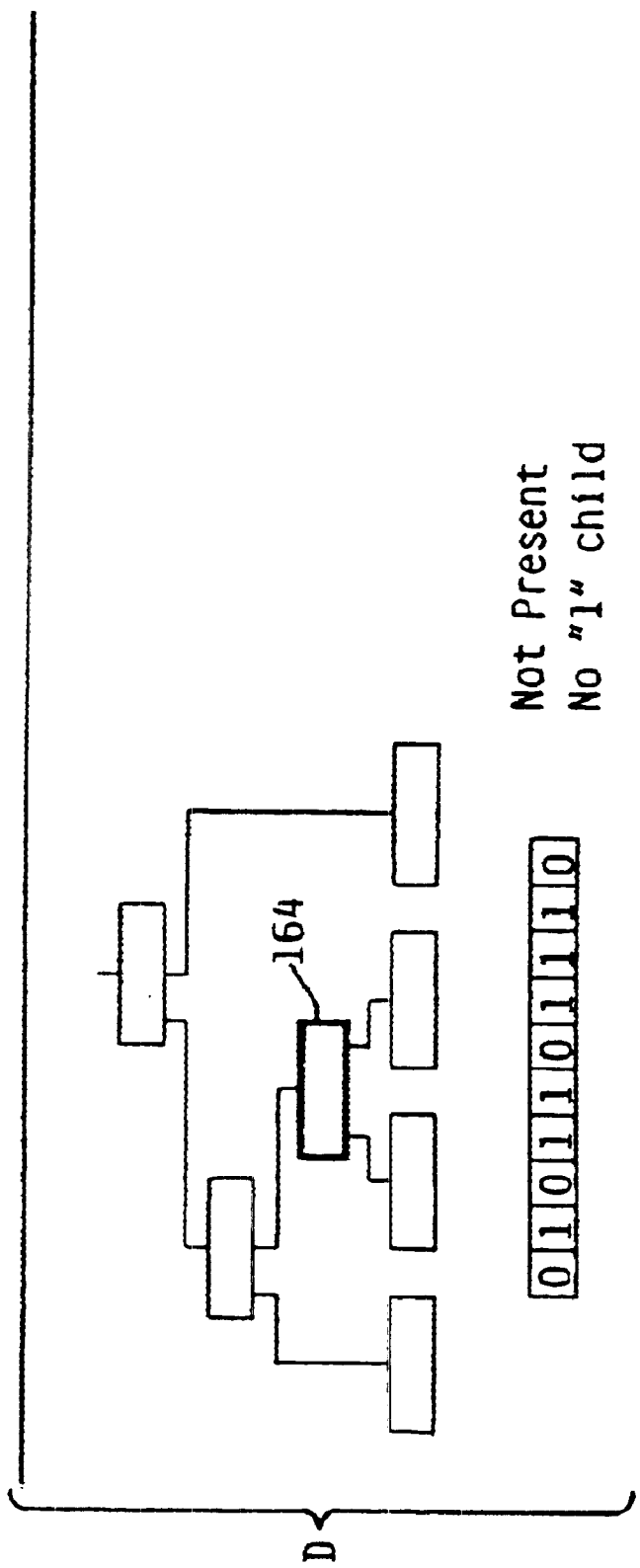

In a further embodiment, the Patricia Tree may be modified to include a third option at each node. An illustration of the flow chart of this data structure is shown in FIG. 4. This third option is known as an epsilon branch. An epsilon branch at a specific bit number indicates that there is a complete string of that length, and that there are other strings beginning with that string as a prefix and continuing for at least one symbol longer. More specifically, the epsilon functions as a marker to indicate the end of a string at this specific length. Accordingly, the Patricia Tree with the epsilon branch guarantees at least two of three way branching at each internal node and utilizes the epsilon as a marker for indicating the end of a data string.

Similar to the classic Patricia Tree of FIG. 2, all searches in the modified Patricia Tree of FIG. 4 are initiated at the root of the tree 80, which in the beginning of the search is the first node specified 82, where an initial test 84 is conducted to determine if this node is an external node. If the visited node is an external node, a comparison 86 of the node key string and the search string is conducted to determine 88 if there is a match between the two strings. Upon a positive determination at 88, a match 90 between the search string and the node key string is returned. However, if the node specified is not an external node, then a test 92 is conducted to determine if the bit number at this node is less than the length of the string being search. If the bit number of the string at this node is less than the length of the search string, then the search skips that many bits of the search string. At this step, the next bit is extracted 96 from the key string, i.e. a one or a zero present in the predetermined bit position. A comparison 98 of the bit extracted is conducted in relation to the string being searched. If the specified node, being an internal node, has a choice corresponding to the bit extracted from the key string, i.e. if the extracted bit value is zero and the node has a non-empty pointer field labelled zero, the child node is visited 100. This visit resumes the algorithm at 82 with the child as the specified node. Following the visit to the child of the extracted bit, a return 102 from the visit to 82 is conducted. At the comparison 98, if there is no corresponding one or zero bit then the algorithm returns to 102 without a match and indicates "no matches found". However, if at 92 it is determined that the bit number is at least equal to the length of the string being searched, then it must be determined 104 whether the bit position is equal to the length of the search string. If the bit position is equal to the length of the string, then the end of the search string has been reached 106 and a determination of whether or not there is an epsilon child 108 present at this node is required. An "epsilon child" at a specific bit number indicates there is a complete string of that length, and that there are other strings beginning with that string as a prefix and continuing for at least one symbol longer. If there is an epsilon child, that child is visited 110, and the algorithm return to 82 to determine the status of the node of the epsilon child. However, if at 108 it is determined that there is no epsilon child, a return from the visit 112 is conducted with no matches found. Accordingly, the epsilon child can match strings only of the same length as the true parent node's prefis and bit number.

FIG. 5 is an illustration of three separate examples of the search of a specified string using the classic Patricia Tree algorithm including epsilon children as shown in FIG. 4. The tree structure provided is shown at 120. In this example, the root of the tree 122 requires a decision after two bits, i.e. the third position in a data string, and has zero, one and epsilon pointer fields. 124, 126 and 128, respectively, wherein the one pointer field 126 branches to an external node 130 containing an 8-bit string, and the zero pointer field 124 branches to an internal node 132 with a bit number of four, and there is no node under the epsilon pointer field 128 at the root of the tree. Moving down the tree, the zero pointer field 134 of internal node 132 branches to an external node 136, the one pointer field 138 of internal node 132 branches to internal node 142 with a bit number of eight, and the epsilon pointer field 146 of internal node 132 is empty. Note that the absence of an epsilon child of 132 indicates the absence of a string equal to the parent's prefix, namely the four bits sequence "0101". Continuing down the tree, internal node 142 has a zero pointer field 144 that branches to an external node 146 with a 10-bit string, a one pointer field 148 that is empty, and an epsilon pointer field 150 that branches to an external node 152 indicating that there is a complete string equal to the parent node's prefix, namely the eight bit sequence "01011011".

The first search illustrated in FIG. 5 with the structure provided is the string "01011011". All searches start at the root of the tree 122, 160, represents a choice after the 2-bit prefix "01." The third bit position in the search string has a value of "0" which points 124 to internal node 132, 162, and this node is visited. At internal node 132, 162 the fifth bit in the key string is extracted. This has a value of "1" which points 138 to internal node 142, 164 and this node is visited. At internal node 142, 164 the node bit number is equal to the length of the search string and therefore the end of the search string has been reached, and a check for an epsilon child is conducted. In this example, internal node 142, 164 has an epsilon child 152, 166, which is then visited. As the epsilon child 152, 166 is an external node, the node key string and the search string are compared to determine if there is a match at this external node. Accordingly, in this example there is a match of the string emanating from the epsilon child and this match is returned.

The second search illustrated in FIG. 5 with the structure provided is the string "0101101100". Once again, all searches start at the root of the tree 122, 160. The third bit position in the key string has a value of "0" which points 124 to internal node 132, 162. At internal node 132, 162, the fifth bit in the key string is extracted and has a value of "1" which points 138 to internal node 142, 164. Since 142, 164 is an internal node and the node bit number is less than the length of the search string, the ninth bit of the search string is extracted, which is "0" and external node 146, 168 is visited. Since the node 146, 168 is an external node, a comparison of the node key string with the search key string is then conducted. In this example, the strings have been determined to match. Accordingly, the traversing of the tree in this example provides a match between the external node 146, 168 data string and the search key string and this match can then be returned.

The third search illustrated in FIG. 5 with the structure provided is the string "0101101110". Once again, all searches start at the root of the tree 122, 160. The third bit position in the key string has a value of "0" which points 124 to internal node 132, 162. At internal node 132, 162 the fifth bit position in the key string is extracted and has a value of "1" which points 138 to internal node 142, 164. Since this is an internal node and the node bit number is less than the length of the search string, the ninth bit of the search string is extracted. The ninth bit of the key search string is "1" for which there is no pointer 148. Accordingly, the traversing of the tree in this example did not provide a match with the search string "0101101110" and a "no matches found" is returned.

Figure 1:
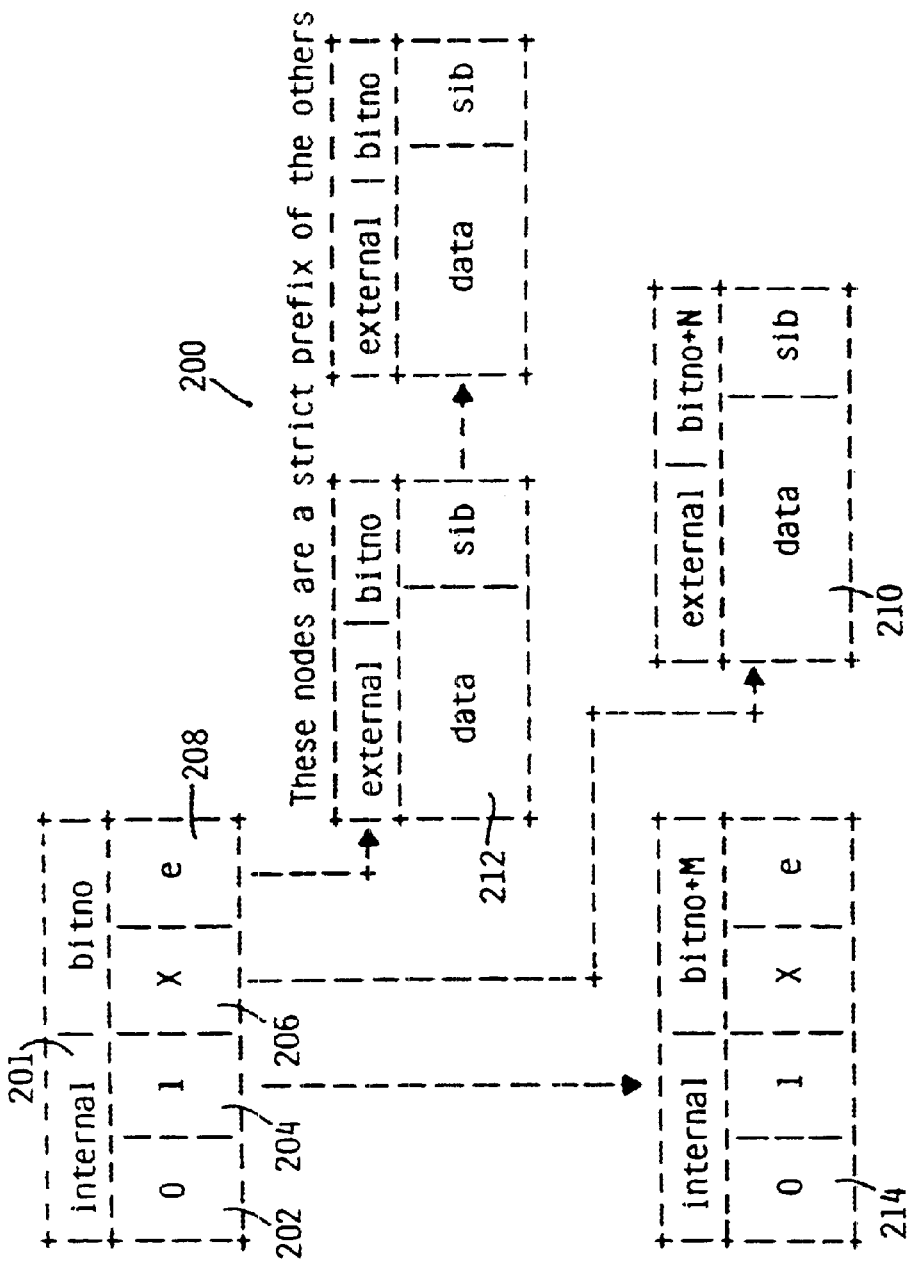
FIG. 1 is a block diagram of a modified Patricia Tree according to the preferred embodiment of this invention, and is suggested for printing on the first page of the issued patent.

In a preferred embodiment of the invention, the classic Patricia Tree model is modified for searching wildcard and epsilon children as well as zero and one bits. An illustration of this modified Patricia Tree 200 is shown in FIG. 1. In a classic Patricia Tree internal nodes represent locations for symbol comparison and all keys are stored at the external nodes. However, in this form of a modified Patricia Tree, the 202, 204, 206 and 208 are pointer fields at internal node 201 labelled with (binary) alphabetic symbols, a wildcard symbol and the epsilon symbol. In addition, the modified tree 200 supports siblings at external nodes, as illustrated at 210 and 212. Siblings allow duplicate entries for the same string value. This permits, among other uses, distinct prototype addresses which differ only in their wildcarded symbol positions. In this modified tree structure, the tree goes beyond the typical ternary tree to include wildcard positions, i.e. wildcard children, directly in the digital tree structure. When a tree reaches an external node, the destination address is compared against just the one value present in each of the external nodes. If there is no match, the search then backtracks to the parent node of that external node and tries the wildcard child of that parent, if one is present. This algorithm repeats on up the tree structure to each prior parent until a match is found or the root of the tree is reached and the wildcard child of the root node is examined.

When searching for an exact match with the novel data structure, the algorithm does not differ from a classic Patricia Tree algorithm and will limit its search against a prototype address while ignoring the mask entirely. However, when searching for possible matches beyond an exact match, the system will function slower because each possible wildcard child must be visited resulting in a longer traversal of the tree structure. The search algorithms for the wildcard search trees would return multiple matches in the order they are discovered during the search. As such, it is important to employ controls over the modified Patricia Tree of the preferred embodiment to control the results which will be provided for a given search.

Controls may come in the form of flags, filters or a combination of flags and filters. Flags control the tightness of a match and filters compare the differing key lengths. Both flags and filters may be combined in a plurality of permutations and combinations to further modify the tightness of the search results. The predefined flags within the preferred embodiment include, ALL, BEST, and EXACT. The EXACT flag ignores all of the wildcard bits in the data structure and compares the bits against the prototype address while ignoring the mask in its entirety to return the exact match for the search string or a result of "no matches found". As such, the EXACT flag provides a result akin to a classic Patricia Tree. At the opposite extreme from the EXACT flag, the ALL flag returns all exact and inexact (wildcarded) matches. The BEST flag also returns both exact and inexact matches, but does not match keys whose masks are strict subsets of a matching key's mask, i.e. it returns only the most relevant results. As outlined herein, there are options to return all possible matches of data strings in a tree, only exact matches, better matches, or just the best matches.

When hierarchical routes are used exclusively, it is rudimentary that one defines what would be classified as better and best matches. For example, if multiple table entries match a destination address, the entry with the longest mask is the unique best match because it matched more symbols than any other entry. It is unique because there is only one prefix mask of a given length. When arbitrary masks are allowed, the concept of a best match becomes more complex. There may not be a better match or there may be multiple better matches. A "better" match is a match that has a mask that subsumes the other mask, i.e. it has all the bits in the other mask and at least one additional bit. An exact match is always better than any inexact match of the same length. A "best" mask is better than any comparable string. There may be several "best" matches wherein each "best" match is at the top of its chain of comparable entries, wherein none of the "best" matches is comparable to any of the others. The BEST flag limits its results to "best" matches in this sense.

Filters are implemented for searching prefixes and suffixes of a string. In the preferred embodiment of the invention, the predefined filters include data strings of equal length ("EQUAL"), data strings having a length greater than the search data string ("LONG"), data strings having a length shorter than the search data string ("SHORT"), data strings having a length not equal to the search data string ("NOT EQUAL"), and data strings shorter or longer than the search data strings ("SHORT or LONG"). Searches can be conducted for matching short data strings against longer table entries, long strings against shorter table entries, or both types of table entries. When matching short data strings, the remainder of the data string associated with one or multiple table entries is ignored. Congruently, when matching long strings, the missing data of shorter table length strings are treated as wildcard entries. Finally, in the selection of unequal length matches, any extra data associated with a table entry must be a wildcard entry or the match fails. Accordingly, the filters and flags may be combined in further narrowing the parameters of the search for the search string.

Figure 6A:
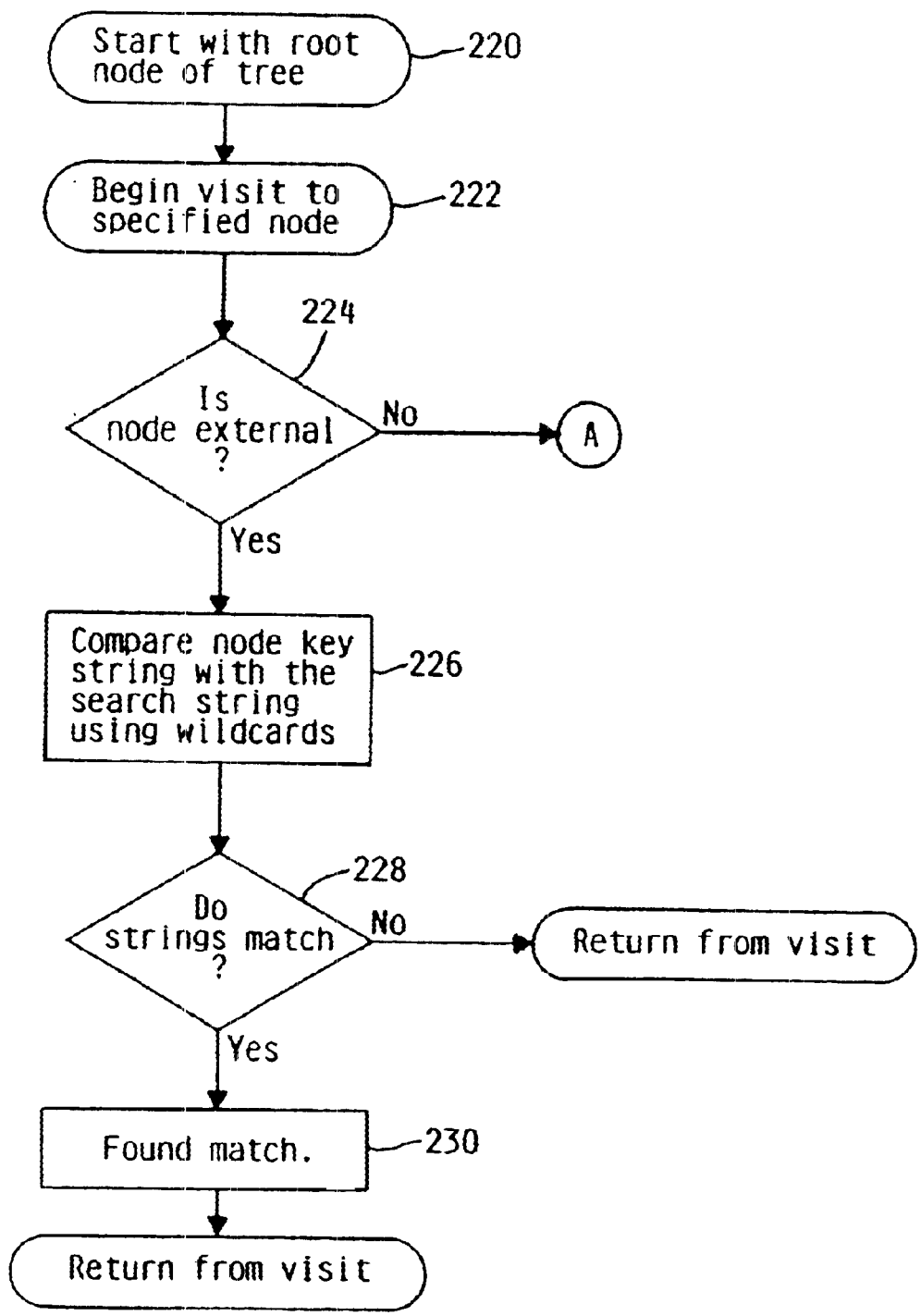
FIG. 6 is a flow chart illustrating a modified Patricia Tree of FIG. 1, with wildcard and epsilon children, including a search procedure with the All flag and the Equal Length filter.
Figure 6B:
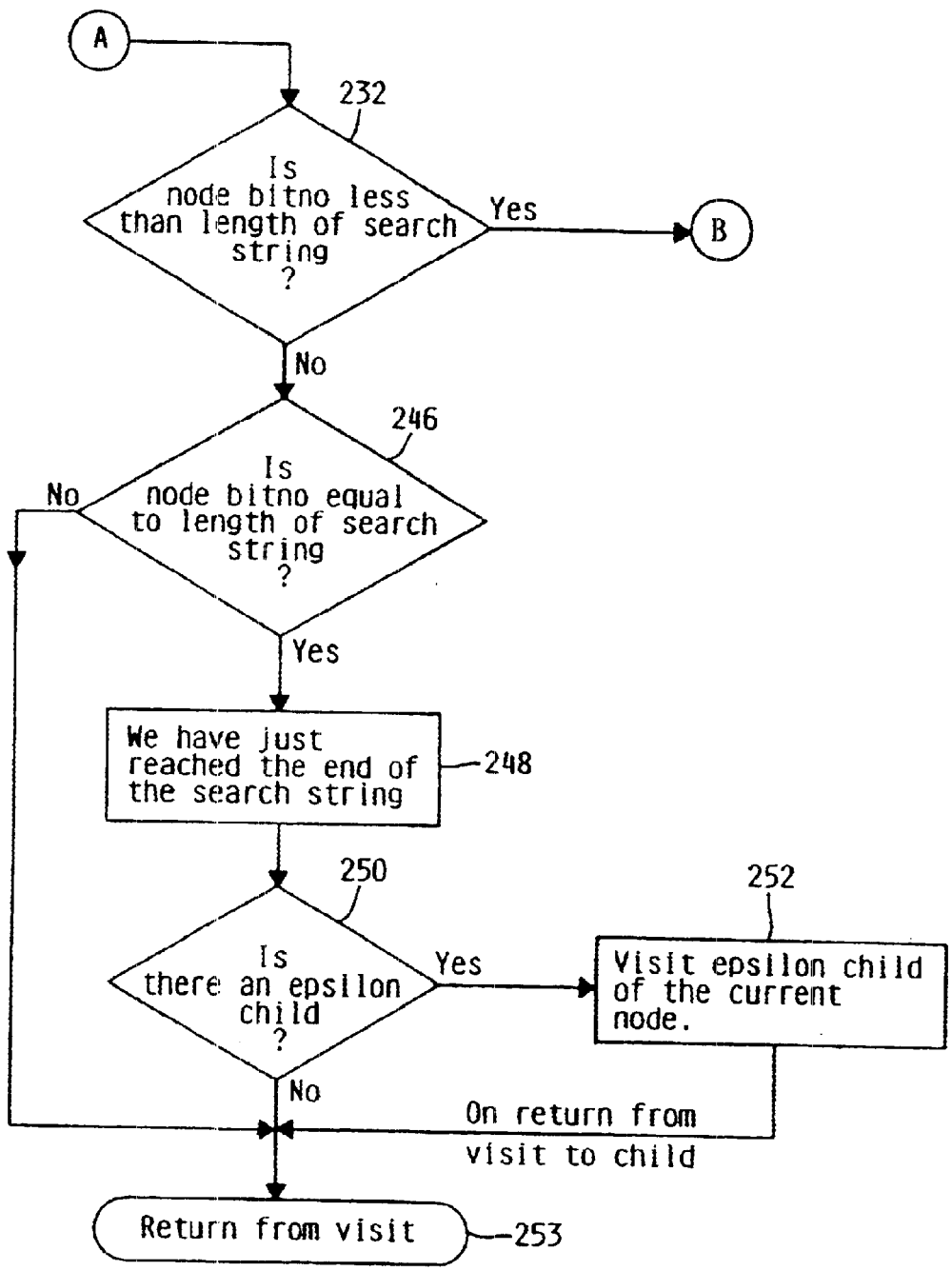
Figure 6C:
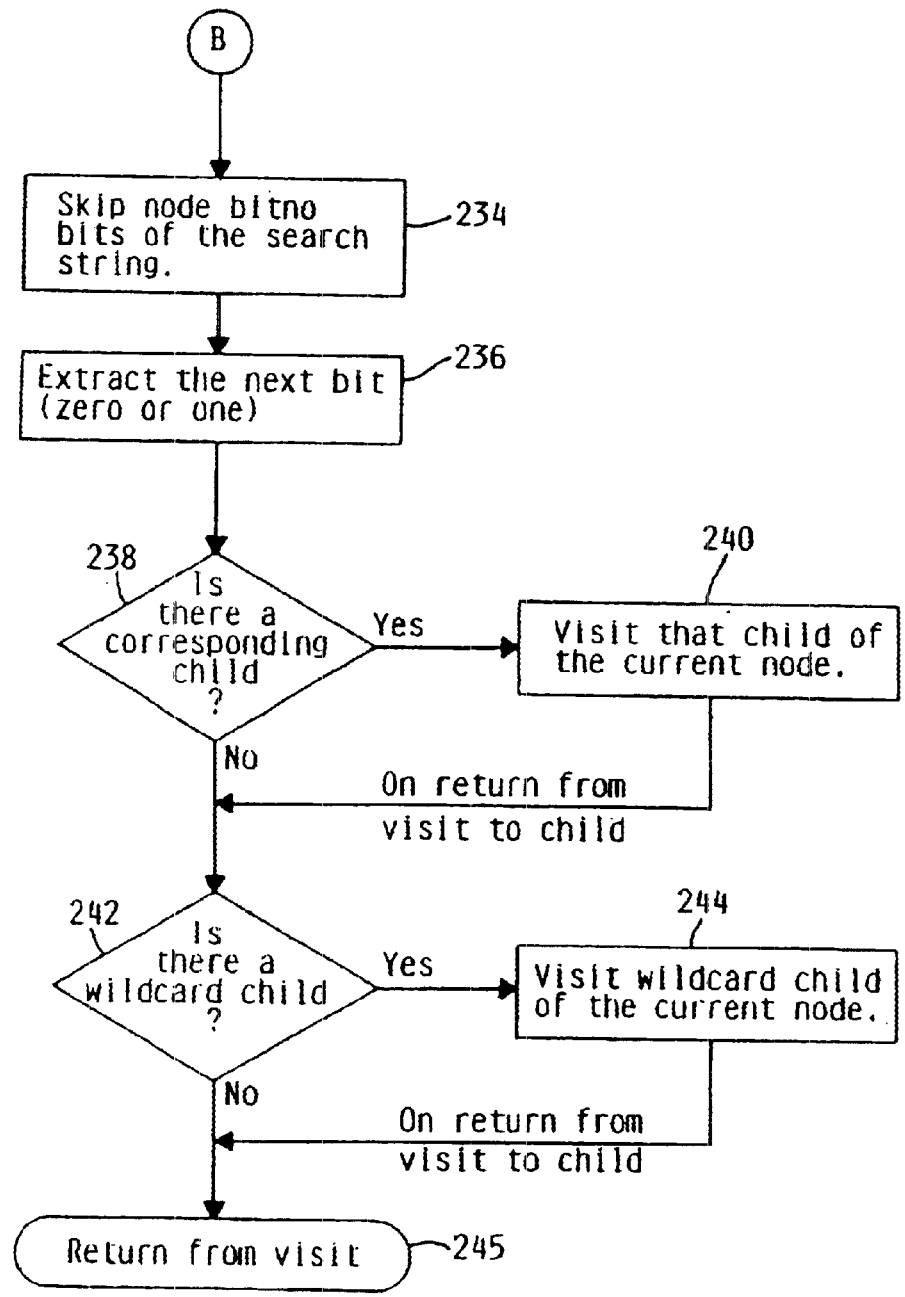

FIG. 6 is an illustration of the search procedure for an ALL flag and an EQUAL Length filter. As with the classic Patricia Tree, the search is initiated at the root node of the tree 220 which in the beginning of the search is the first node specified 222, followed by an initial test 224 to determine if this node is an external node. If the visited node is an external node, a comparison 226 of the node key string and search string, including wildcard values, is conducted to determine 228 if there is a match between the two strings. Upon a positive determination at 228, a match 230 between the search string and the node key string is returned. However, if the node specified is not an external node, then a test 232 is conducted to determine if the bit number of the visited node is less than the length of the search string. If the bit number at this node is less than the length of the search string, then the search skips that many bits 234, and extracts the next bit 236 from the key string. If the specified node has a child node corresponding to the bit extracted from the key string 238, i.e. if the extracted bit value is "0" and the node has a zero child, then the child of the current node is visited 240. In addition, if there is a corresponding wildcard child for the identified bit position 242, then the wildcard child of the current node is visited 244 as well. During these visits, the algorithm is resumed from 222 with the child as the specified node. Following the visits 240, 244 to the corresponding child and wildcard child of the identified node a return 245 from the visit to the current node is conducted. Since FIG. 6 illustrates an EQUAL filter, if at 232 the bit number at the visited node is not less than the length of the data search string, a test 246 is conducted to determine if the bit number is equal to the length of the data search string. If so 248, and if there is an epsilon child 250, that child is visited 252. Following a visit to an epsilon child a return 253 from the visit to the current node conducted.

Figure 7A:
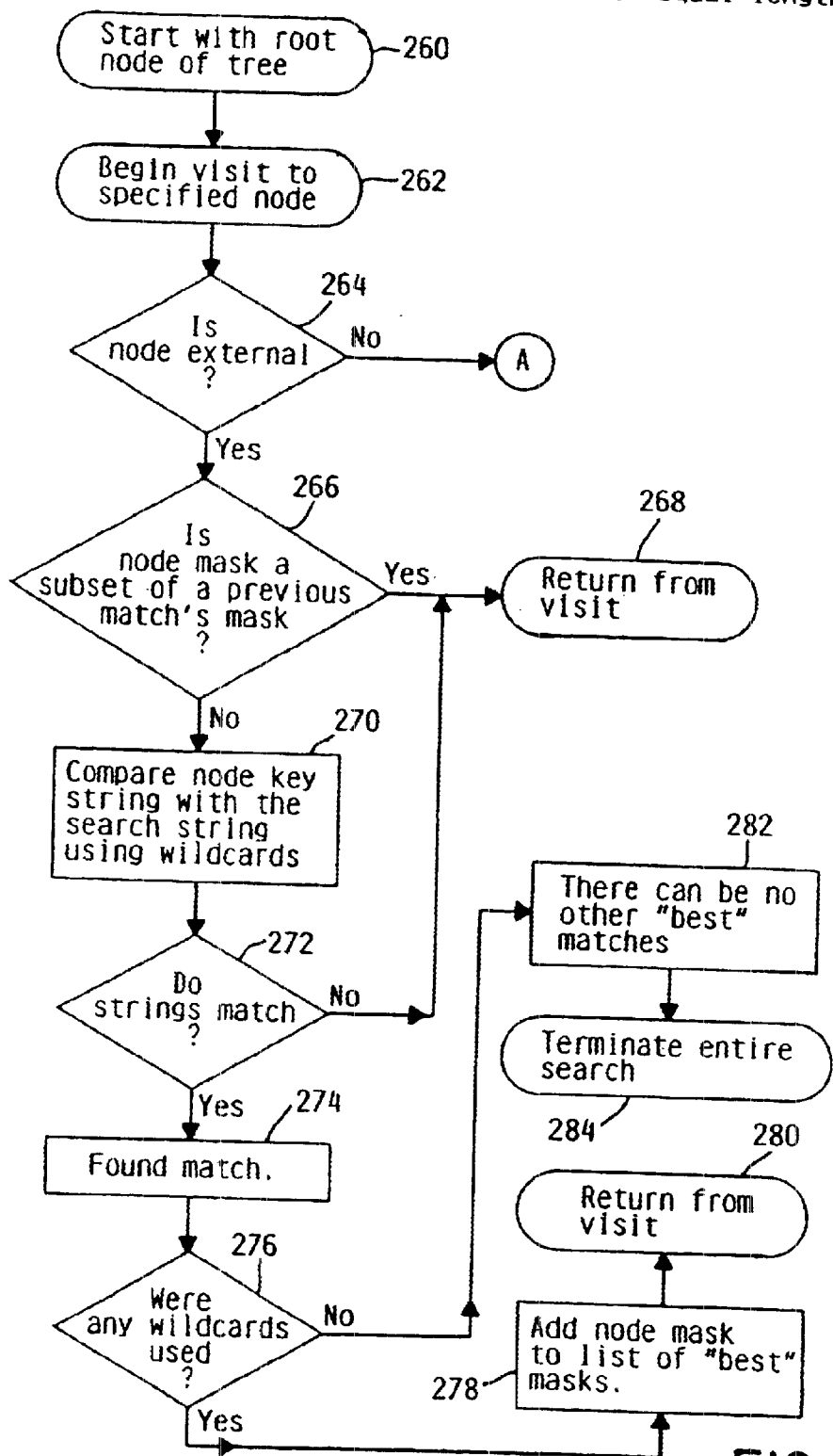
FIG. 7 is a flow chart illustrating a modified Patricia Tree of FIG. 1, with wildcard and epsilon children, including a search procedure with the Best flag and Equal Length filter.
Figure 7B:
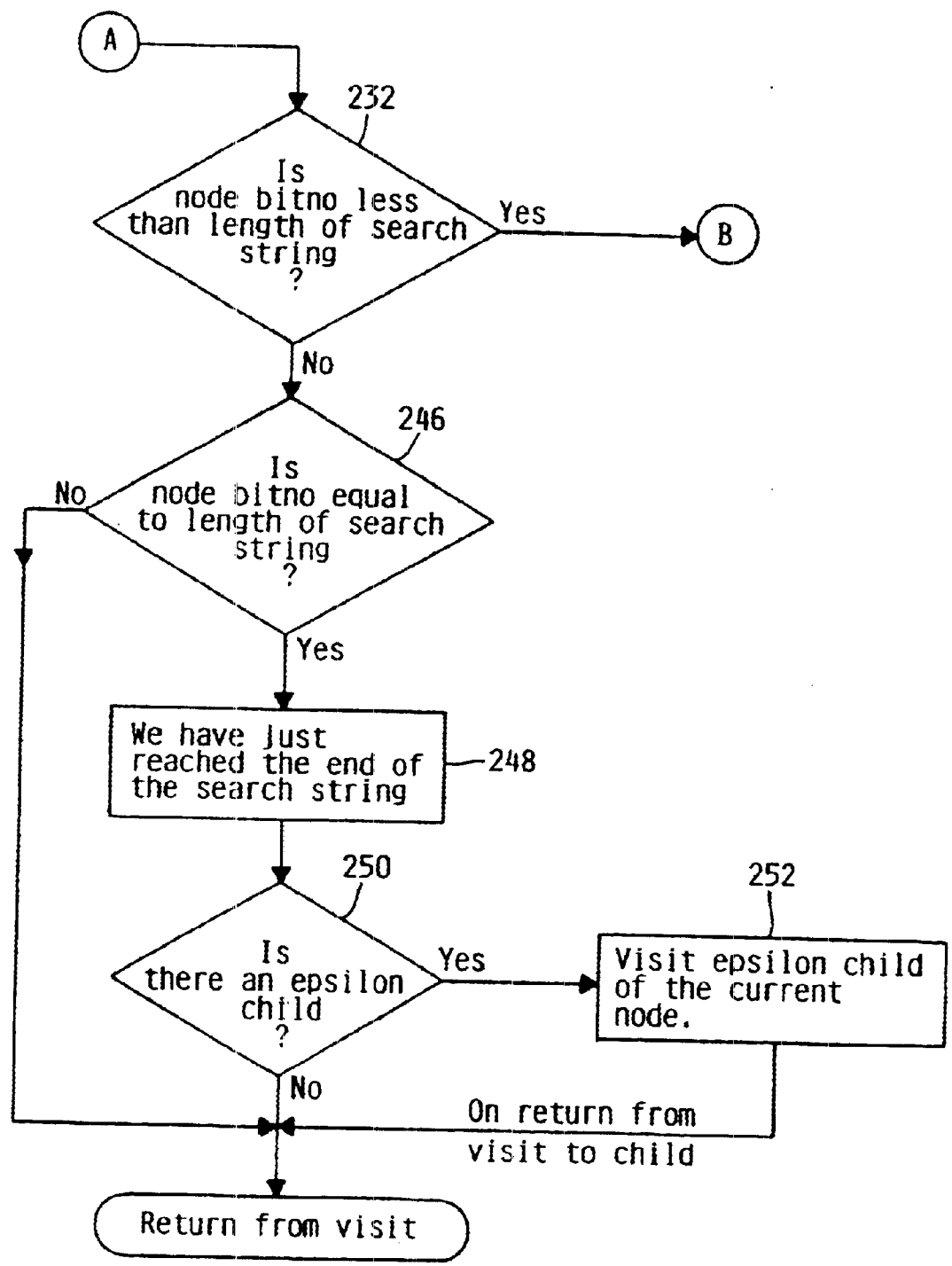
Figure 7C:
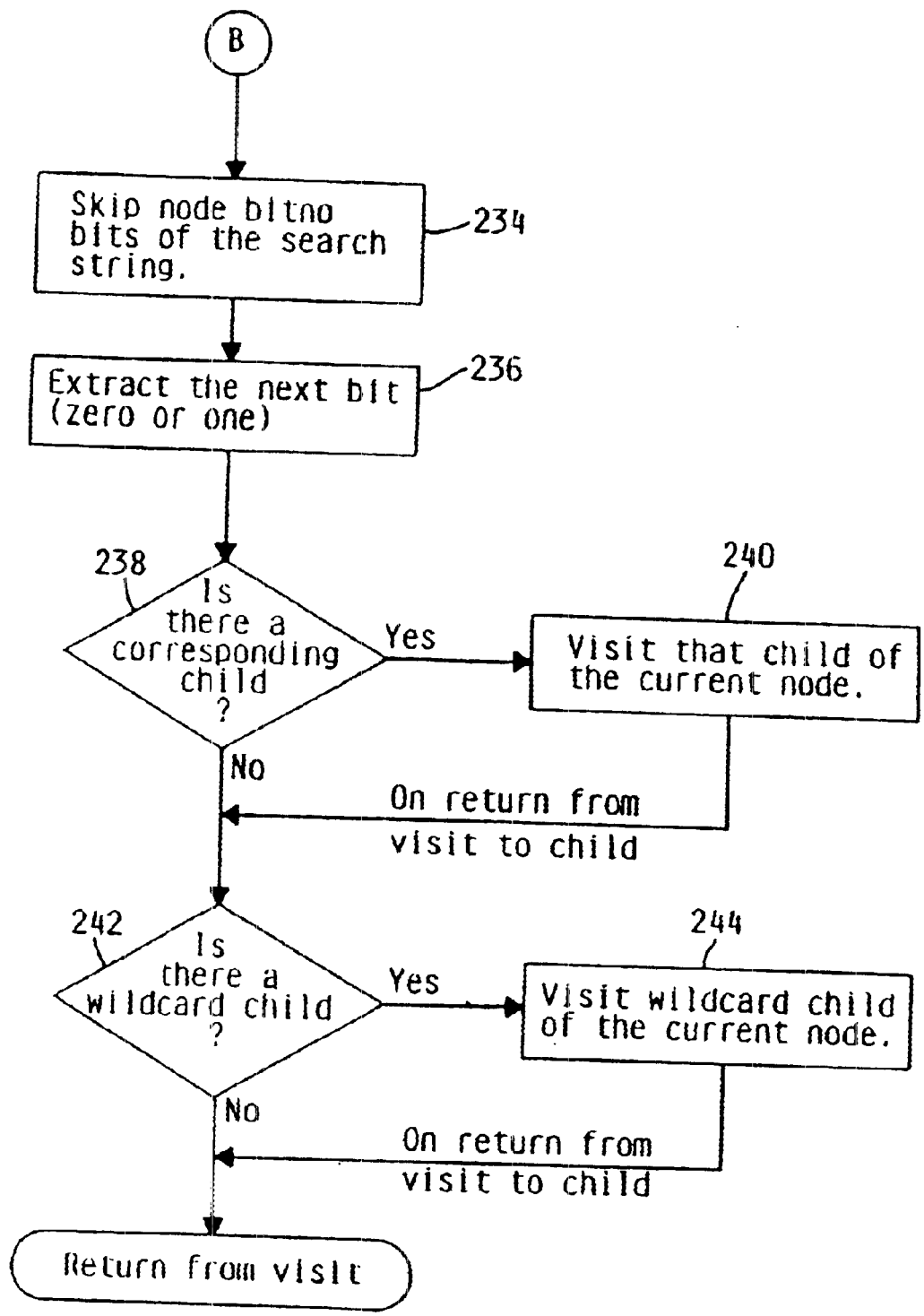

FIG. 7, is an illustration of the a search procedure for a key string having a BEST flag and an EQUAL length filter. As with the classic Patricia Tree, the search is initiated at the root node of the tree 260 which in the beginning of the search is the first node specified 262, followed by an initial test 264 to determine if this node is an external node. If the visited node is an external node, it must first be determined 266 if a previous match is a better match than this node. By the definition of "best" given earlier, the mask of a better match subsumes the mask of the worse match. I.e., the worse mask is a subset of the better mask. If it is determined that the node mask is a subset of a previous match's mask, then the search along this route is complete and the node string is determined not to be a match with the search string data and a return 268 from the visit is conducted. However, if the node string mask is not a subset of a previous string match, then a comparison 270, 272 of the node key string with the search string, including wildcard values, is conducted. If the node key string and the search string match 274, then the mask is examined 276 for wildcard positions. If any wildcards were used, the node key string mask is added 278 to the list of BEST masks, and a return 280 from the visit is conducted. If there were no wildcards present in the matched data string, then the matched string is an exact match and there can be no other "best" matches. Accordingly, following an exact match 282, the search is terminated 284.

However, if the node being visited is not an external node, the method follows an identical route to that described in FIG. 6. As both the algorithms of FIGS. 6 and 7 have been identified as searching for an EQUAL length filter, the only differences between these two procedures lies in the algorithm following the determination that the node being visited is an external node. Steps 232–252 have been identified in FIG. 7 as numerically identical to that of FIG. 6 to illustrate the similarities between the two drawing figures and the corresponding search mechanism. Accordingly, the method disclosed and illustrated in FIG. 7 conducts a search to determine which matches of data string are the best matches among all equal length node key strings being searched.

Figure 8A:
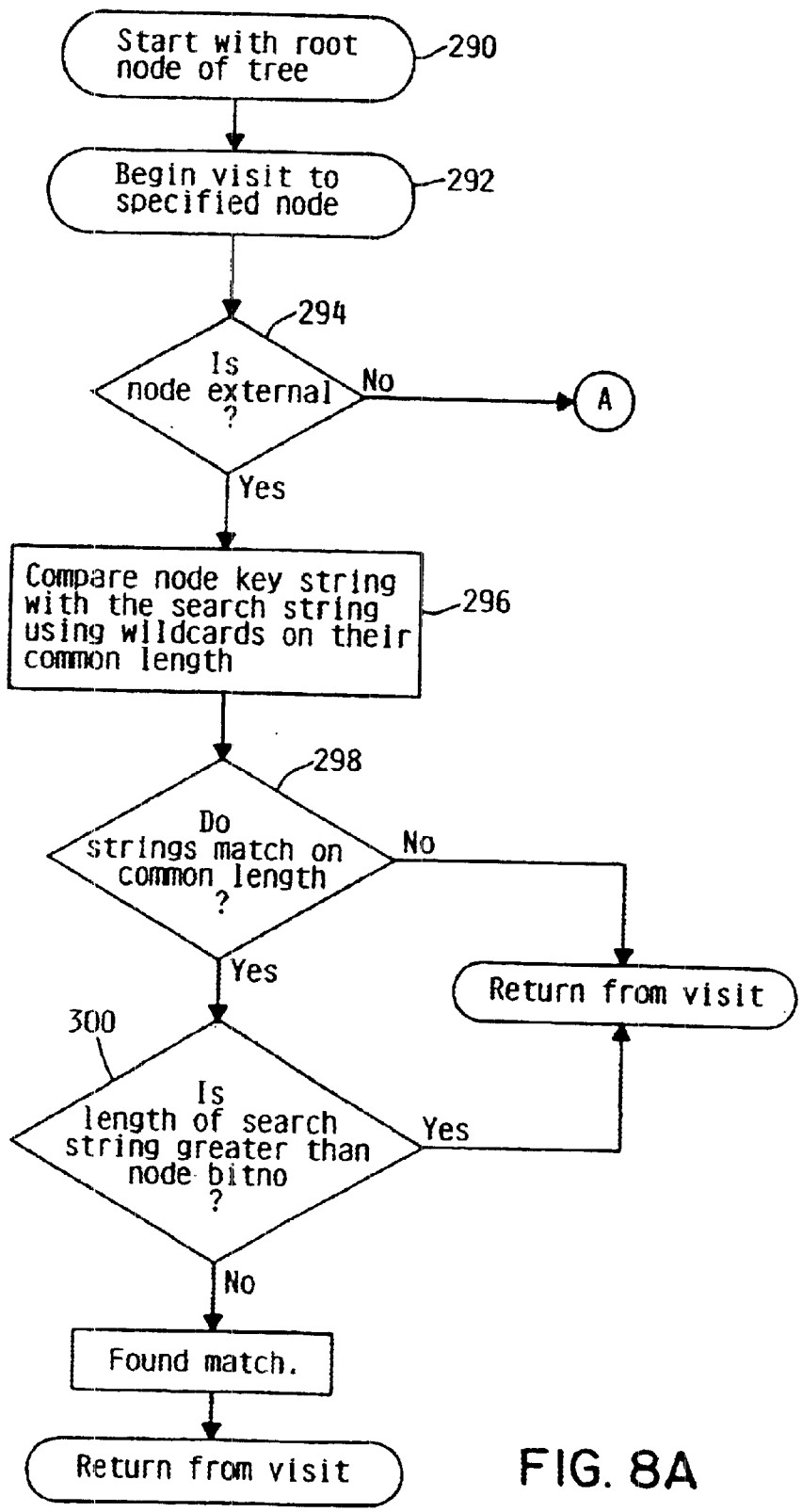
FIG. 8 is a flow chart illustrating a modified Patricia Tree of FIG. 1, with wildcard and epsilon children, including a search procedure with the All flag and Short Length filter.
Figure 8B:
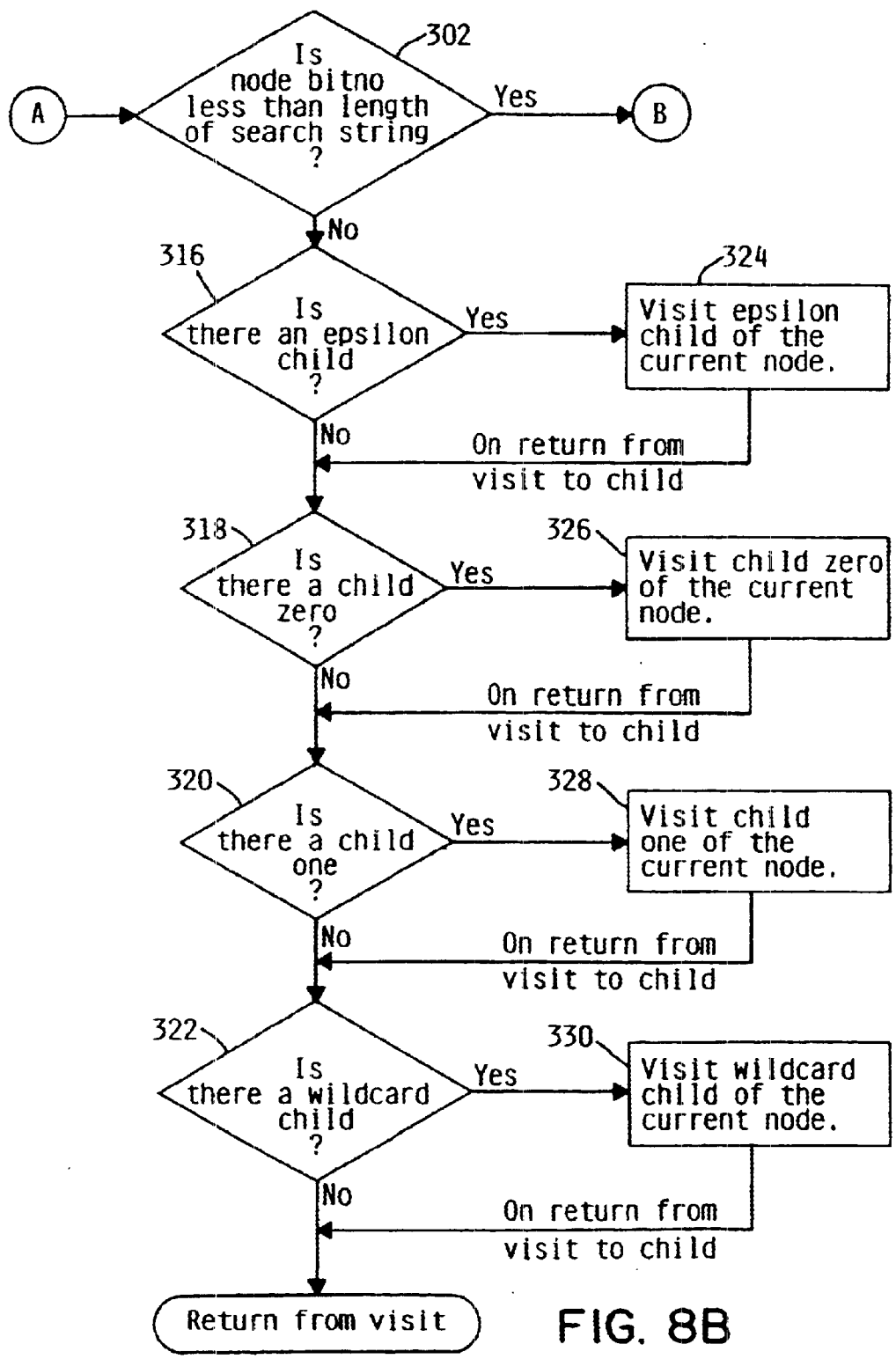
Figure 8C:
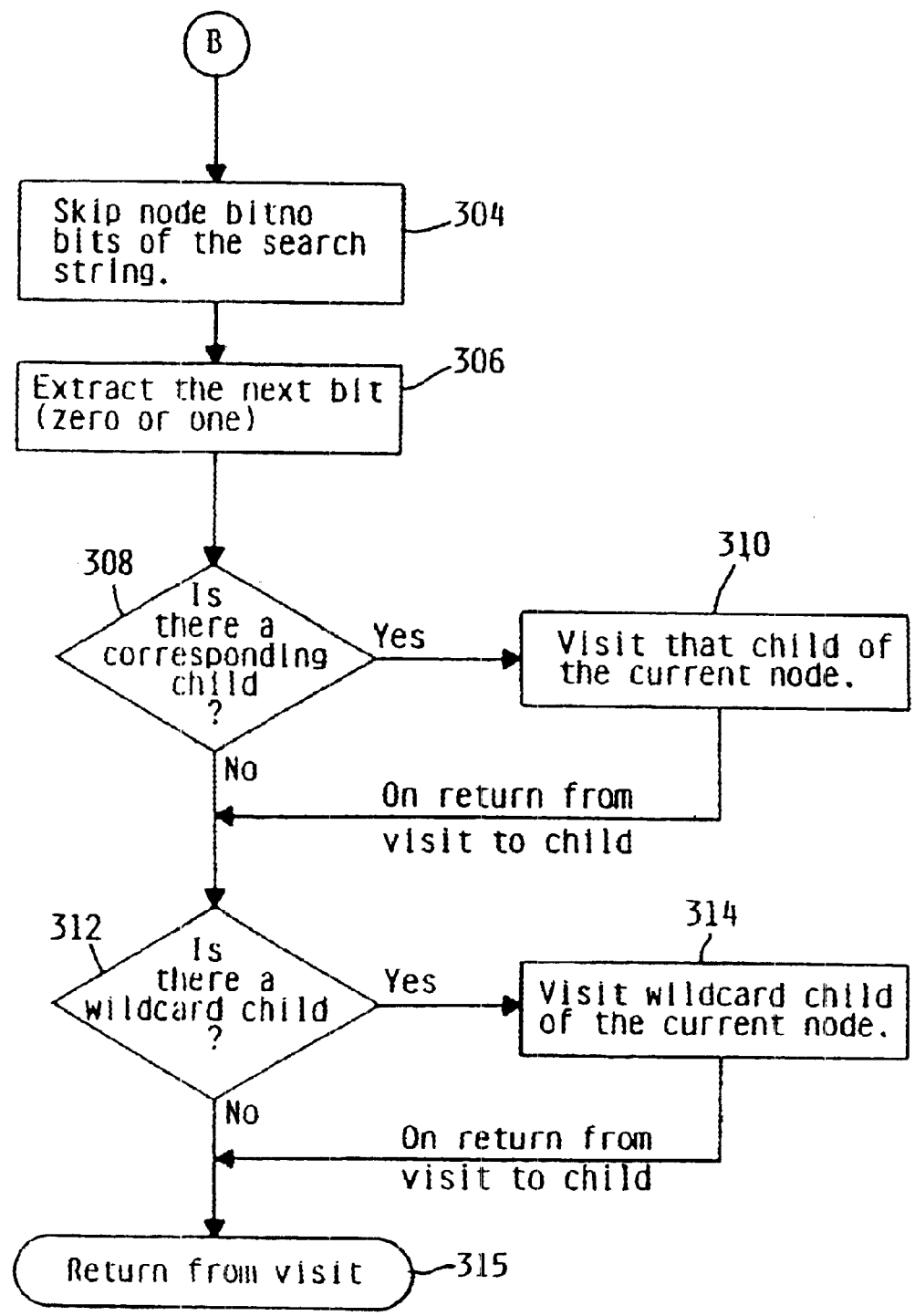

FIG. 8, is an illustration of the search procedure for a key string having an ALL flag and a SHORT length filter. As with the classic Patricia Tree, the search is initiated at the root node of the tree 290, which in the beginning of the search is the first node specified 292, followed by an initial test 294 to determine if this node is an external node. If the visited node is an external node, a comparison 296 of the node key string with the search string using wildcard values on their common length is conducted. If the node key string and the search string match on the common length 298, and if the length of the node key string is not greater than the node bit number 300, the node is considered a match.

If the node being visited is determined not to be an external node, the node bit number is compared to the length of the search string. If the bit number is less than the length of the search string, then the search skips that many bits 304, and extracts the next bit 306 from the key string specified node, has a child corresponding to the bit extracted from the key string 308, i.e. if the extracted bit value is "0" and the node has a zero child, then the child of the current node is visited 310. In addition, if there is a corresponding wildcard child for the identified bit position 312, then the wildcard child of the current node is visited 314 as well. Following the visits 310, 314 to the corresponding child and wildcard child of the identified node, a return 315 from the visit to the current node is conducted. However, if at 302, it is determined that the bit position at the visited node is not less than the length of the data search string, it must be ascertained if there is a corresponding epsilon child 316, zero child 318, one child 320, and wildcard child 322 at the visited node. Each of the children present at this node are then visited 324, 326, 328 and 330, respectively. During the visit to each of the children, the algorithm resumes 292 setting the child as the specified node. Accordingly, the SHORT filter modifies the results of the searching algorithm to ensure that the length of the matched search string is not greater than the node bit number.

Figure 9A:
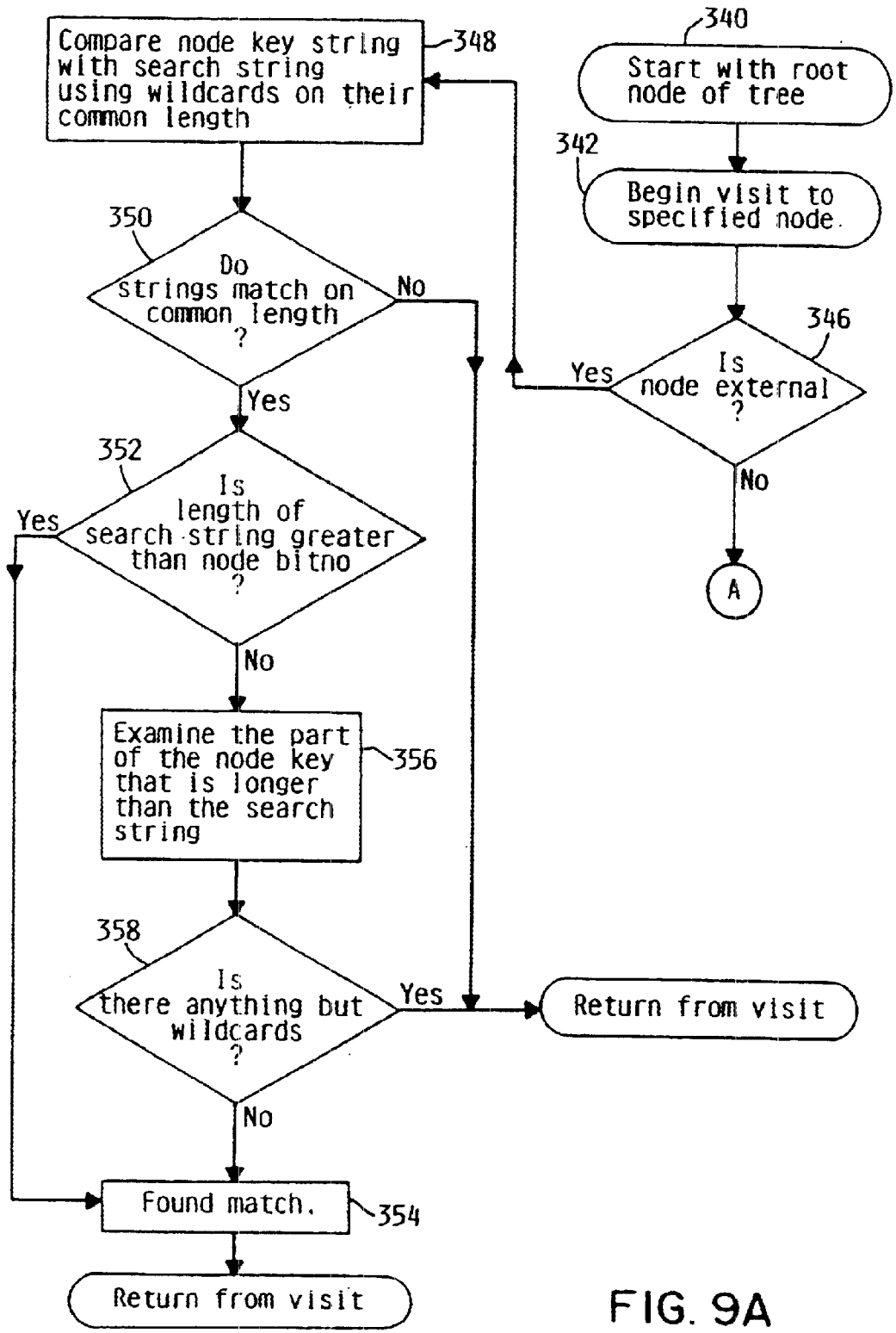
FIG. 9 is a flow chart illustrating a modified Patricia Tree of FIG. 1, with wildcard and epsilon children, including a search procedure with the All flag and Not Equal Length filter.
Figure 9B:
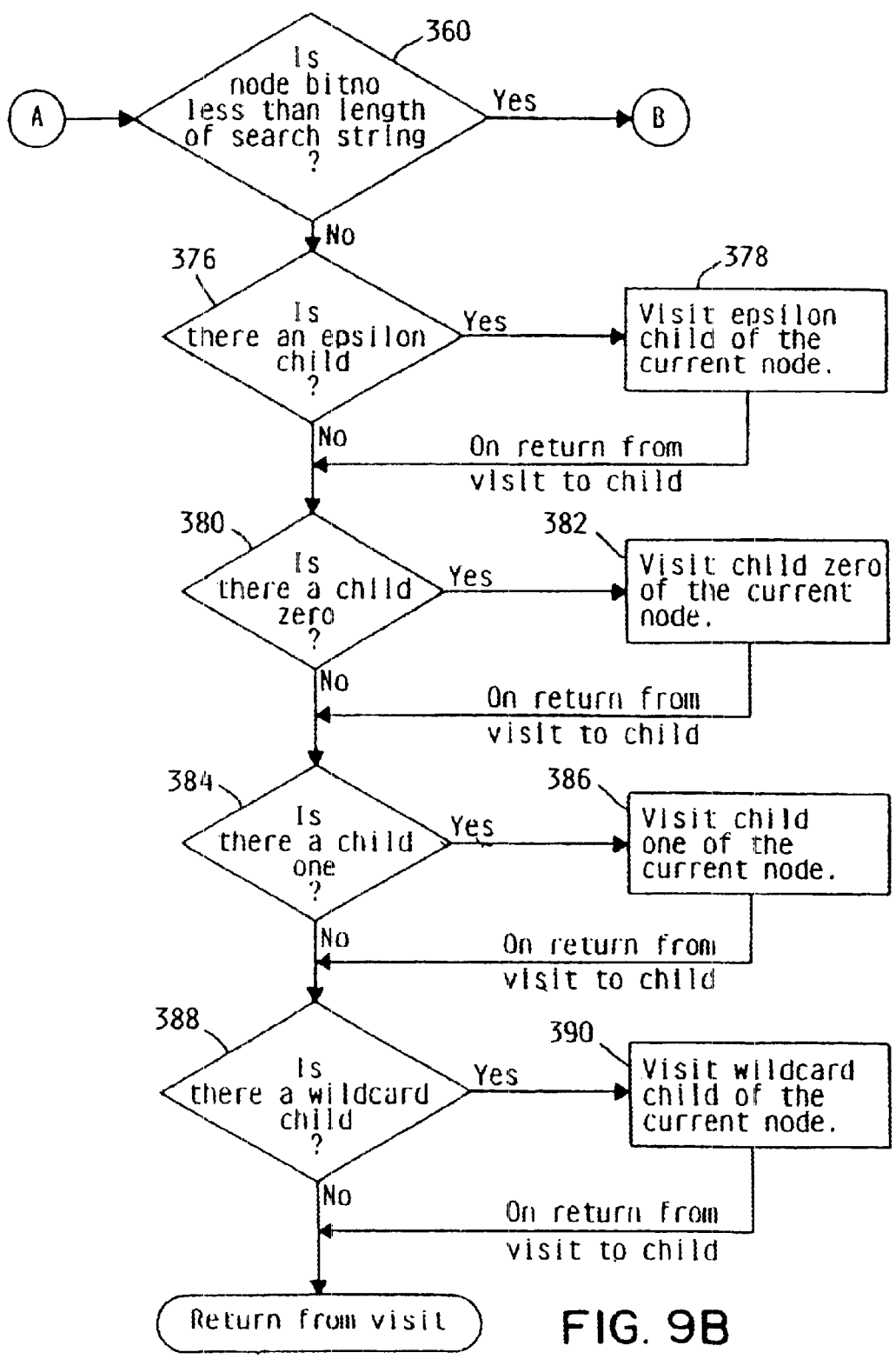
Figure 9C:
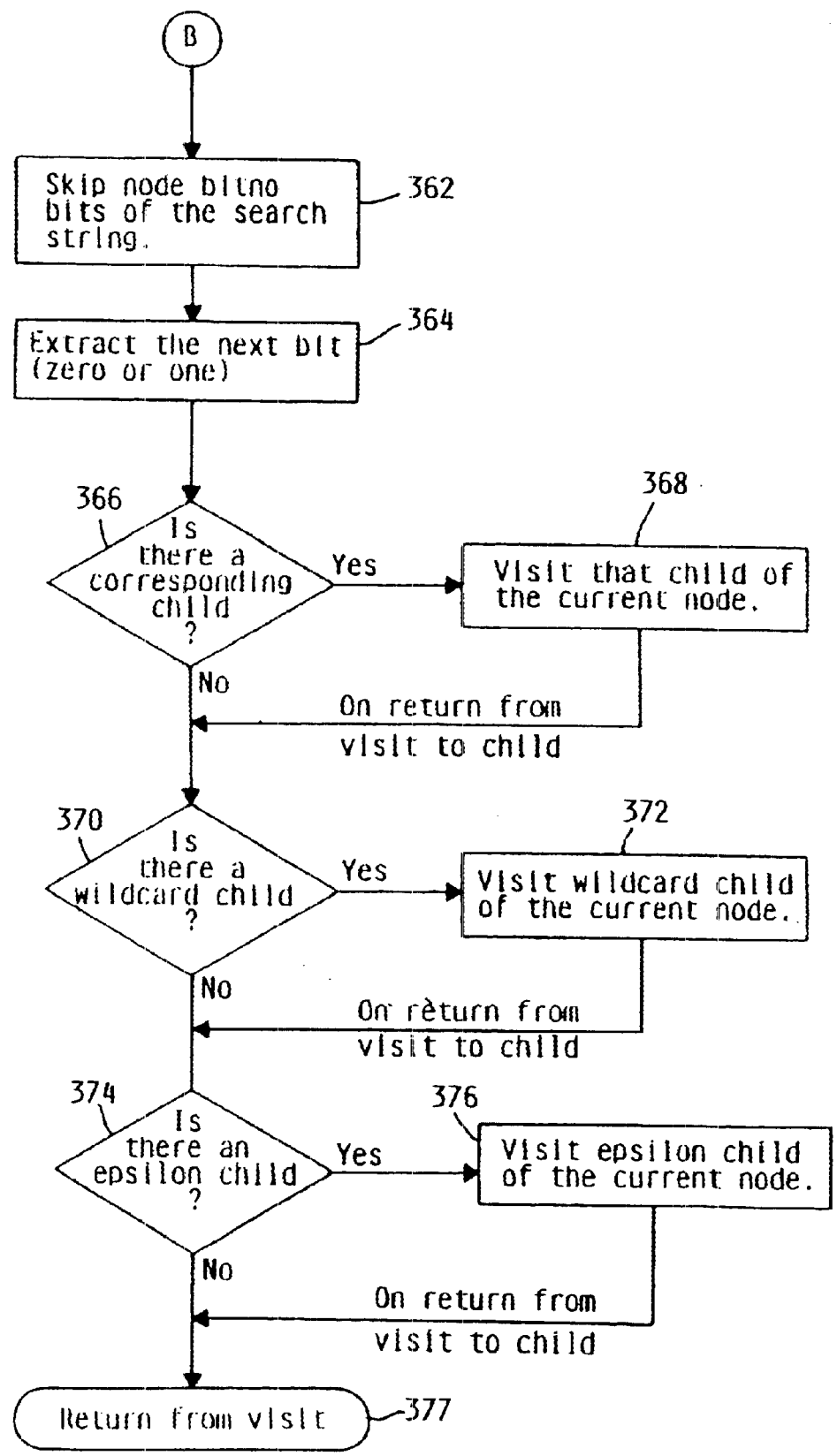

FIG. 9, is an illustration of search procedure for a key string having an ALL flag and a NOT EQUAL length filter. As with the classic Patricia Tree, the search is initiated at the root node of the tree 340, which in the beginning of the search is the first node specified 342 followed by an initial test 346 to determine if this node is an external node. If the visited node is an external node, a comparison 348 of the node key string with the search string using wildcard values on their common length is conducted. If the node key string and the search string match on the common 352 length 350, the length of the search string is compared to the bit number of the current node. If the search string is longer, the search string and the node key string match 354. If the search string is shorter, the part of the node key string that is longer than the search string is examined 356 for wildcard positions. No wildcards were used in that part of the key string, then the search string and the node key string match. However, if at 346 the node being visited is determined not to be an external node, a query 360 is conducted to determine if the bit position is less than the length of the search string. If the bit position is less than the length of the search string, then the search skips that many bits 362 and the next bit is extracted 364 from the key string. If the child corresponding to the extracted bit 366, a wildcard child 370, or an epsilon child 374 are present, they are each visited 368, 372, 376, respectively. Following the visits 368, 372 and 376 to the children, a return 377 from the visit to the current node is conducted. However, if at 360, it is determined that the bit position is not less than the length of the data search string, it must be ascertained if there is a corresponding epsilon child 376, zero child 380, one child 384, or wildcard child 388 at the visited node. Each of the children present at this node are visited, 378, 382, 286 and 390, respectively. During the visit to each of the children, the algorithm resumes at setting the 342 child as the specified node. Accordingly, the NOT EQUAL filter modifies the results of the searching algorithm to ensure that the length of the matched search string is not equal in length to the node key string.

Figure 10A:
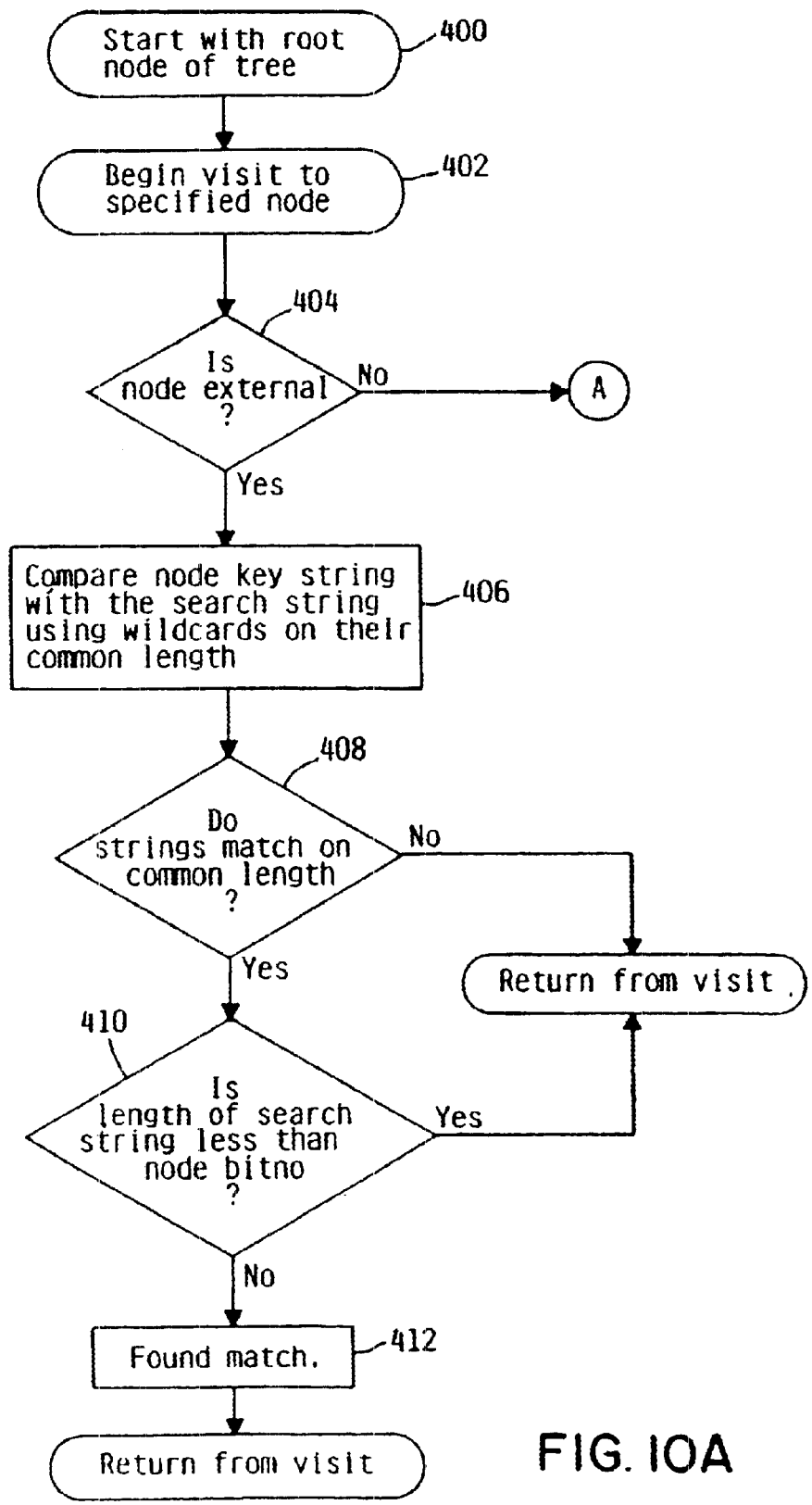
FIG. 10 is a flow chart illustrating a modified Patricia Tree of FIG. 1, with wildcard and epsilon children, including a search procedure with the All flag and the Long Length filter.
Figure 10B:
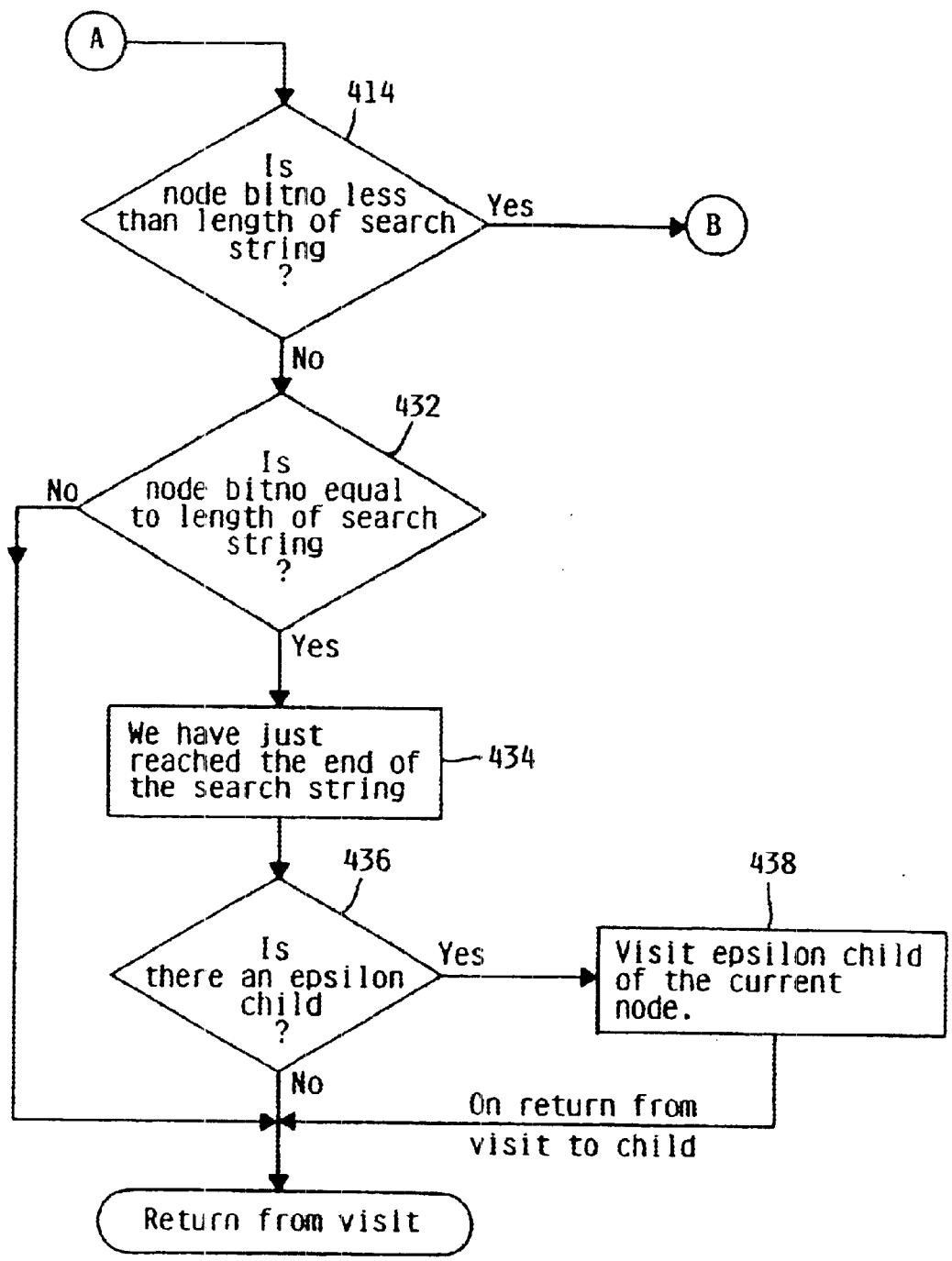
Figure 10C:
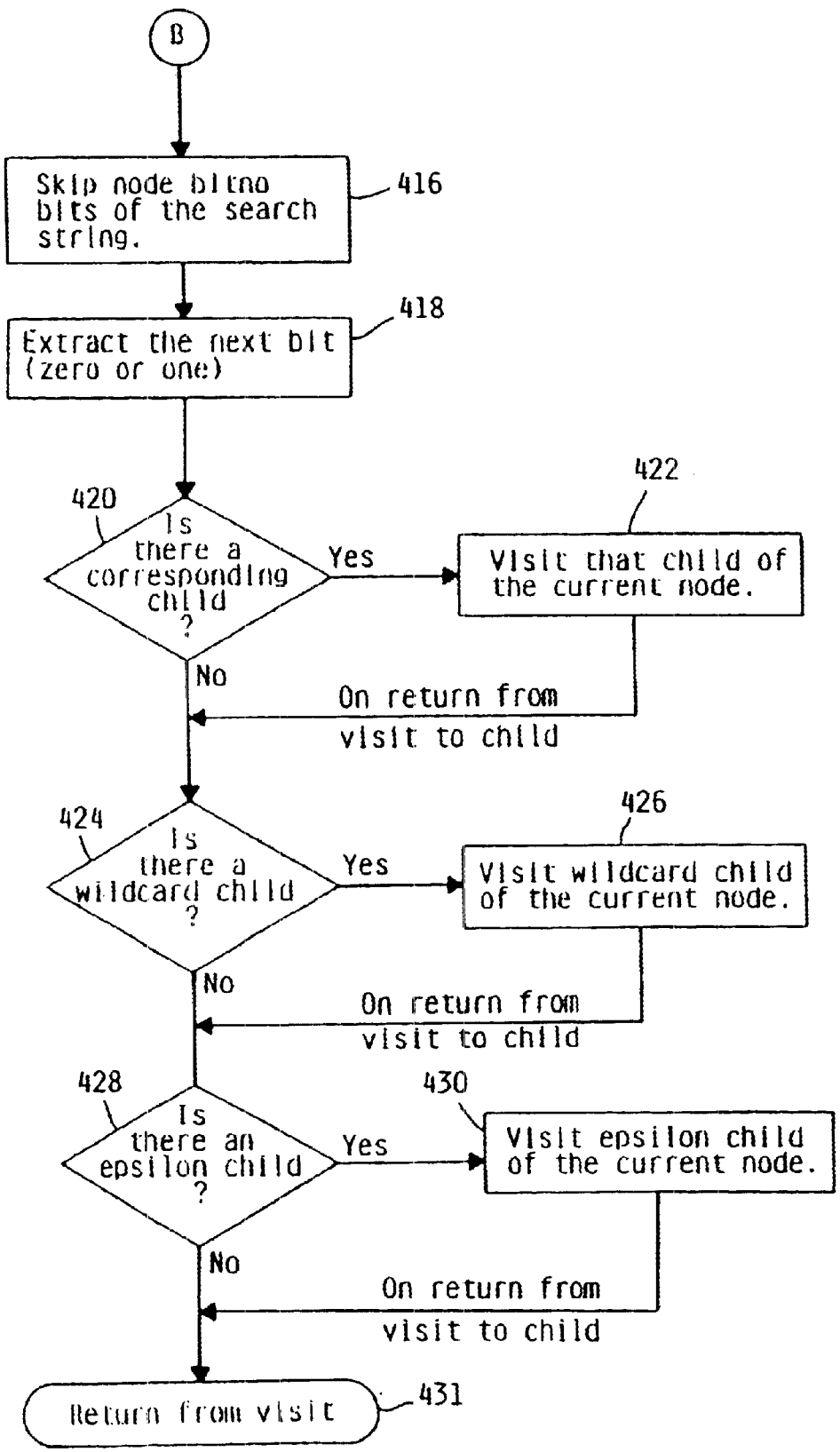

FIG. 10, is an illustration of the modified Patricia Tree of the preferred embodiment incorporating a search procedure for a key string having an ALL flag and a LONG length filter. As with the classic Patricia Tree, the search is initiated at the root node of the tree 400, which in the beginning of the search is the first node specified 402, followed by an initial test 404 to determine if this node is an external node. If the visited node is an external node, a comparison 406 of the node key string with the search string using wildcard values on their common length is conducted. If the node key string and the search string match on the common length 408, a query 410 is conducted to determine if the length of the search string is less than the corresponding bit position. Since the parameters of the algorithm have a LONG length filter, then only if the answer to the query 410 is negative do the search string and the node key string match 412. However, if the node being visited is determined at 404 not to be an external node, a query 414 is conducted to determine if the bit position is less than the length of the search string. If the bit position is less than the length of the search string, then the search proceeds to the next node bit number specified 416. At this step, the next bit is extracted 418 from the key string and the child of the current node is visited 422. In addition, a test 424 is conducted to determine if there is a wildcard child for the identified bit position and if so the wildcard child is visited 426, followed by an additional test 428 to determine if there is an epsilon child for the identified bit position and if so that epsilon child is then visited 430. Following the visits 422, 426, 430 to the corresponding zero or one child, and/or epsilon and wildcard children of the identified node, a return 431 from the visit(s) to 402 is conducted. If the bits match at the specified positions, then the algorithm is repeated from 402. However, if at 414, it is determined that the bit position is not less than the length of the data search string, it must be ascertained 432 if the bit position is equal in length to the search string. If the bit position is equal to the length of the search string, then it is determined that the end of the search string has been reached 434, and if there is an epsilon child present 436 at the specified bit position, then the epsilon child is visited and a return to 402 follows. In addition, if the answer to 432 is negative, again a visit 438 to a corresponding epsilon child at the bit position is conducted if it is present. Accordingly, the LONG length filter modifies the results of the searching algorithm to ensure that the length of the matched search string is greater in length than the node key string being searched.

Figure 11A:
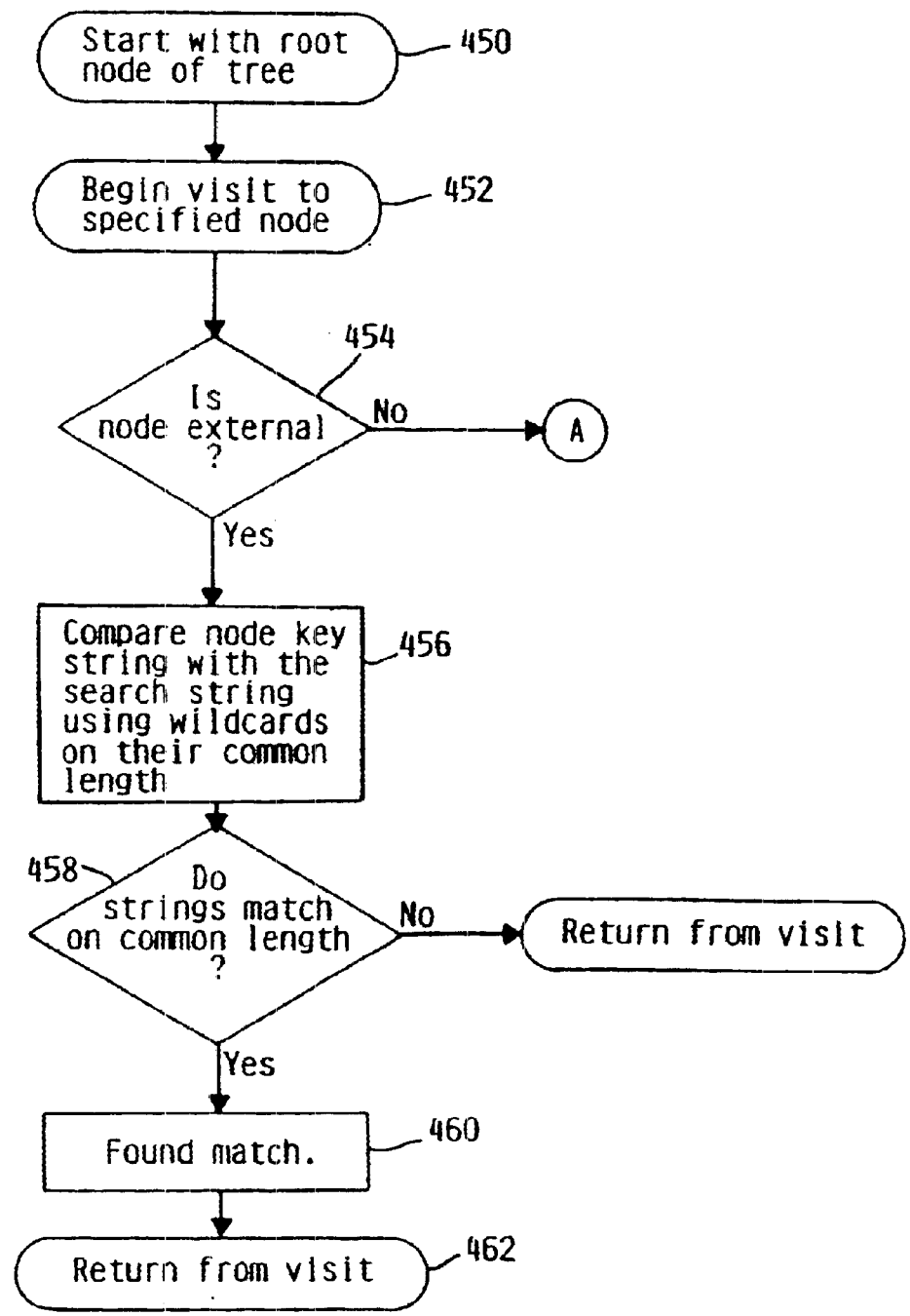
FIG. 11 is a flow chart illustrating the modified Patricia Tree of FIG. 1, with wildcard and epsilon children, including a search procedure with the All flag and the Short or Long Length combination filter.
Figure 11B:
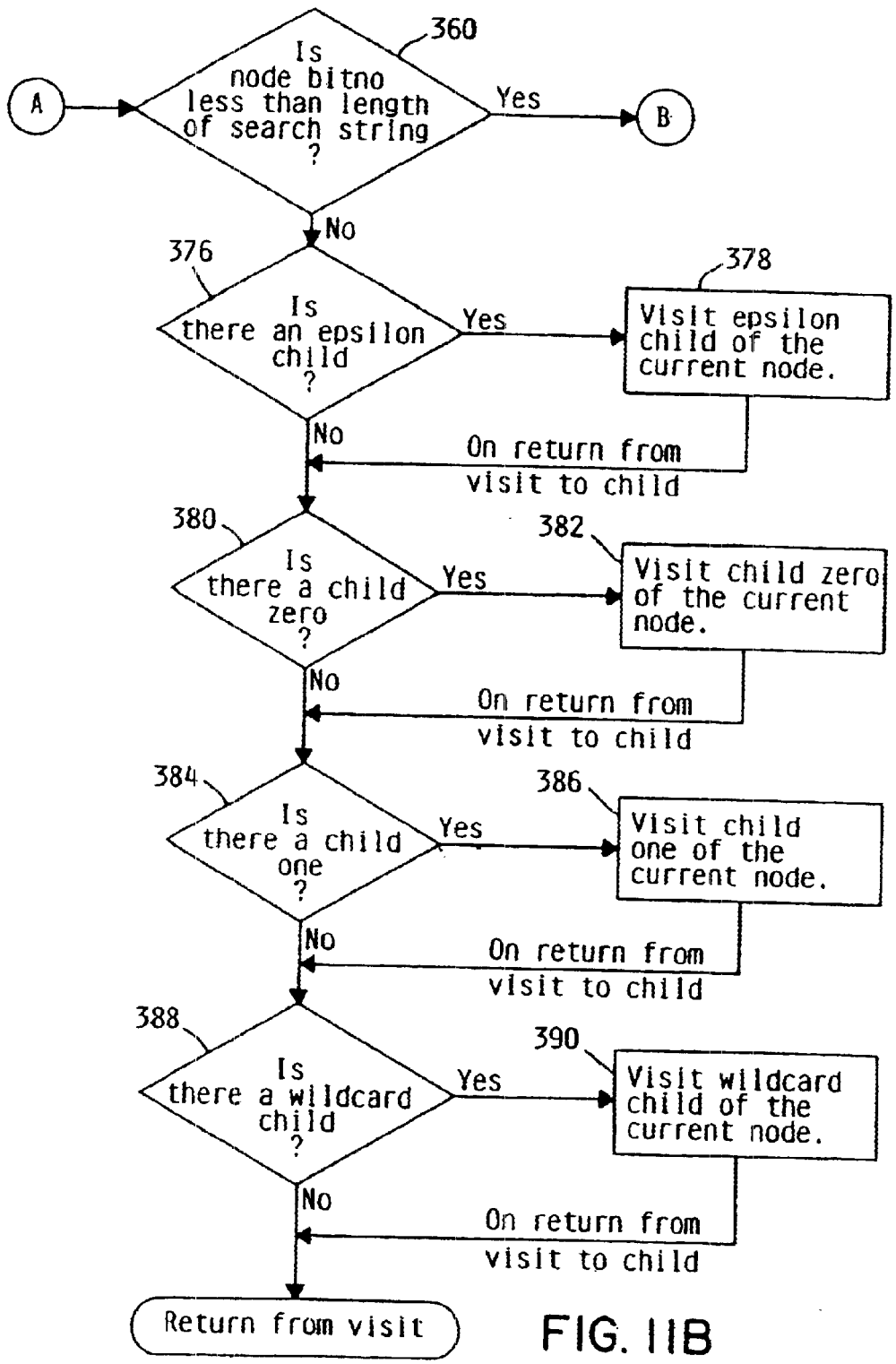
Figure 11C:
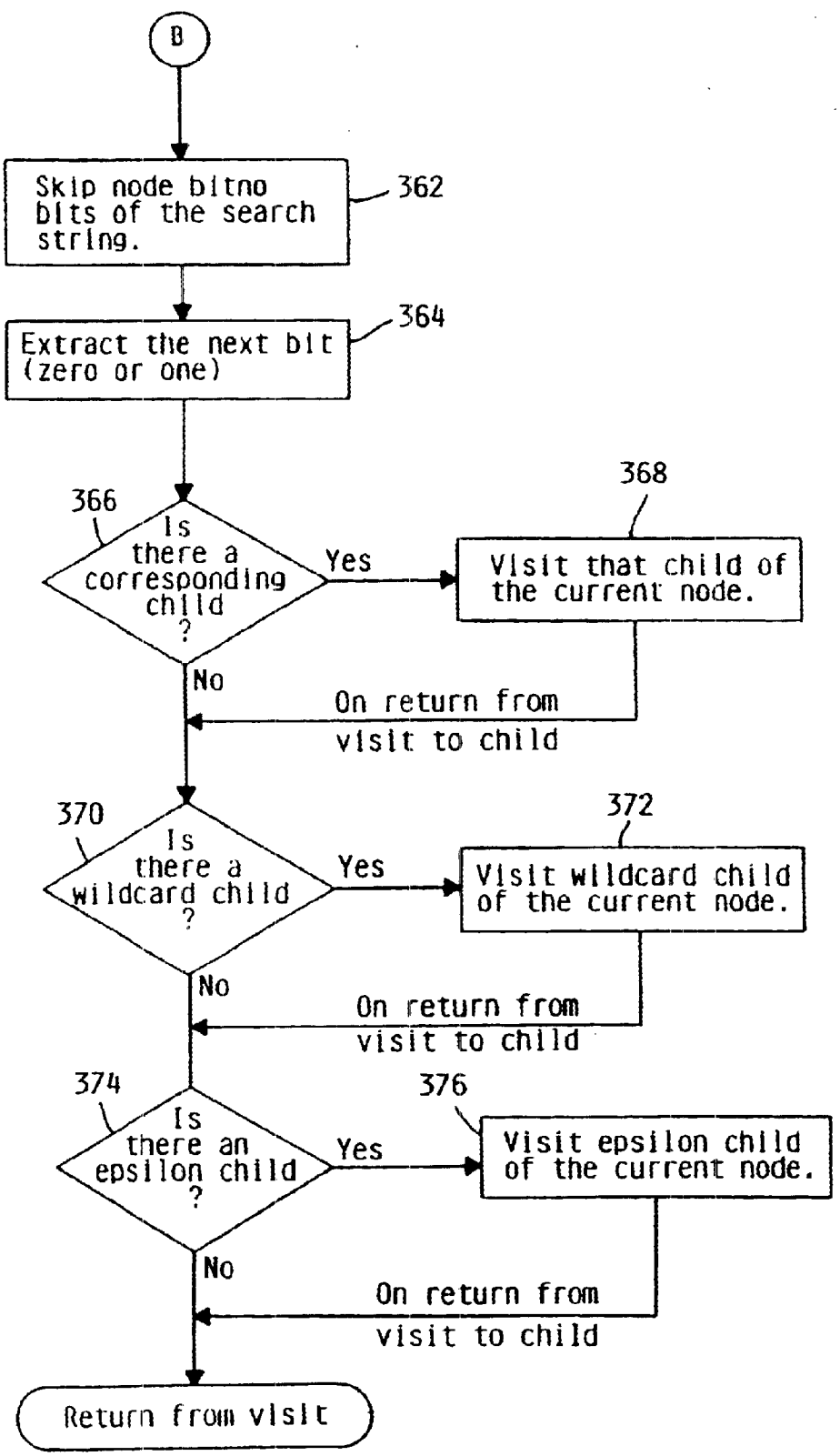
Figure 12A:
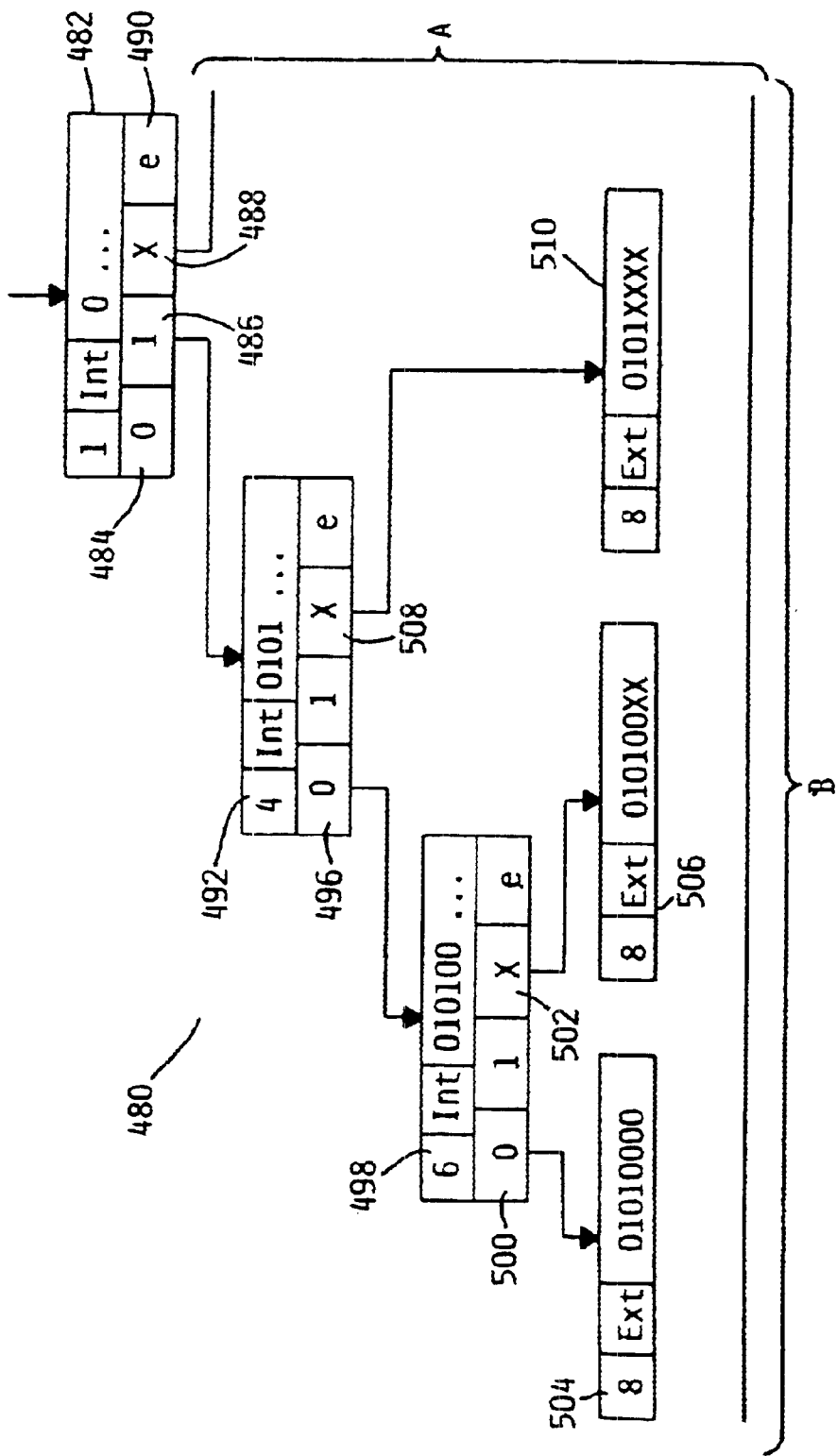
FIG. 12 is an example of a search conducted with the modified Patricia Tree of FIG. 1, with wildcard and epsilon children including an All flag and Equal Length filter
Figure 12C:
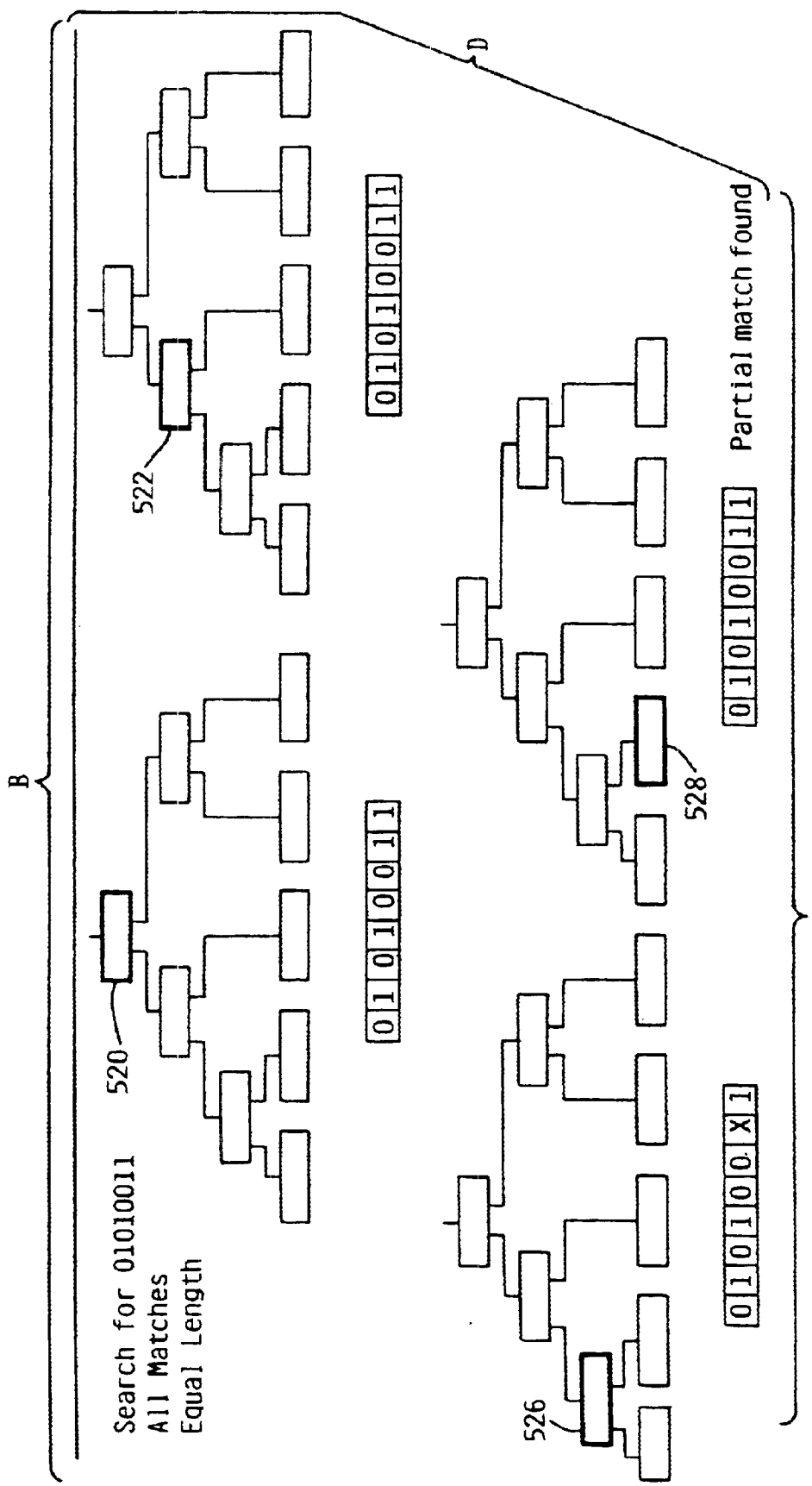
Figure 12D:
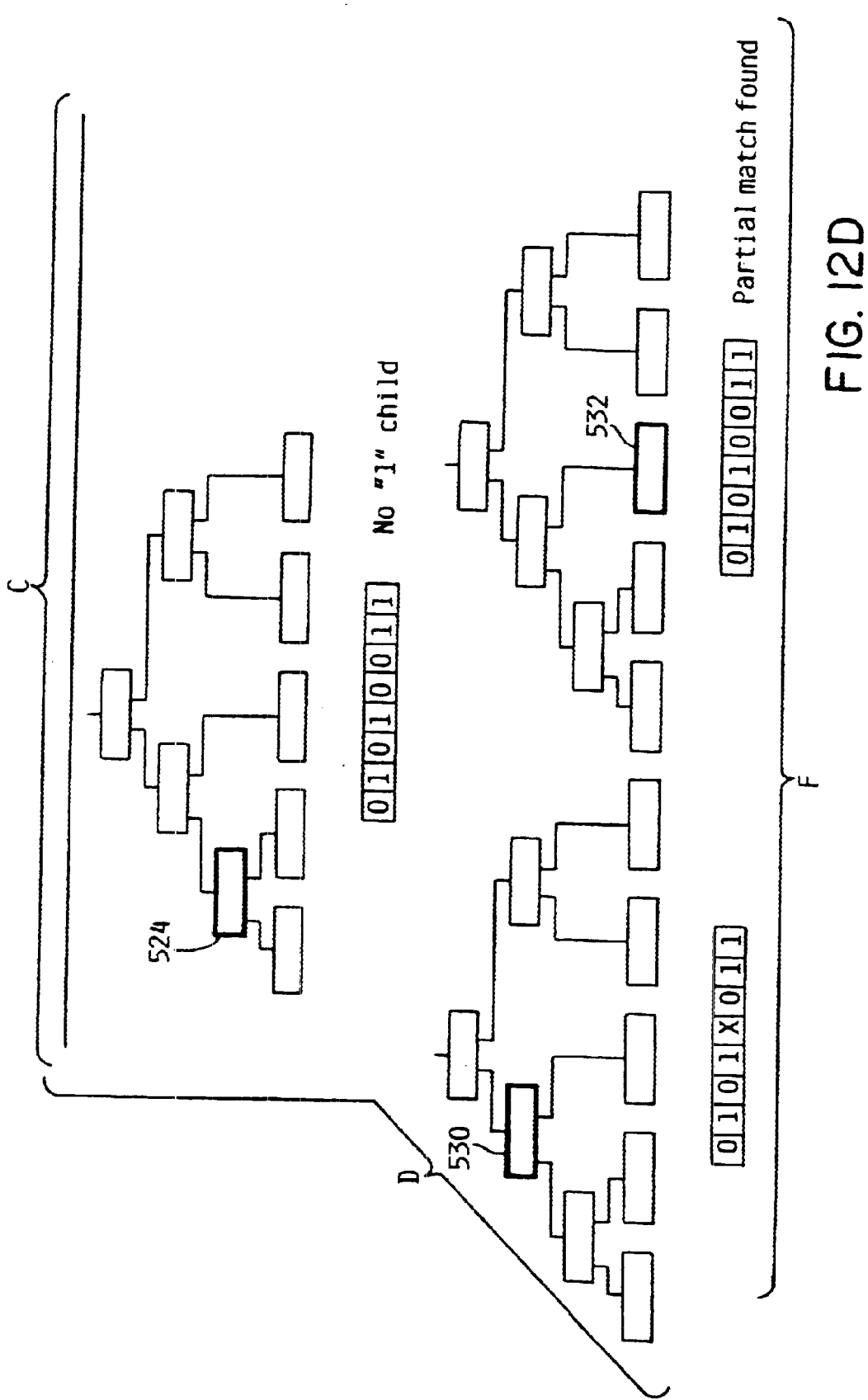
Figure 12E:
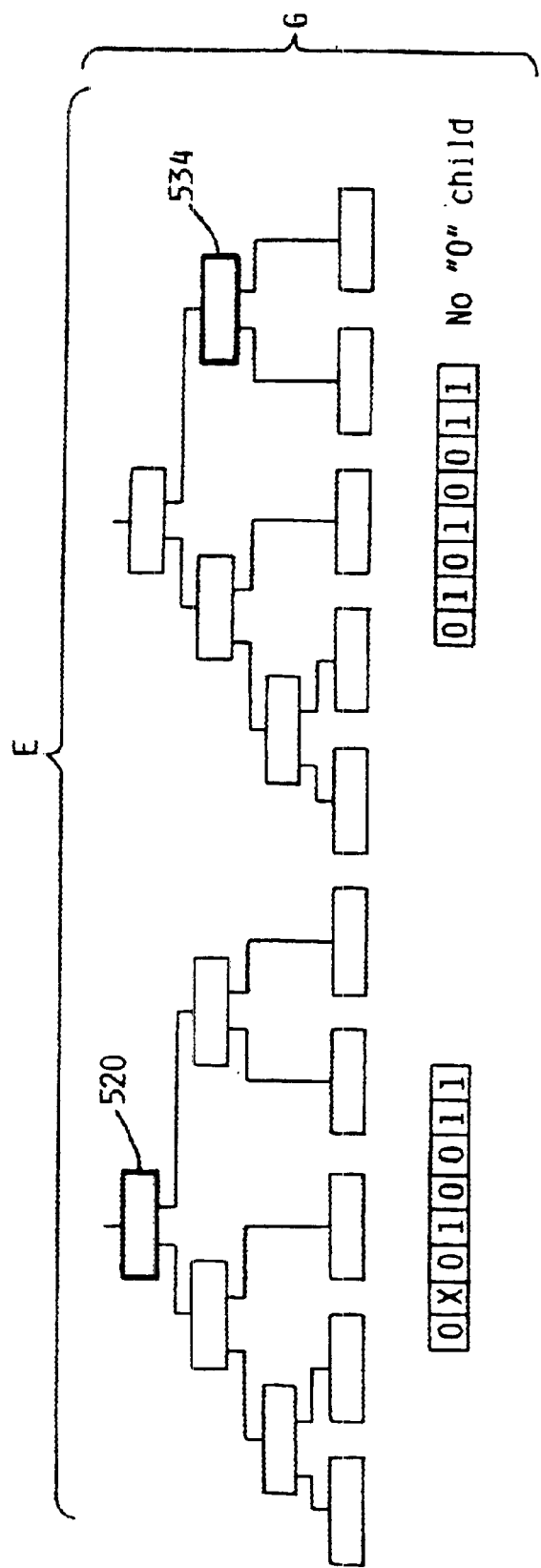
Figure 12F:
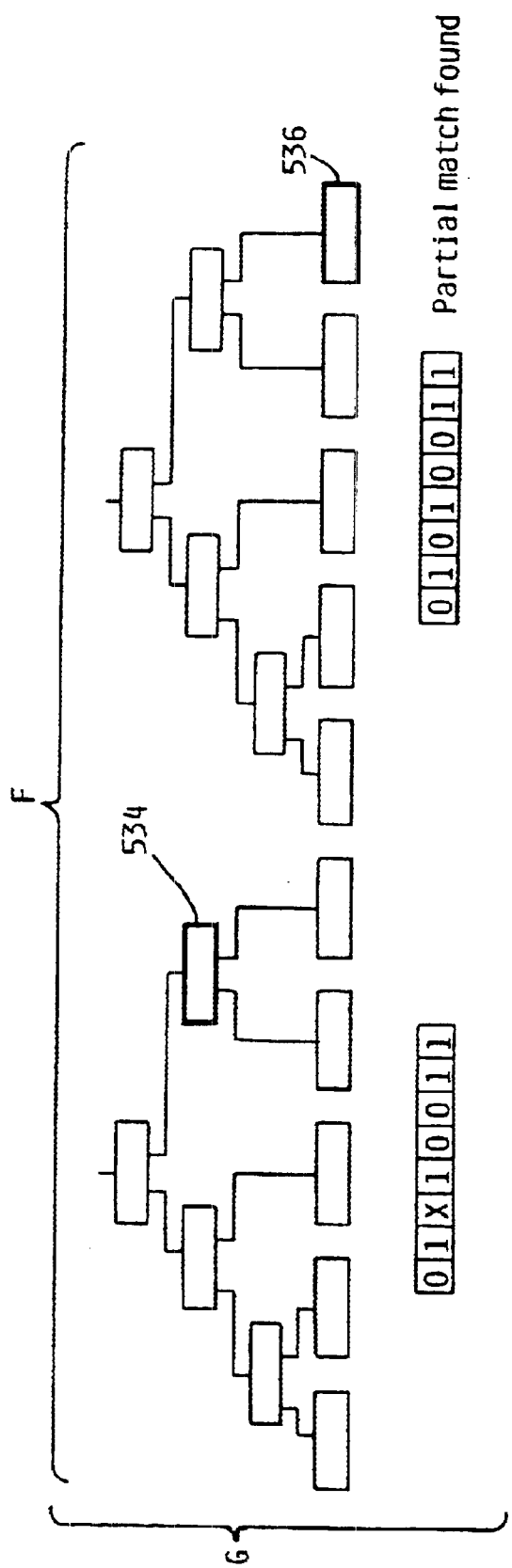
Figure 13A:
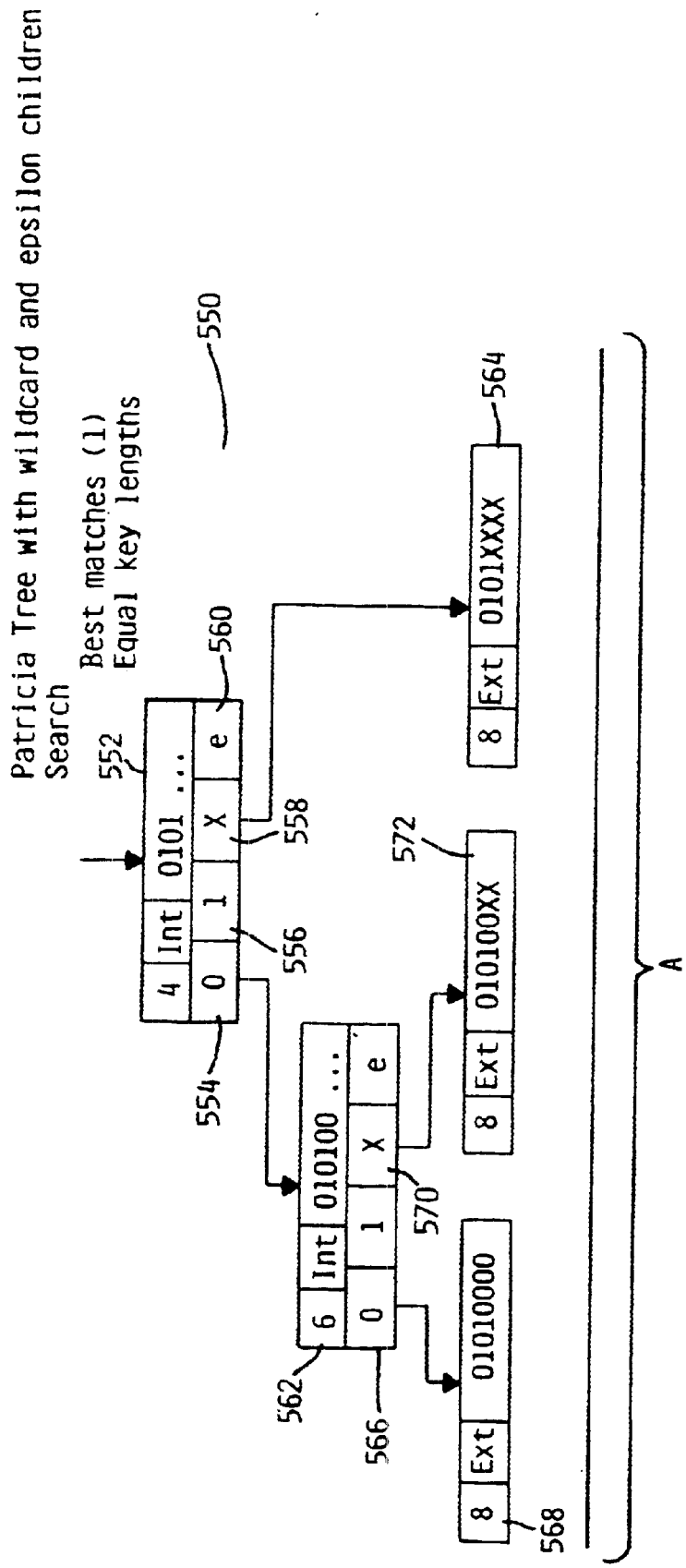
FIG. 13 is an example of a search conducted with the modified Patricia Tree of FIG. 1, with wildcard and epsilon children including a Best flag and an Equal Length filter.
Figure 13B:
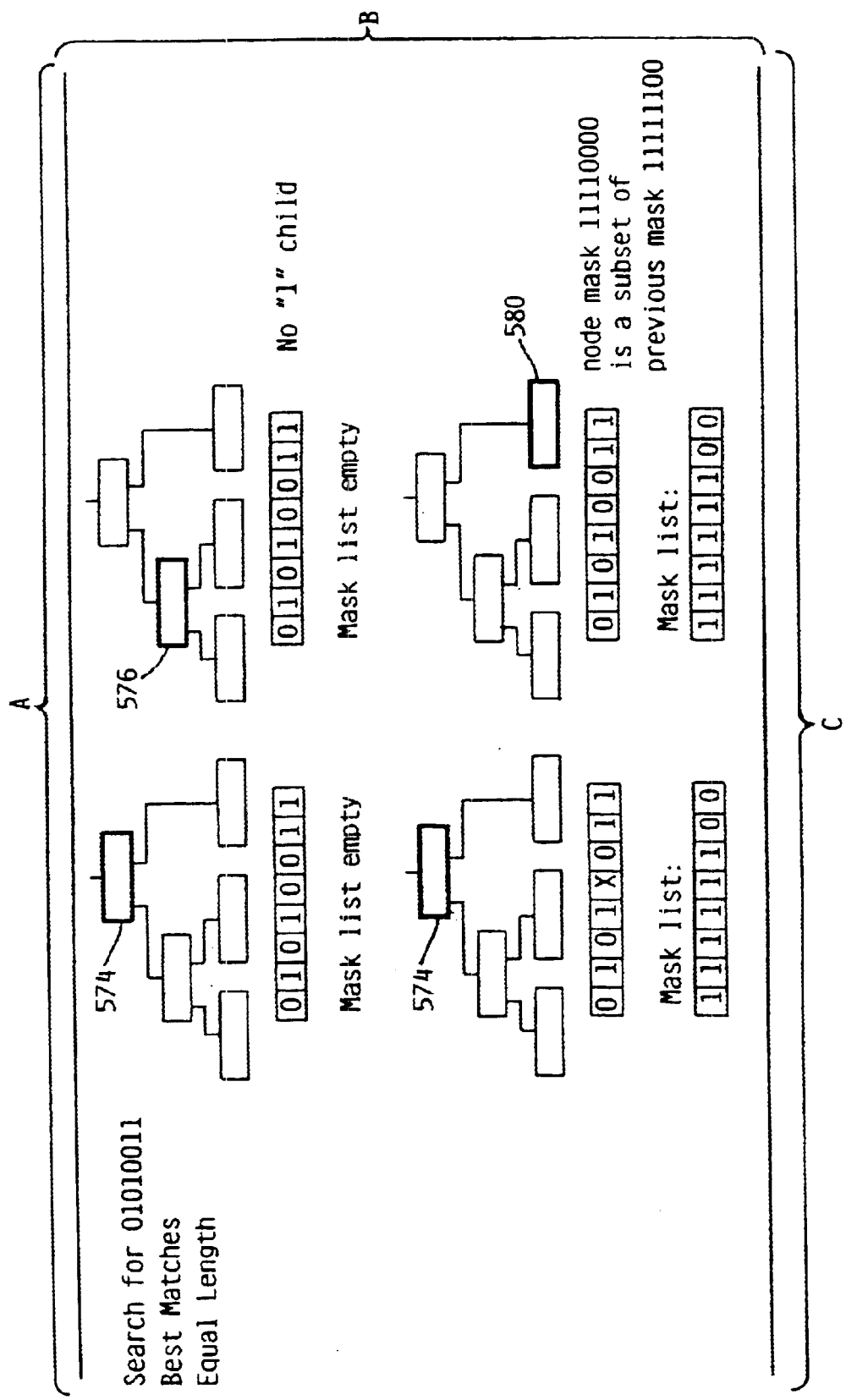
Figure 13C:
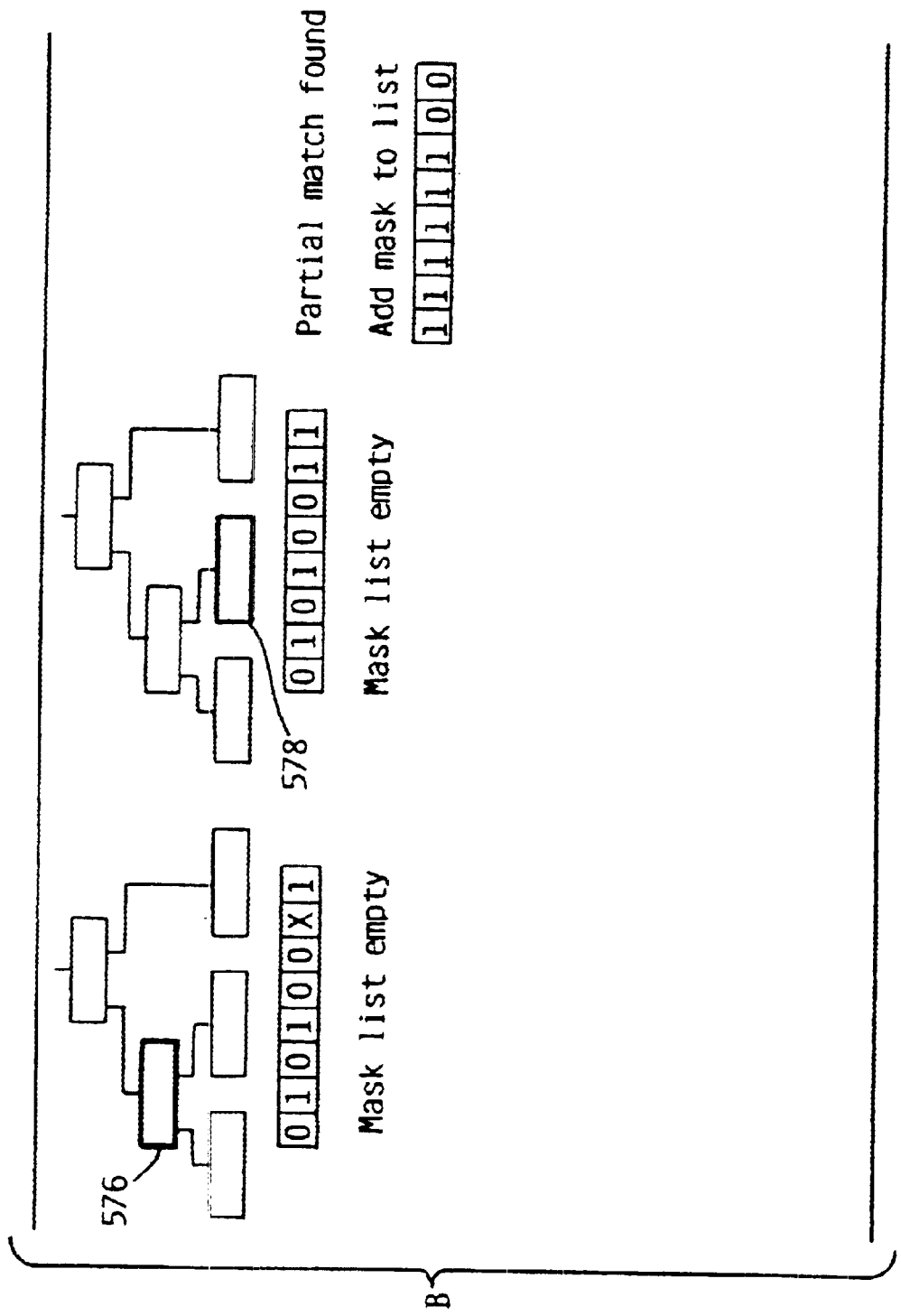
Figure 13D:
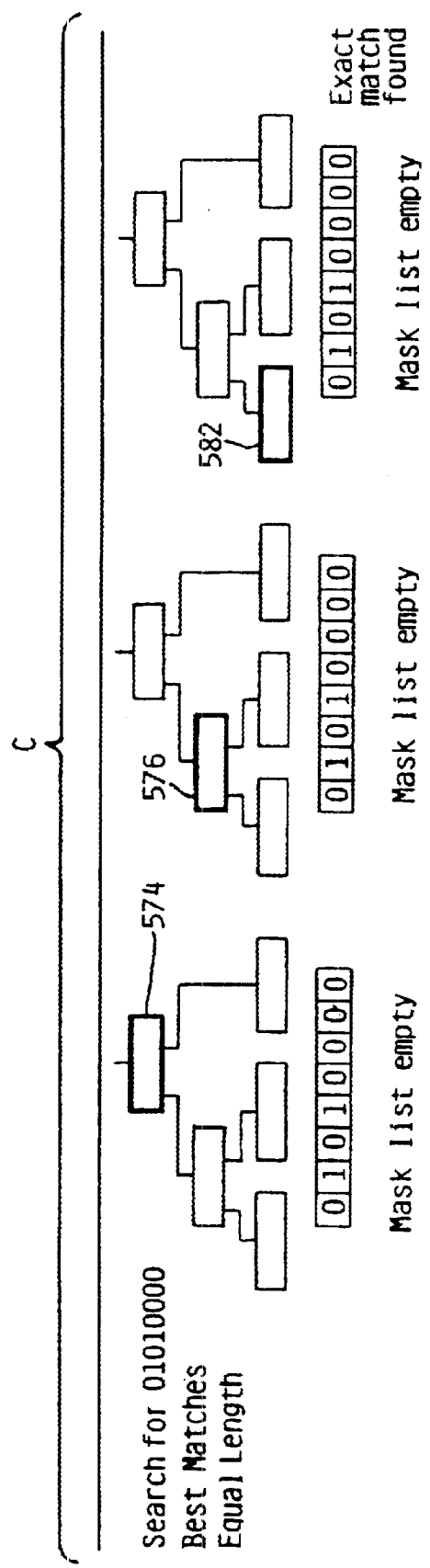
Figure 14A:
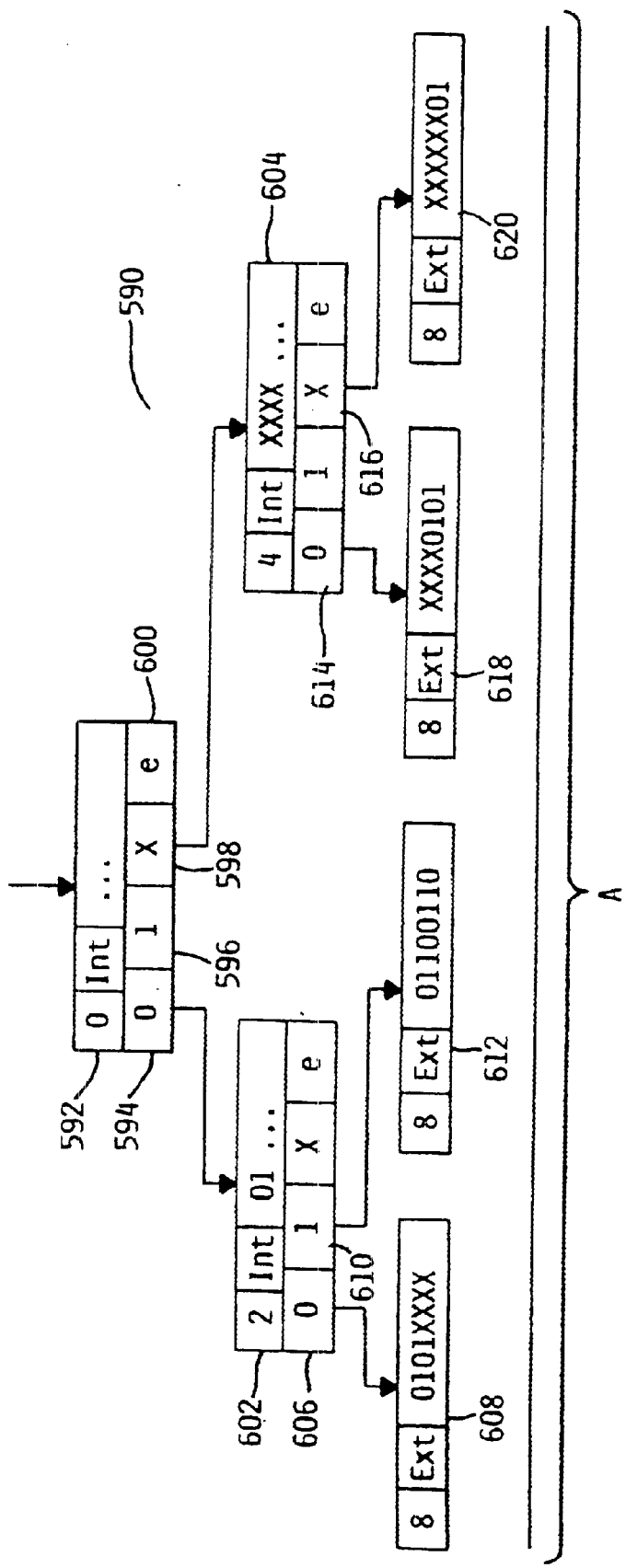
FIG. 14 is a second example of a search conducted with the modified Patricia Tree of FIG. 1, with wildcard and epsilon children including a Best flag and an Equal Length filter.
Figure 14B:
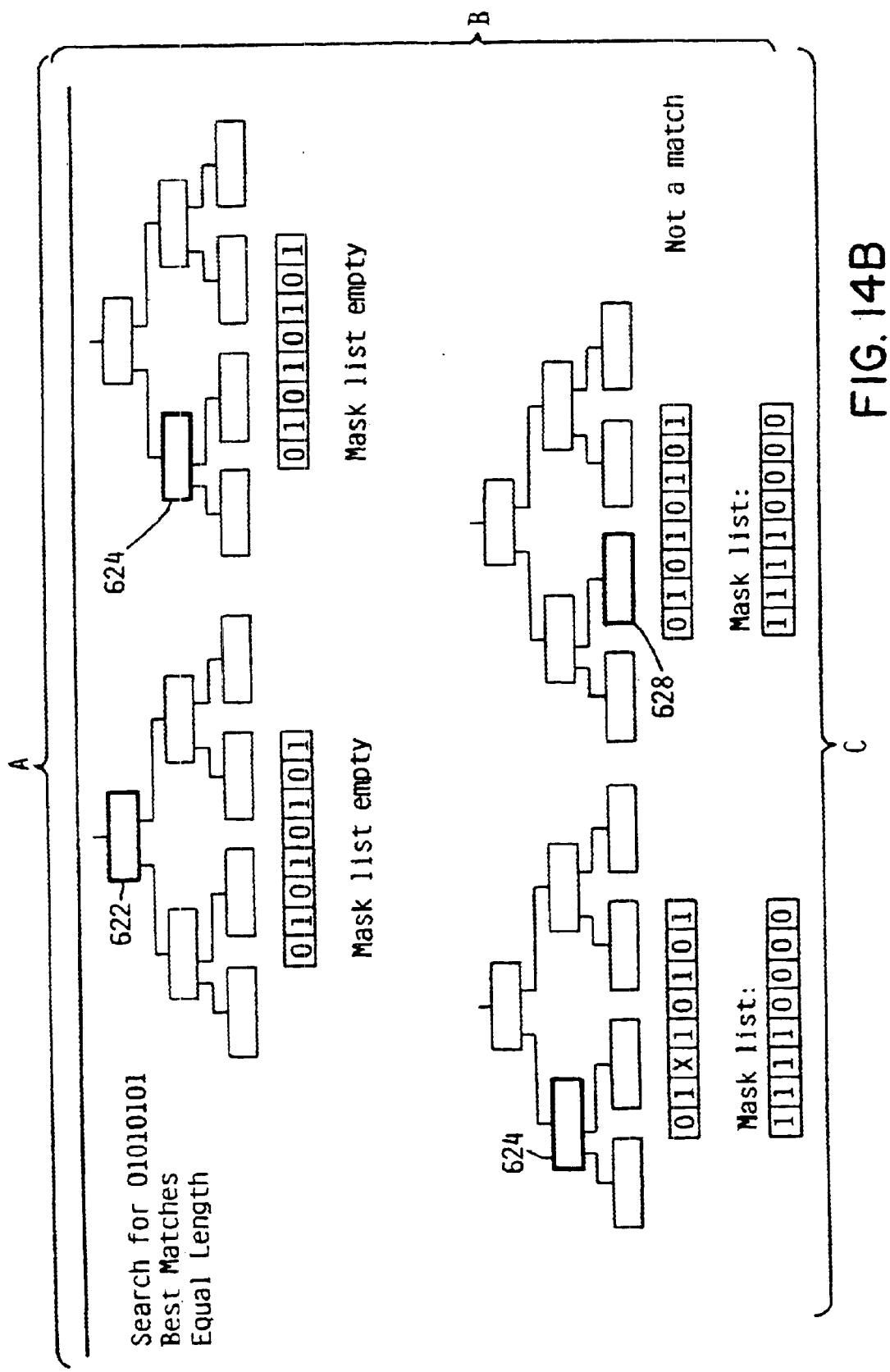
Figure 14C:
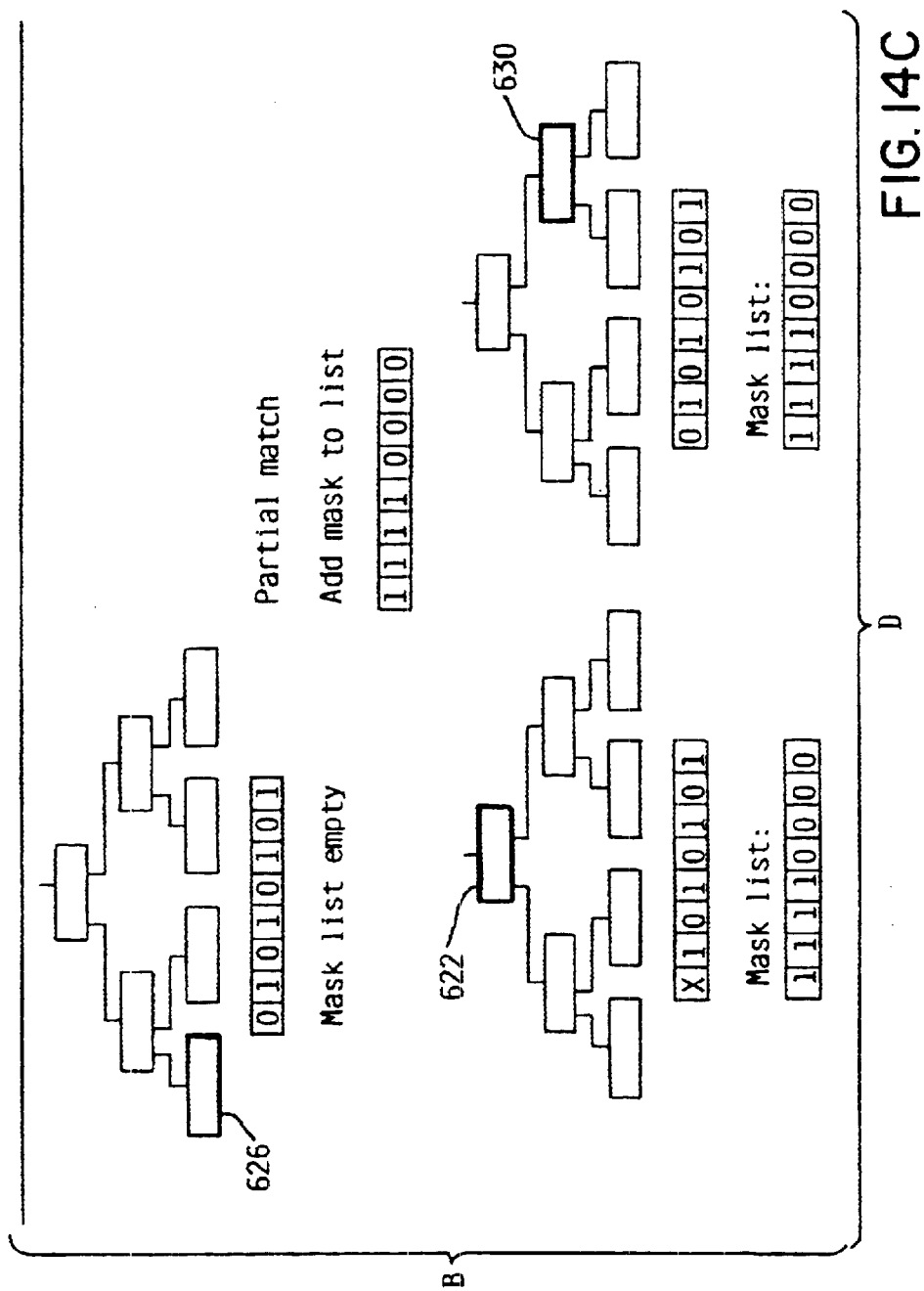
Figure 14D:
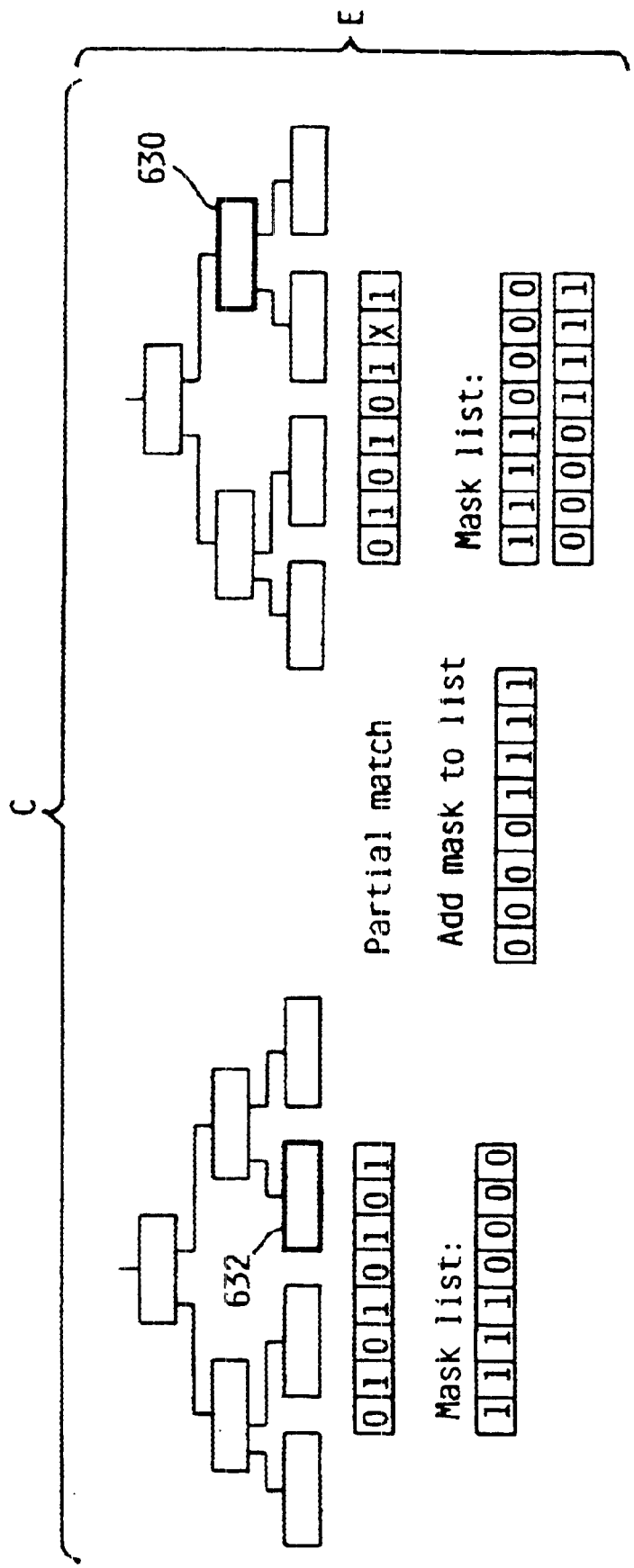
Figure 14E:
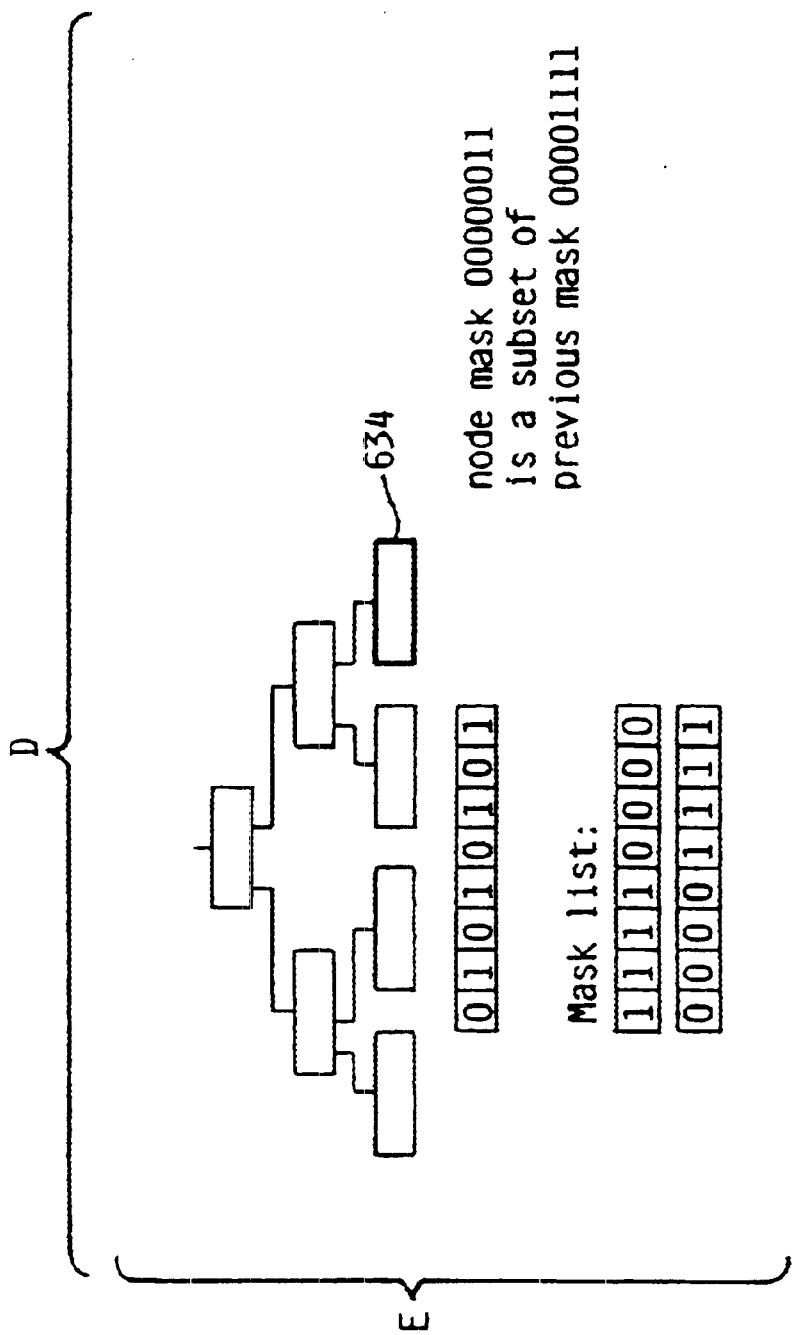

FIG. 11, is an illustration of the modified Patricia Tree of the preferred embodiment incorporating a search procedure for a key string having an ALL flag and a SHORT or LONG length filter. As with the classic Patricia Tree, the search is initiated at the root node 450, which in the beginning of the search is the first node specified 452, followed by an initial test 454 to determine if this node is an external node. This method is identical to the method illustrated in FIG. 9 for the section following the determination 454 that the node being visited is not an external node. Steps 360–390 have been identified in FIG. 11 identical to that of FIG. 9 to illustrate the similarities between the two drawing figures and the corresponding search mechanism. As such, if it is determined that the node being visited is an external node, a comparison 456 of the node key string with the search string using wildcard values on their common length is conducted. If the node key string and the search string match on the common length 458, then a match is found 460 and returned 462, and if the node key string and the search string do not match on the common length then there is no match present between the node key string and the search string. Accordingly, the LONG or SHORT filter modifies the results of the searching algorithm to ensure that if the node key string and the search string match on the common length, including wildcards, then the node key string and the search string have been determined to match.

FIG. 12 is an illustration of an example of the search of a specified string using the modified Patricia Tree of the preferred embodiment incorporating a search procedure for a key string having an ALL flag and an EQUAL filter as shown in FIG. 6. The tree structure provided is shown at 480. The root of the tree 482 requires a decision after one bit, i.e. the second position in a data string, and has zero, one, wildcard, and epsilon bit values 484, 486, 488 and 490, respectively, wherein the one bit value 486 branches to an internal node 492 requiring a decision after four bits in the key string, and the wildcard bit value 488 branches to an internal node 494 requiring a decision after two bits in the key string, and there is no data for either the zero 484 or epsilon 490 values at the root of the tree. Moving down the tree, the zero bit value 496 of 492 branches to internal node number six 498 at bit position six, which has both a zero value 500 and a wildcard value 502, wherein each of the children 500 and 502 branch to an external node. In addition, the wildcard child 508 of 492 branches to an external node 510 at bit position eight. The wildcard value 502 of 498 branches to an external node 506 at the eight bit position and the zero value of 498 branches to an external node 504 at the eight bit position. Finally, internal node 494 branching from the wildcard value 488 of 482 has both a one value 512 and a wildcard value 514 which both lead to external nodes 516 and 518, both at the eight bit position.

The illustrated search string in FIG. 12 is "01010011". All searches start at the root of the tree 482, 520, i.e. the first bit position representing a choice after one bit. The second bit position in the key string has a value of "1" which points to internal node 492, 522, and this node is visited. At internal node four 492, 522 with bit number four, the fifth bit in the key string is extracted and has a value of "0" which points to internal node 498, 524 with bit number six, and this nod is visited and the seventh bit is extracted which is "1". However, internal node six 498, 524 does not have a "1" one child, so the wildcard child 502 of internal node 498, 524 is visited which results in a partial match 528 of the node key string and the search string. In addition, at internal node 492, 522, the wildcard child 508 is also visited resulting in another partial match 532. Finally, at 482, 520, the wildcard child 488 is also visited, which leads the search to internal node 494, 534 with bit position two, and this node is visited and the third bit is extracted which is "0". Since the search string does not have a one child at the third bit position, the wildcard child 518, 556 is visited providing a partial match 518, 536. Accordingly, since each of the strings in the example have the same length and all of the node key strings emanated from wildcard values, each of the matches in this example are limited to returning partial matches for the search string.

FIG. 13 is an illustration of two example of the search of a specified string using the modified Patricia Tree of the preferred embodiment incorporating a search procedure for a key string having a BEST flag and an EQUAL filter as shown in corresponding FIG. 7. The tree structure provided is shown at 550. The root of the tree 552 requires a decision after four bits, i.e. the fifth position in a data string, and has zero, one, wildcard, and epsilon bit values 554, 556, 558 and 560, respectively, wherein the zero bit value 554 branches to an internal node 562 requiring a decision after six bits in the key string, and the wildcard bit value 558 branches to an external node 564 at position eight, and there is no data string for either the one 556 or epsilon 558 values at the root 552. The zero bit value 566 of 562 branches to an external node 568 at the eight bit position, and the wildcard value 570 of 562 branches to an external node 572 at the eight bit position. Finally, the wildcard value 558 of 554 branches to an external node 564 at the eight bit position.

In the first example, the mask list is empty and the search string is "01010011". All searches start at the root of the tree 552, 574, i.e. the fourth bit position representing a choice after four bits. The fifth bit in the key string has a value of zero which points to internal node 562, 576, and this node is visited. At internal node 562, 576 with bit number six, the seventh bit in the key string is extracted and has a value of "1". There is no "1" child present at 562, 576, however there is a wildcard child. The wildcard child 572, 580 of 562, 576 is visited and it is determined that it is an external node 572, 578. Since the mask list is empty and the strings match when a comparison of the node key string with the search string using wildcards returns a match, the node mask is added to the mask list. The node mask essentially converts all portions of the string that matched to one bit values, and the wildcard portions as zero values. In addition, at the root 552, 574 with bit position four, the wildcard child is visited. However, it is determined that the node mask is a subset of the previous match's mask and, as such, the node mask is classified as a subset of the previous mask. Accordingly, the best match remains the first partial match at 572, 578.

In the second example illustrated in FIG. 13, the mask list is empty and the search string is "01010000". All searches start at the root of the tree 552, 574, i. e. the fourth bit position representing a choice after four bits. The fifth bit in the string has a value of "0" which points to internal node 562, 576 and this node is visited. At internal node 562, 576 with bit position six, the seventh bit in the string is extracted and has a value of "0". The zero child 568, 582 of 562, 576 is visited, and it is determined that node 568, 582 is an external node. Finally, it is determined that the strings match and there are no wildcards present. Accordingly, the mask list remains empty with an exact match being ascertained and returned.

FIG. 14 is another illustration of an example of the search of a specified string using the modified Patricia Tree of the preferred embodiment incorporating a search procedure for a key string having a BEST flag and an EQUAL filter as shown in corresponding FIG. 7. The tree structure is shown at 590. The root of the tree 592 requires a decision after zero bits, i.e. the first position in a data string, and has zero, one, wildcard, and epsilon bit values 594, 596, 598 and 600, respectively, wherein the zero bit value 594 branches to an internal node at 602 requiring a decision after two bits in the key string, and the wildcard bit value 598 branches to an internal node 604 requiring a decision after four bits in the key string, and there is no data string for either the one 596 or epsilon 600 values at the root 592. The zero bit child 606 of 602 branches to an external node 608 at the eight bit position and the one bit child 610 of 602 branches to an external node number eight 612 at the eight bit position. In addition, the wildcard child 604 of the root 592 has its own zero child 614 and a wildcard child 616. The zero child 614 branches to an external node 618 at the eight bit position and the wildcard child 620 branches to an external node 620 at the eight bit position.

In the first example of FIG. 14, the mask list is empty and the search string is "01010101". All searches start at the root of the tree 592, 622, i.e. the zero bit position representing a choice after zero bits. The first bit in the string has a value of "0" which points to internal node 602, 624 and this node is visited. At internal node 602, 624, with bit number two, the third bit in the key string is extracted and has a value of "0". The zero child is visited 608, 626 resulting in a partial match. The partial match is converted into a mask data set and added to the empty mask list. Then the one child of 602, 624 is visited resulting in a partial match. The partial match is converted into a mask data set and added to the empty mask list. However, the mask of the string is a subset of the mask already entered into the mask list from 608, 626 and as such there is no better match than the zero child previously entered into the mask list.

However, the search continues by returning up the tree to the root of the tree 592, 622. There the wildcard child 598 is visited which leads to internal node 604, 630. At internal node 604, 630 with bit number four, the fifth position in the key string is extracted and has a value of zero. The zero child 618, 632 is visited resulting in a partial match. The node string at external node 618, 632 is converted into a mask data set and compared to the data in the mask list, and is determined not to be a subset of the previous mask and is added to the mask list. In addition, the wildcard child 620, 634 present at internal node 604, 630 is visited, and the node key string of 620, 634 is also converted into a mask data set and compared to the data in the mask list. However, it is determined that the node mask of the search string of external node 620, 634 with bit number eight of the wildcard child is a subset of the previous mask and is therefore not added to the mask list. Accordingly, the example demonstrates how the BEST flag tests for node key strings that are better matches than other node key string values.

Figure 15A:
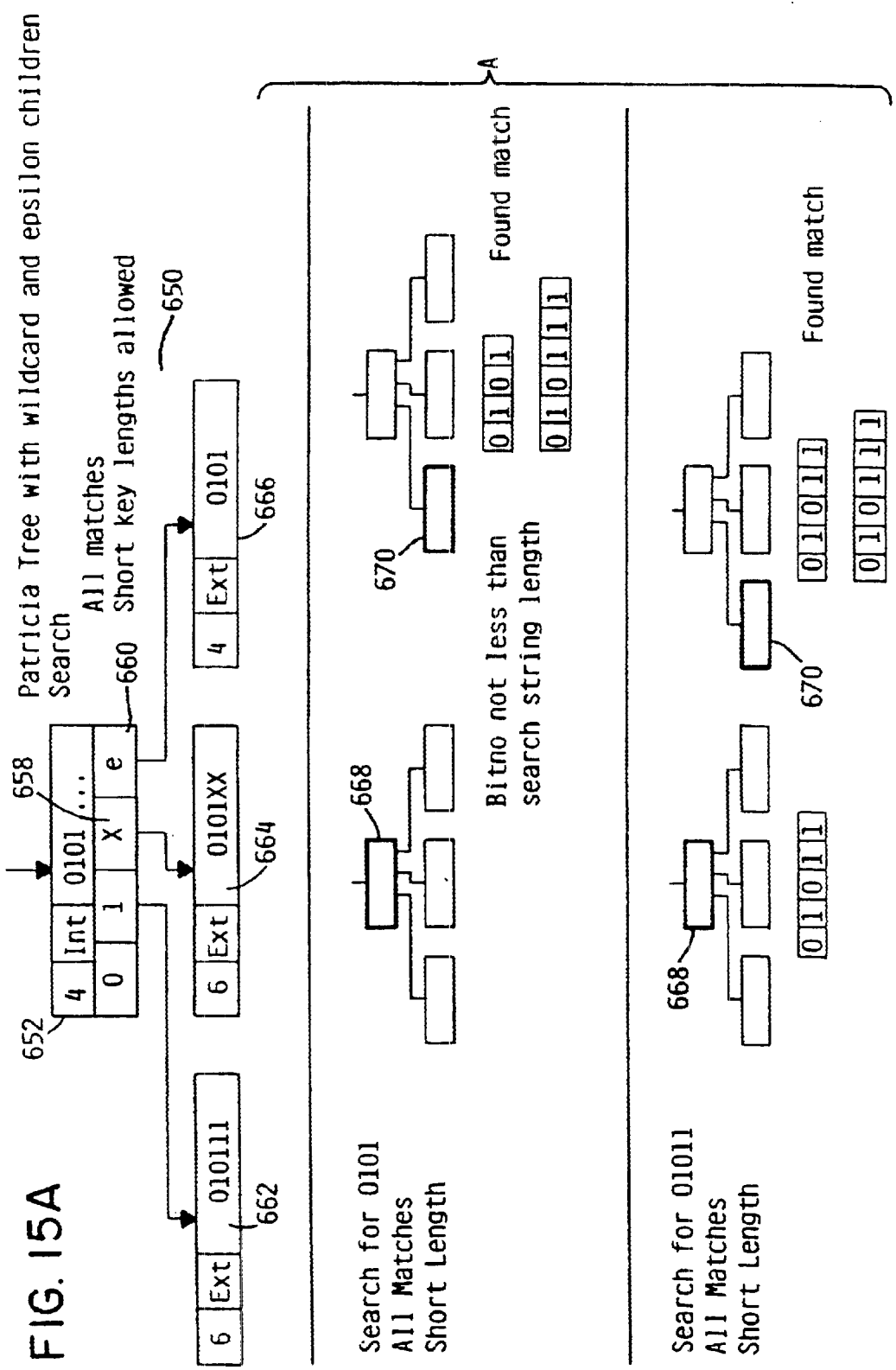
FIG. 15 is an example of a search conducted with the modified Patricia Tree of FIG. 1, with wildcard and epsilon children including an All flag and a Short Length filter.
Figure 15B:
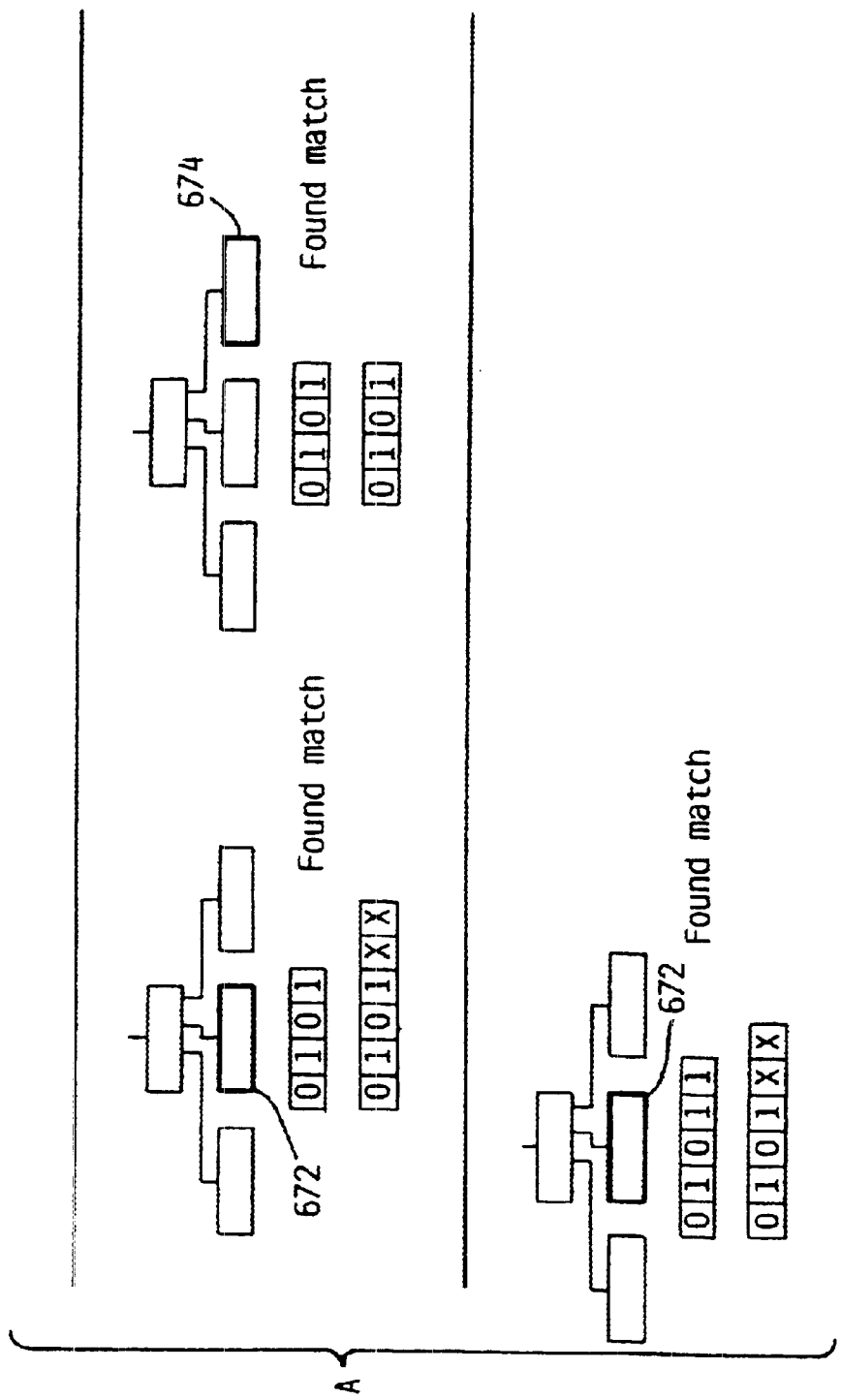

FIG. 15 is an illustration of two example of the search of a specified string using the modified Patricia Tree of the preferred embodiment incorporating a search procedure for a key string having an ALL flag and a SHORT. filter as shown in corresponding FIG. 8. The tree structure provided is shown at 650. The root of the tree 652 requires a decision after four bits, i.e. the fifth position in a data string and has zero, one, wildcard, and epsilon bit values 654, 656, 658 and 660, respectively, wherein the one bit value 656 of 652 branches to an external node 662 at the six bit position, a wildcard value 658 of 652 branches to an external node 664 at the six bit position, and an epsilon child 660 leading to an external node 666 at the four bit position.

In the first example, the search string given is "0101". All searches start at the root of the tree 652, 668, i.e. the four bit position representing a choice after four bits. At the root 652, 668, a test for an external node is conducted and it is determined that the root 652, 668 is not an external node. However, the bit position is not less than the length of the search string. A one child 656 is then found and is visited. The one child branches to an external node 662, 670, and the strings match on the common length and the length of the search string is not greater than the node bit position. Therefore, the one child 662, 670 of the root of the tree 652, 668 is a match. Similarly, the wildcard child 658 is then visited and a comparison of the node key string 664, 672 with the search string is conducted and the strings match on the common length. In addition, the length of the search string is not greater than the node bit position. Therefore, the wildcard child 664, 672 of the root of the tree 652, 668 is a match. Finally, the epsilon child 660 of the root of the tree 652, 668 is visited and a comparison of the node key string with the search string on the common length is conducted where its determined that the strings match on the common length and the length of the search string is not greater than the node bit position. Therefore, the epsilon child key string 666, 674 matches with the search string. Accordingly, in the example provided, the one, wildcard and epsilon children of the root of the tree all match with the search string data and are returned.

In the second example of FIG. 15, the search string data given is "01011". All searches start at the root of the tree 652, 658, i.e. the four bit position representing a choice after four bits. Once again, the first internal node 652, 668 is determined not to be an external node and the bit position is less than the length of the search string. Therefore, the next bit corresponding to the bit position is extracted, which in this example is a 1 bit, which is the corresponding child for the bit position. A visit to the one child 662, 670 is conducted. The one child 662, 670 of the root of the tree is an external node. A comparison of the node key string with the search string, using wildcards on their common length is conducted, followed by a query as to whether the strings match on the common length. The strings match on the common length and the length of the search string is not greater than the bit position. As such, the data string associated with the one child 662, 670 of the root of the tree 652, 668 matches with the search string. In addition, a visit to the wildcard child of the root of the tree 652, 668 is conducted.

The wildcard child 664, 672 of the root of the tree is also determined to be an external node. A comparison of the node key string with the search string data, using wildcards on their common length is conducted, and it is determined that the strings match on their common length. Since the length of the search string data is not greater than the node bit position, it is determined that the node key string of the wildcard child matches with the search string. The epsilon child is omitted from the search as the search string is not less than the internal node bit position and the search criteria has not indicated the end of the search string has been reached. Therefore, a search of the epsilon child at this node is not supported by the search criteria. Accordingly, both the one child and wildcard child in this example provide matches with the search string data.

Figure 16B:
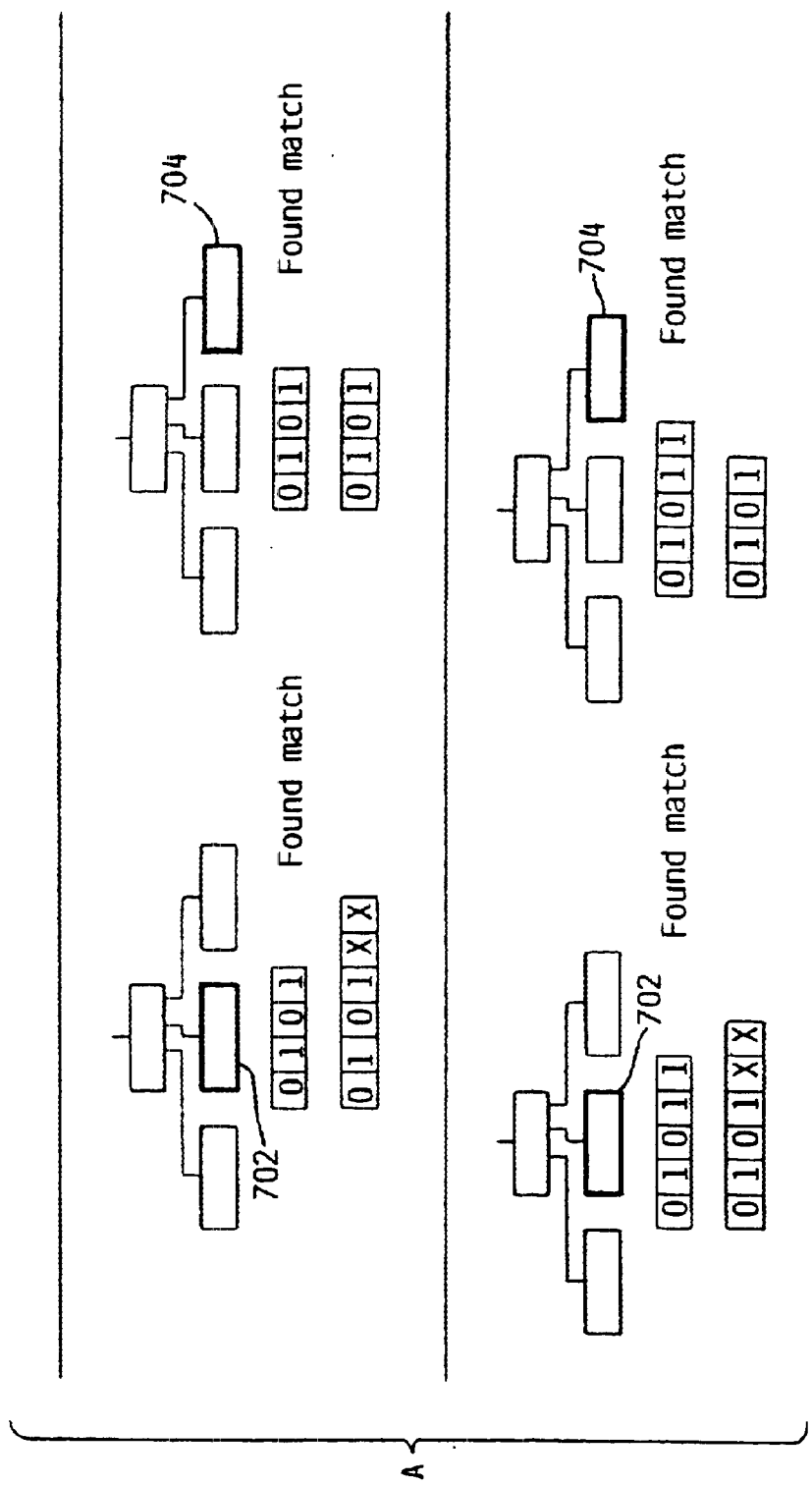
FIG. 16 is an example of a search conducted with the modified Patricia Tree of FIG. 1, with wildcard and epsilon children including an All flag and a Non-Equal Length filter.

FIG. 16 is an illustration of two examples of the search of a specified string using the modified Patricia Tree of the preferred embodiment incorporating a search procedure for a key string having an ALL flag and a NOT EQUAL filter as shown in corresponding FIG. 9. The tree structure provided is shown at 680. The root of the tree 682 requires a decision after four bits, i.e. the fifth position in a data string. The root of the tree has zero, one, wildcard, and epsilon bit values 684, 686, 688 and 690, respectively, wherein a one bit value 686 has a child that branches to an external node 692, a wildcard bit value 688 has a child that branches to an external node 694, and an epsilon bit value 690 has a child that branches to an external node 696. In the first example, the search string given is "0101". All searches start at the root of the tree 682, 698, i.e. the four bit position representing a choice after four bits. At the root 682, 698, a test for an external node is conducted and it is determined that the root is not an external node. However, the bit position is not less than the length of the search string, i.e. the root bit position is the fourth position and the search string contains only four bits. At the root 682, 698, a one child 692, 700 is found and is visited. The one child 692, 700 is an external node and the strings match on the common length. However, the portion of the node key string that is longer than the search string does not contain wildcards and, as such, the strings do not match the search criteria. Subsequently, the wildcard child is visited 694, 702 and a comparison of the node key string with the search string is conducted. The strings match on the common length, the length of the search string is not greater than the node bit position, and the portion of the node key string that is longer than the search string is all wildcards. As such, the wildcard child is determined to match with the search string data. Finally, the epsilon child 696, 704 of the root of the tree is visited, and the epsilon child is determined to be an external node. A comparison of the node key string with the search string, using wildcards along the common length is conducted and it is determined that the strings match on the common length. The length of the search string is not greater than the node bit position, and actually, there are no wildcards present in the node key string. Accordingly, the data string of the epsilon child is determined to match with the search string data and is returned with the other match.

In the second example of FIG. 16, the search string given is "01011". All searches start at the root of the tree 682, 698, i.e. the four bit position representing c choice after four bits. The root of the tree 682, 698 is determined not to be an external node, and the node bit position is less than the length of the search string. Therefore, the next bit corresponding to the node bit position is extracted, which in this example is a "1" bit, which is the corresponding child for the node bit position. A visit to the one child 692, 700 is conducted. The one child 692, 700 of the root of the tree is an external node. A comparison of the node key string with the search string, using wildcards on their common length is conducted, followed by a query as to whether the strings match on the common length. The strings match on the common length and the length of the search string is not greater than the node bit position. However, there are no wildcard bits beyond the common length of the data strings and, as such, there is not match between the search string and the node key string of 692, 700. In addition, a visit to the wildcard child 694, 702 of the root of the tree is conducted. The wildcard child 694, 702 of the root of the tree is also determined to be an external node. A comparison of the node key string with the search string data, using wildcards on their common length is conducted and it is determined that the strings match on their common length. Since the length of the search string data is not greater than the node bit position, it is determined that the node key string of the wildcard child matches with the search string. Finally, the epsilon child 696, 704 of the root of the tree is visited and determined to be an external node. A comparison of the node key string with the search string data using wildcards on their common length is conducted, and it is determined that the strings match on their common length. The length of the search string is greater than the node bit position and a match is found between the data string of the epsilon child and the search string data. Accordingly, in the second example of FIG. 16 it is determined that the data strings associated with the wildcard child and the epsilon child are matches in association with the established flag and filter parameters and are returned as possible matches.

Figure 17A:
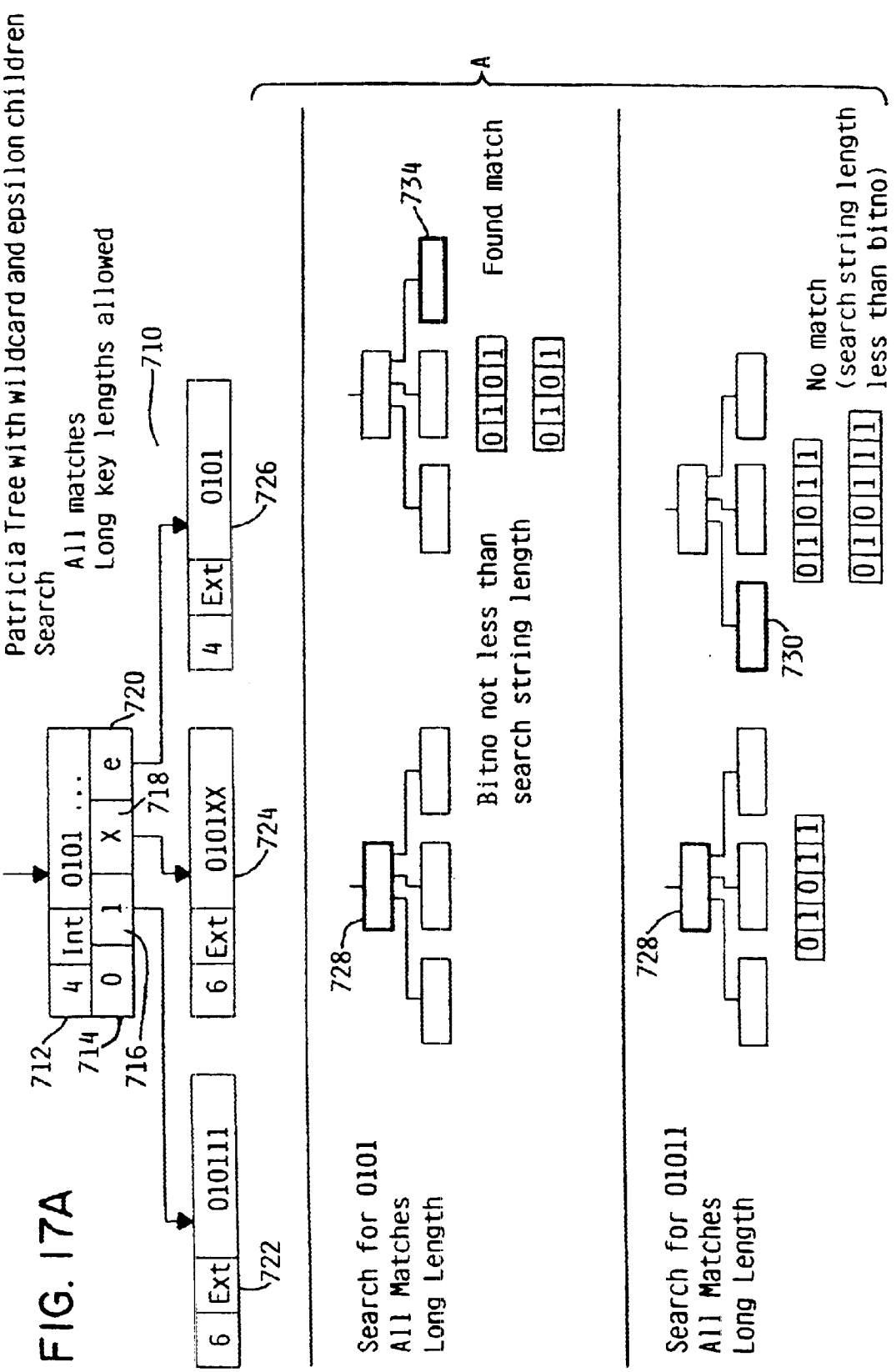
FIG. 17 is an example of search conducted with the modified Patricia Tree of FIG. 1, with wildcard and epsilon children including an All flag and a Long Length filter.
Figure 17B:
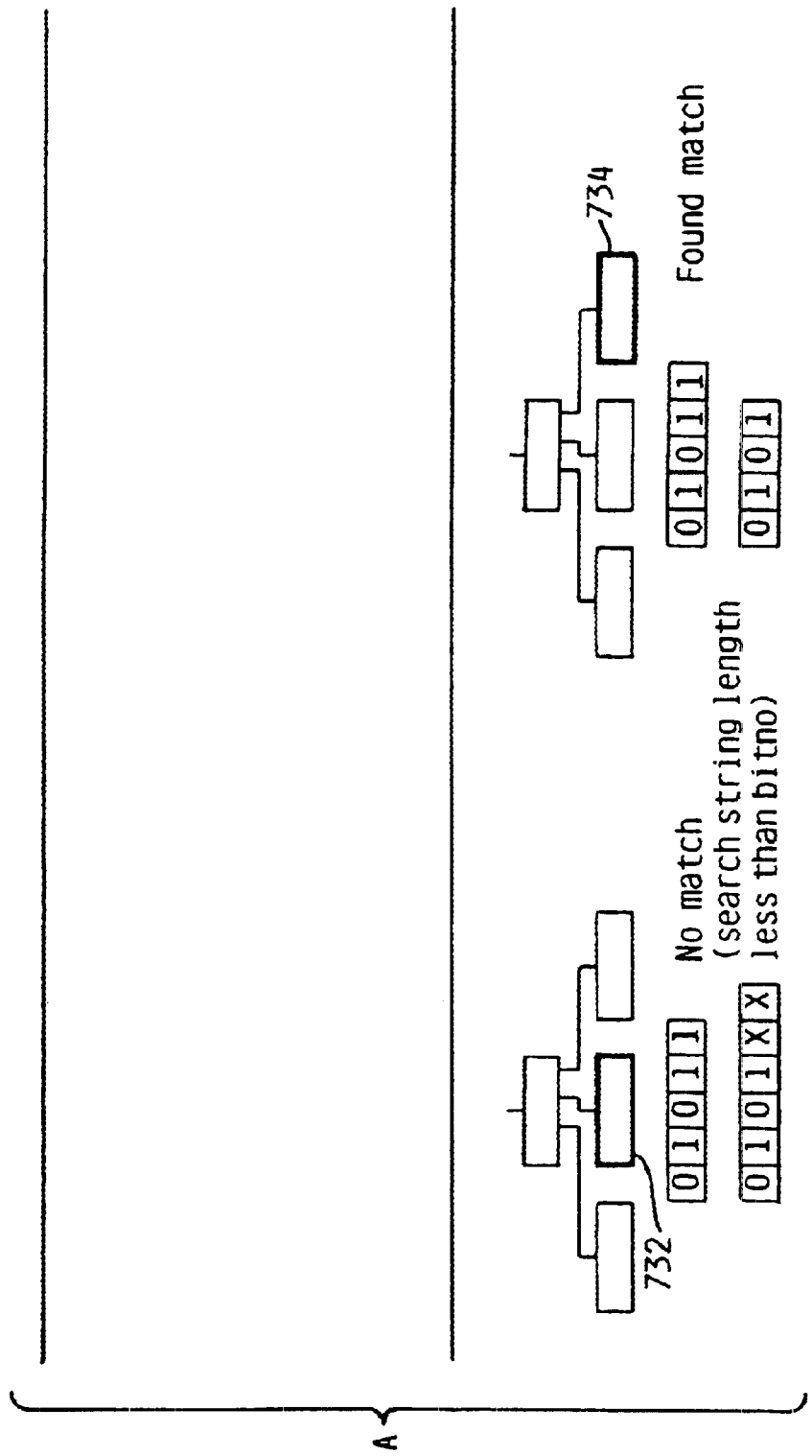

FIG. 17 is an illustration of two examples of the search of a specified string using the modified Patricia Tree of the preferred embodiment incorporating a search procedure for a key string having an ALL flag and a LONG filter as shown in corresponding FIG. 10. The tree structure provided is shown at 710. The root of the tree 712 requires a decision after four bits, i.e. the fifth position in a data string. In addition, the root 712 has zero, one, wildcard, and epsilon bit values 714, 716, 718 and 720, respectively, wherein a one bit value 716 has a child that branches to an external node 722, a wildcard child 718 that branches to an external node 724 and an epsilon child 720 that branches to an external node 726.

In the first example of FIG. 17, the search string given is "0101". All searches start at the root of the tree 712, 728, i.e. the four bit position representing a choice after four bits. As such, at the root node 712, 728, a test for an external node is conducted and it is determined that the root node is not an external node. However, the node bit position, four, is not less than or equal to the length of the search string. Based upon the set flag and filter, the epsilon child 726, 734 of the root 712, 728 is then visited. The epsilon child 726, 734 is determined to be an external node and then the search string is examined. The length of the search string is determined to be not less than the corresponding node bit position of the epsilon child 726, 734. Accordingly, a match between the node key string of the epsilon child and the search string has occurred and the match is returned.

In the second example of FIG. 17, the search string given is "01011". All searches start at the root of the tree 712, 728, i.e. the four bit position representing a choice after four bits. The root of the tree 712, 728 is determined not to be an external node, and the node bit position is less than the length of the search string. Therefore, the bit corresponding to that node bit position is extracted, which in this example is a "1" bit. A visit to the one child 722, 730 is conducted.

The one child 722, 734 of the root of the tree is determined to be an external node. A comparison of the node key string with the search string is then conducted using wildcards on their common length followed by a query as to whether the strings match on the common length. The strings match on the common length, however, the search string length is less than the string of the external node bit position. As such, the data string associated with the one child 722, 730 is determined not to match the search string under the present criteria. Subsequently, a visit to the wildcard child 724, 732 of the root of the tree is conducted. The wildcard child 724, 732 of the root of the tree is also determined to be an external node. A comparison of the node key string with the search string data, using wildcards on their common length is conducted and it is determined that the strings match on their common length. However, as in the case of the one bit child, the length of the search string is less than the node bit position. As such, the data string associated with the wildcard child is determined not to match with the search string. Finally, the epsilon child 726, 734 of the root of the tree is visited and determined to also be an external node. A comparison of the node key string with the search string data using wildcards on their common length is conducted and it is determined that the strings match on their common length. The length of the search string is greater than the external node bit position and a match is therefor found between the key string of the epsilon child and the search string data. Accordingly, in the second example of FIG. 17 it is determined that the data string associated with the epsilon child is a match in association with the established flag and filter parameters and the match is returned.

Figure 18B:
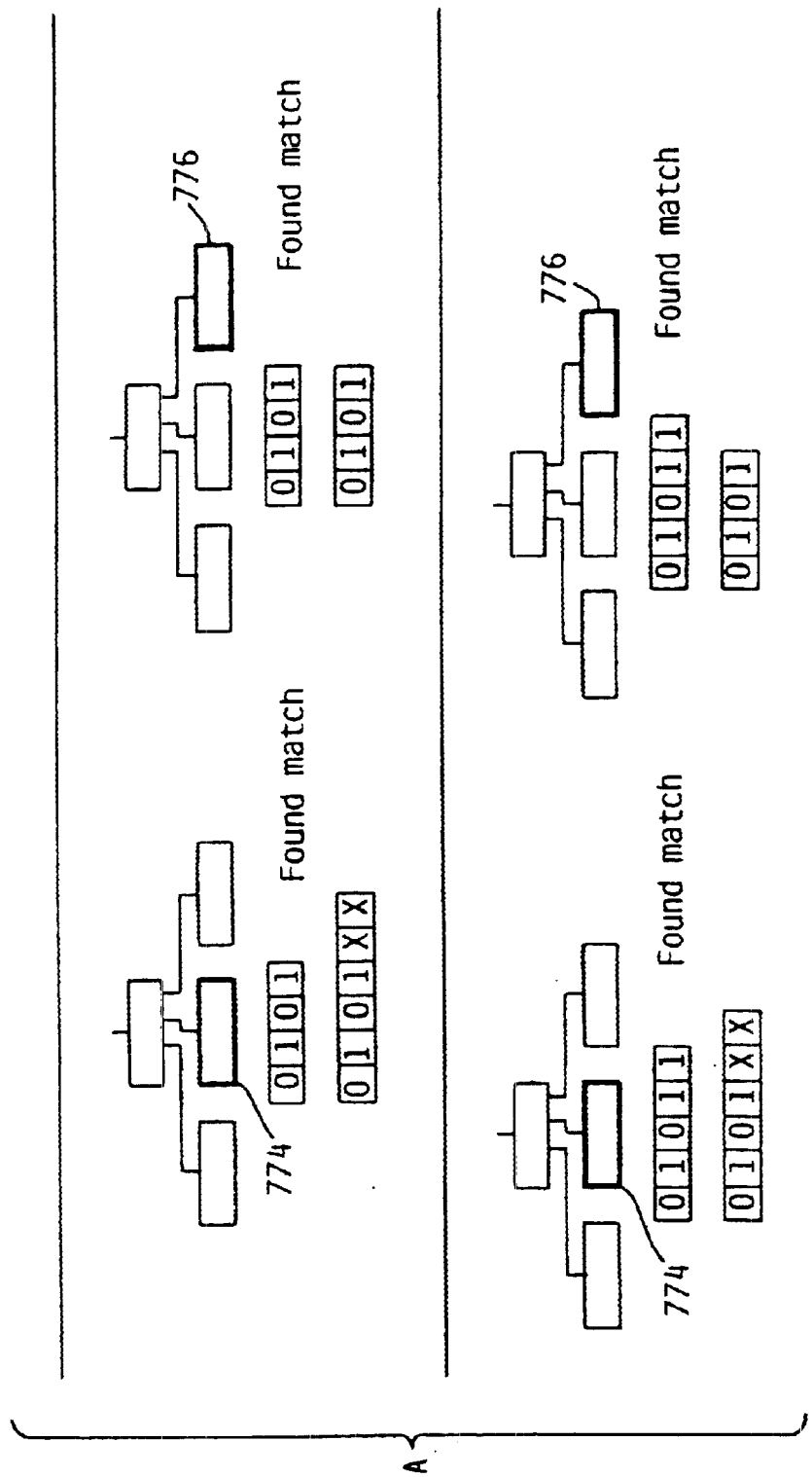
FIG. 18 is an example of a search conducted with the modified Patricia Tree of FIG. 1, with wildcard and epsilon children including an All flag and Short or Long Length filter.
Figure 19A:
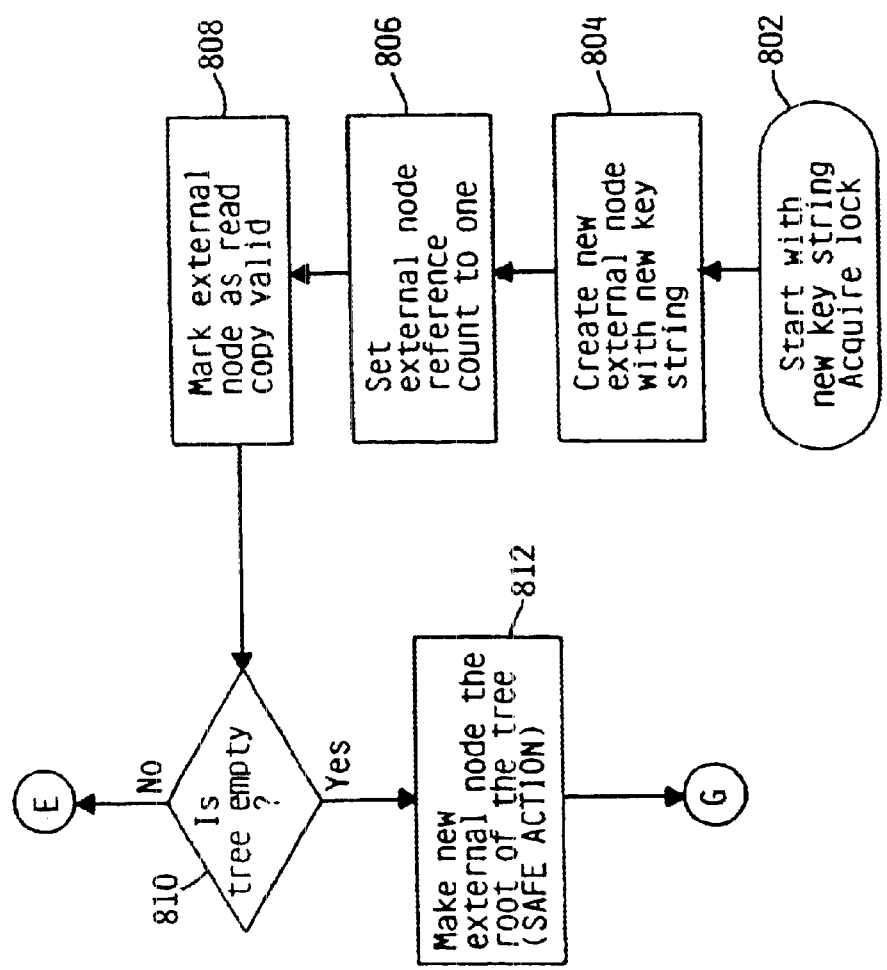
FIG. 19 is a flow chart illustrating a method of inserting a data node in the modified Patricia Tree of FIG. 1 with wildcard and epsilon children.
Figure 19B:
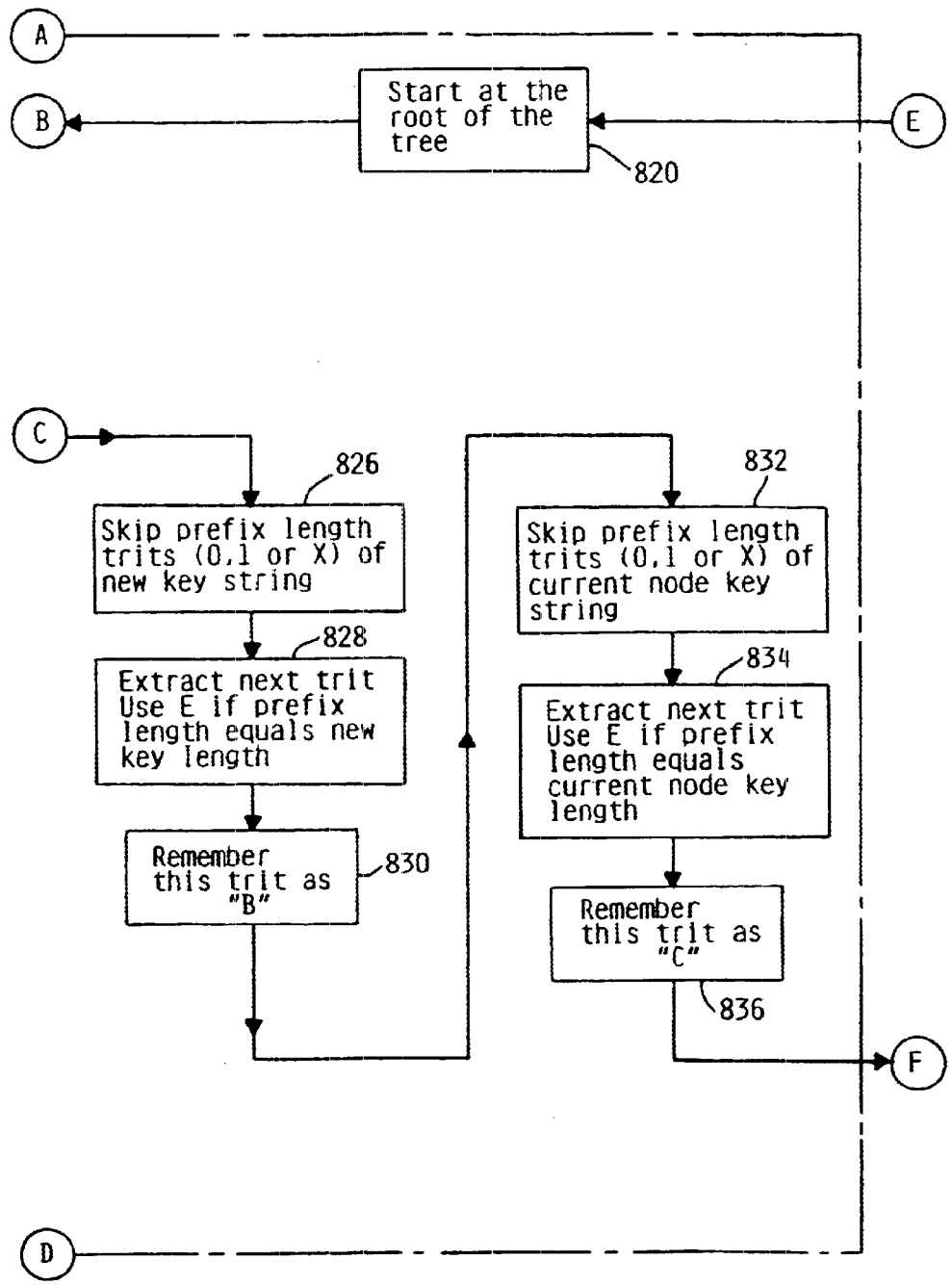
Figure 19C:
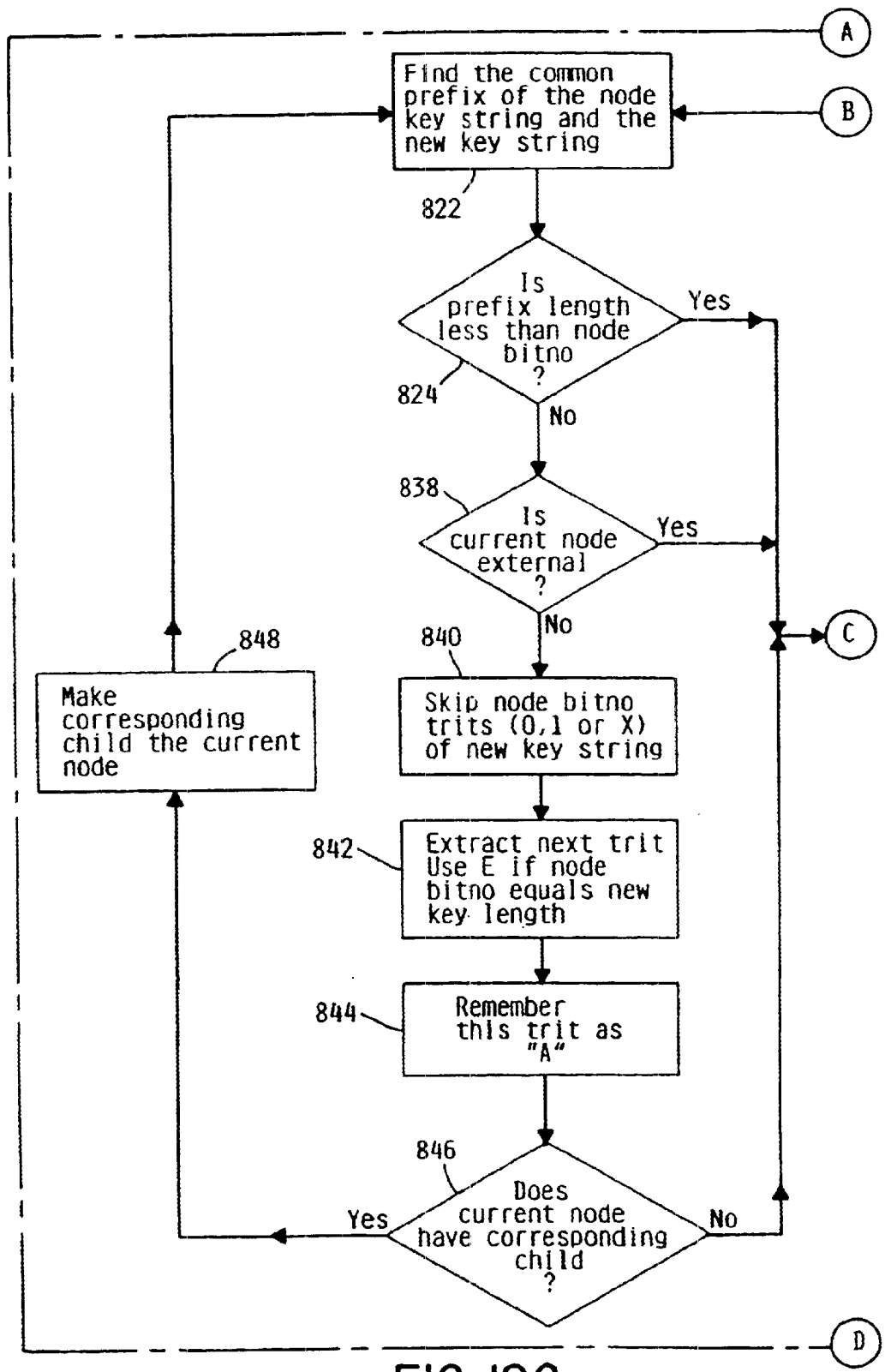
Figure 19D:
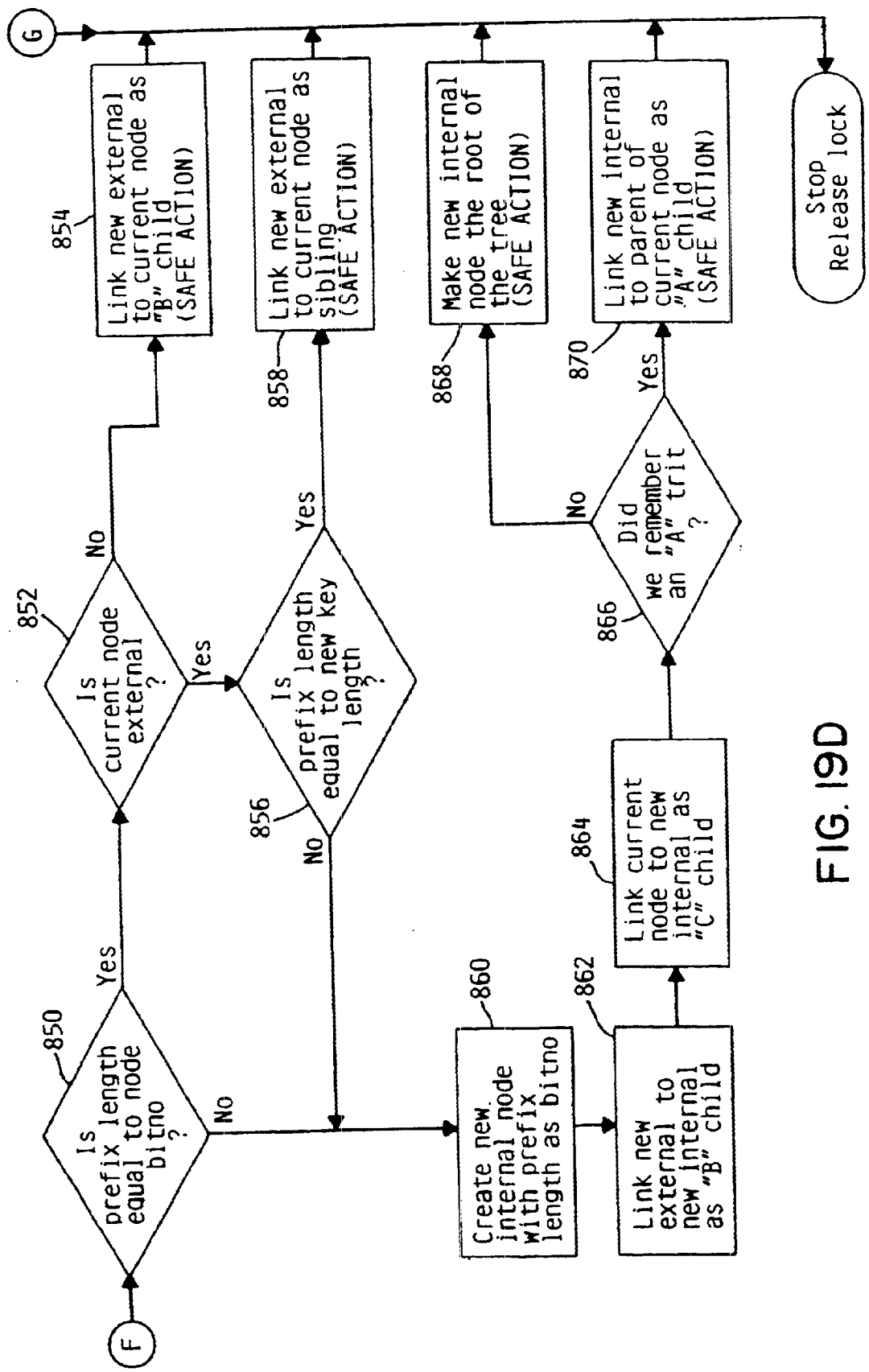

FIG. 18 is an illustration of two examples of the search of a specified string using the modified Patricia Tree of the preferred embodiment incorporating a search procedure for a key string having an ALL flag and a SHORT or LONG filter as shown in corresponding FIG. 11. The tree structure provided is shown at 750. The root of the tree 752 requires a decision after four bits, i.e. the fifth position in a data string. The root 752 has zero, one, wildcard, and epsilon bit values 754, 756, 758 and 760, respectively, wherein a one bit value 756 has a child that branches to an external node 762, a wildcard bit value 758 has a child that branches to an external node 764 and an epsilon bit value 760 has a child that branches to an external node 766.

In the first example, the search string given is "0101". All searches start at the root of the tree 752, 770, i.e. the four bit position representing a choice after four bits. At the root of the tree 752, 770, a test for an external node is conducted and it is determined that the root of the tree is not an external node. However, the node bit position is not less than or equal to the length of the search string. The epsilon child 766, 776 of the root of the tree 752, 770 is then visited. The epsilon child 766, 776 is an external node, and the strings match on the common length. As such, the data string associated with the epsilon child matches with the search string. Next, it is determined that there is no zero child, but there is a one child 762, 772, so the one child is visited. It is found that the one child 762, 772 is an external node and the strings match on the common length and the one child is found to match. Finally, the wildcard child 764, 774 is visited. The wildcard child 764, 774 is an external node, and the strings match on the common length and the wildcard child is found to match. Accordingly, the search strings associated with the epsilon, one and wildcard children of the root of the tree are determined to have matching data strings with the search string and they are returned.

In the second example of FIG. 18, the search string given is "01011". All searches start at the root of the tree 752, 770, i.e. the four bit position representing a choice after four bits. The root of the tree 752, 770 is determined not to be an external node, and the node bit position is less than the length of the search string. Therefore, the bit corresponding to that node bit position is extracted, which in this example is a "1" bit, which is the corresponding child for the node bit position. A visit to the one child 762, 772 is conducted. The one child 762, 772 of the root of the tree is an external node. A comparison of the node key string with the search string, using wildcards on their common length, is conducted followed by a query as to whether the strings match on the common length. The strings match on the common length and, as such, the key string of the one child is determined to match with the search string and a match is found. In addition, a visit to the wildcard child 764, 774 of the root of the tree is conducted. The wildcard child 764, 774 of the root of the tree is also determined to be an external node. A comparison of the node key string with the search string data, using wildcards on their common length, is conducted and it is determined that the strings match on their common length and a match is found. Finally, the epsilon child 766, 776 of the root of the tree node is visited and determined to be an external node. A comparison of the node key string with the search string data, using wildcards on their common length is conducted, and it is determined that the strings match on their common length and a match is found between the key string of the epsilon child and the search string data. Accordingly, in the second example of FIG. 18 it is determined that the data string associated with the one child 762, 772, wildcard child 764, 774 and epsilon child 766, 776 each match with the search string in association with the established flag and filter parameters and each match is returned.

In addition to searching the existing data structure, it is important to modify the data structure by both inserting new keys into search tree and removing keys that have grown stale. It is common and known that numerous threads in a multiprocessor computer may attempt to consult and modify a routing table at the same time, for which there need to be protections to ensure the continued integrity of the table and searches consistent with a stable and coherent view of the table. The standard locking technique for serializing access to a data structure in a multiprocessor does not provide adequate performance for routing tables, where utmost efficiency can be achieved by allowing every thread seeking to access the routing tables to consult the routing table at the same time. A more advanced technique for protecting a routing table is to use reader-writer locks, which allow any number of simultaneous table consultations while preventing any table consultation from occurring while a table update is taking place. However, as just mentioned, reader-writer locks do not allow consulting the table during an update which although an improvement over the standard form of protection still does not achieve the desired goal which simultaneous access during all stages of the use of routing tables would provide.

However, there is a class of advanced techniques which allow readers to access a data structure without explicitly synchronizing the data structure with writers accessing the same data structure. These techniques generally use a small set of "atomic operations," i.e. indivisible operations that occur in a single time interval, such as writing a single word of memory, together with a discipline of constraints on the readers to ensure the readers do not access data in a manner yielding corrupt or inconsistent view of the data structure. In almost all such cases, writers are serialized using conventional techniques such as locks or semaphores. Several techniques in this class could be applied to the search algorithms of the preferred embodiment, including a read-copy update technique. Accordingly, the procedures for updating the tables in the form of insertions and deletions provide for support of readers to continue reading the tables without being affected by any contemporaneous modifications.

Using read-copy update, a data structure is considered safe for reading for short intervals of time, during which a reader can not release the processor during one of these intervals, a reader can only follow specific designated pointers between nodes, and a reader can only read designated values once during a safe period. Also, readers can not retain any pointers to the data structure once the safe interval has concluded unless special actions are taken during the safe interval which would allow retention of such links. Modifications may take place at any time, provided they do not violate the appearance of stability during a safe reading interval. This usually requires the writer to make a copy of part of the data structure, fill it in completely, and then atomically change one pointer to redirect the overall data structure from the old part of the data structure to the new modified part. Old parts of data structures can not be destroyed until all readers are guaranteed to have finished their safe periods. Although the constraints to the data structure may not be apparent in the searching algorithms herein, they are immediately apparent in the update algorithms as several actions in the update procedures must occur atomically for correct operation of the algorithms.

FIG. 19 is a flow chart 800 illustrating the insert procedure for modifying a data structure within the form of the modified Patricia Tree of the preferred embodiment. As has been discussed, the primary function of the modified Patricia Tree is to address issues with routing tables including searching the tables and updating the tables on a regular basis and improving the efficiency of the data searches. New data are presented as two binary strings of the same length. One string is the prototype address for the routing table entry, and the second string is the mask of significant bit positions in the prototype. Where the mask has a 0 bit value, the new data is treated as a wildcard position. Where the mask has a 1 bit value, the value is taken from the prototype address at the same position. When deciding to enter new data, all data is entered at an external node key where all key strings are stored, and as such the first step in the data entry process involves acquiring a lock on the data structure 802 followed by creating a new external node key 804 with a new key string. Each external node has a reference count identifying how many persons have assigned this data as persistent data, i.e. have indicated that this node is currently being stored and is in use. If a node has a reference count of zero then it is not being stored in persistent data and is not currently in use by anyone. Following the establishment of an initial reference count of one with the external node 806, the external node is marked as read-copy valid 808. A query 810 is then conducted to determine if the modified Patricia Tree of the preferred embodiment is empty. If the tree is empty, then the new external node is established as the root of the tree 812 as this node is the only data currently within the tree. This action 812 is an atomic action. If the tree is not empty, it must be determined where a new external node should be inserted under existing internal nodes. In the modified Patricia Tree of the preferred embodiment, each internal node guarantees at least two of four way branching at each internal node. Accordingly, when establishing an insertion point for a new node into an existing tree, it must follow that each internal node must guarantee at least two of four way branching and may result in the creation of additional internal nodes to support the newly added external node.

The procedure for locating the insertion point is initiated at the root of the tree 820. Since every internal node represents a prefix, the common prefix of the node key string and the new key string must be found 822. If the prefix length of the new key string is less than the node bit number 824, then the prefix is skipped over 826, and the next ternary value, i.e. 0, 1 or x, is extracted 828 from the new key string. If the prefix length of the new key string is equal to the length of the current node key string, then the epsilon value is used as there is no next ternary value. This next ternary value is stored and remembered 830 as "B". In addition, the prefix is skipped over 832, and the next ternary bit value is extracted from the node key string 834. If the prefix length of the new key string is equal to the length of the current node key string, then the epsilon value is used as there is no next ternary value. This next ternary value is stored and remembered 836 as "C". In the event that the prefix length is not less than the new key string node bit number 824, and the current node is not an external node 838, then the procedure skips bits of the new key string equal in number to the node bit number 840 and the next ternary value is extracted 842. If the prefix length of the new key string is equal to the current node bit number, then the epsilon value is used as there is no next ternary value. The ternary value is stored and remembered 844 as "A". The "A" ternary value determines characteristics of the child of the current node. If the current node has a corresponding child 846, the corresponding child becomes the current node 848, and the flow diagram returns to 822 to find the common prefix of the node key string and the new key string. However, if the current node does not have a corresponding child the flow diagram proceeds to 850 to ascertain the "B" and "C" ternary bit values. Accordingly, since Patricia Trees, and in this example the modified Patricia Tree of the preferred embodiment, stores all key strings at external nodes, the heart of the insert procedure is to determine the "A", "B" and "C" ternary bit values in conjunction with determining the proper point of insertion into the routing table.

Following the extraction of the "A", "B" and "C" ternary bit values, it is critical to determine the proper point of inserting the new external node. If the prefix length is equal to the node bit position 850, and if the current node is not external 852, then the new external node is linked 854 to the current node as a "B" child. This insertion process is conducted as an atomic action, i.e. an indivisible action that occurs in a single time interval, thereby being a safe action. However, if the current node is internal, it must be determined 856 if the prefix length of the node key string is equal to the new data string length. If the answer to 856 is positive, then there is a duplicate data value in the tree and the data string is linked 858 to the current node as a sibling as an atomic action. In the event the common prefix length is equal to neither the node bit number 850 nor the new key length 856, a new internal node is created 860 with the prefix length as the node bit number. In addition, the new external node is linked 862 to the new internal node as a "B" child, and the current node is linked to the new internal node as a "C" child 864. Finally, it must be determined how the point of insertion was ascertained 866, the "A" ternary value. If there is no "A" ternary value, then the new internal node becomes the root of the tree 868, and if there is an "A" ternary value, then the new internal node is linked to the parent of the current node 870 as an "A" child of the parent. Accordingly, the process outlined in. FIG. 19 illustrates a preferred procedure for determining the proper point of insertion of a new node into an existing modified Patricia Tree.

Figure 20A:
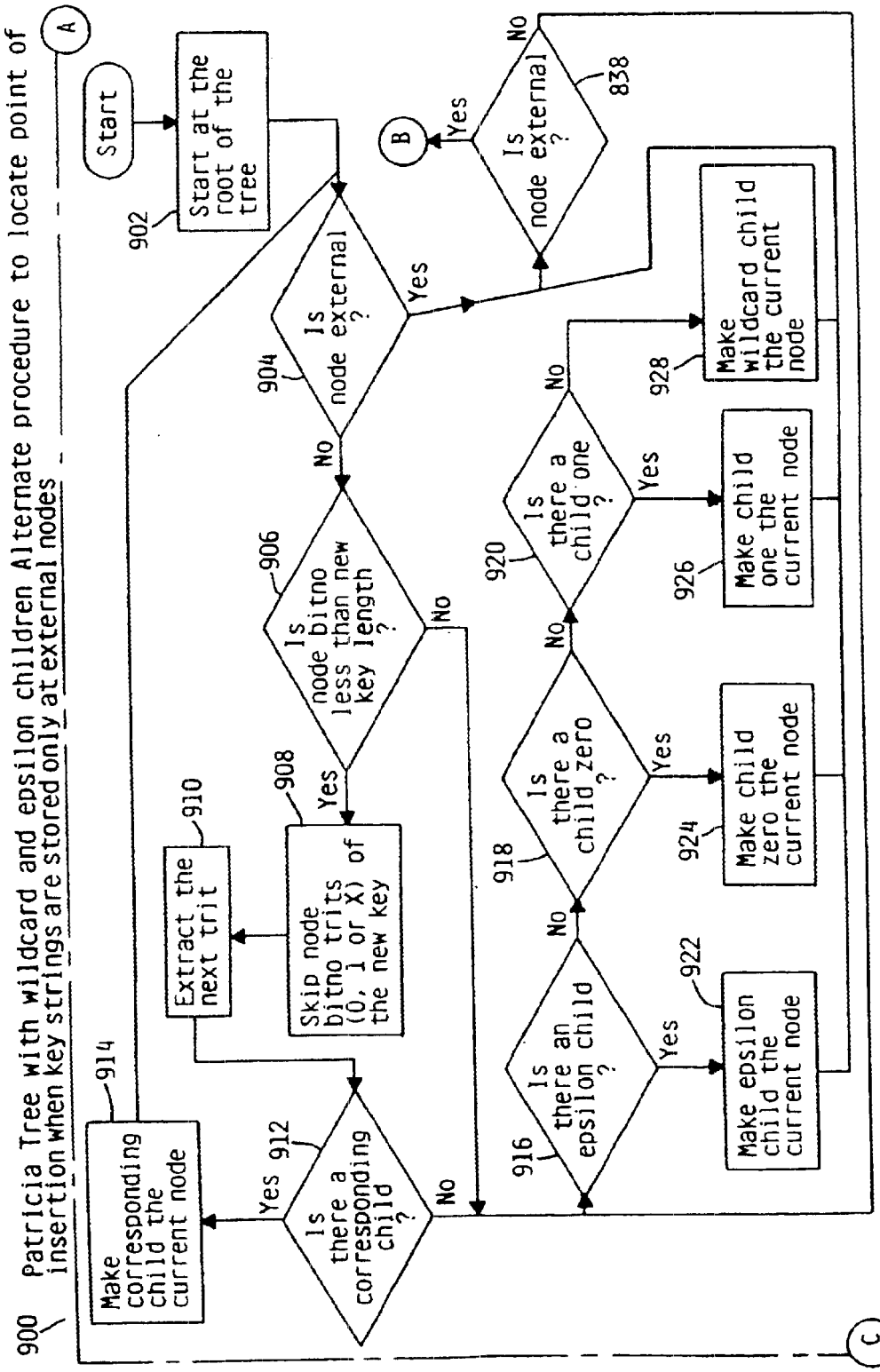
FIG. 20 is a flow chart illustrating an alternative method of inserting a data node in the modified Patricia Tree of FIG. 1 with wildcard and epsilon children.
Figure 20B:
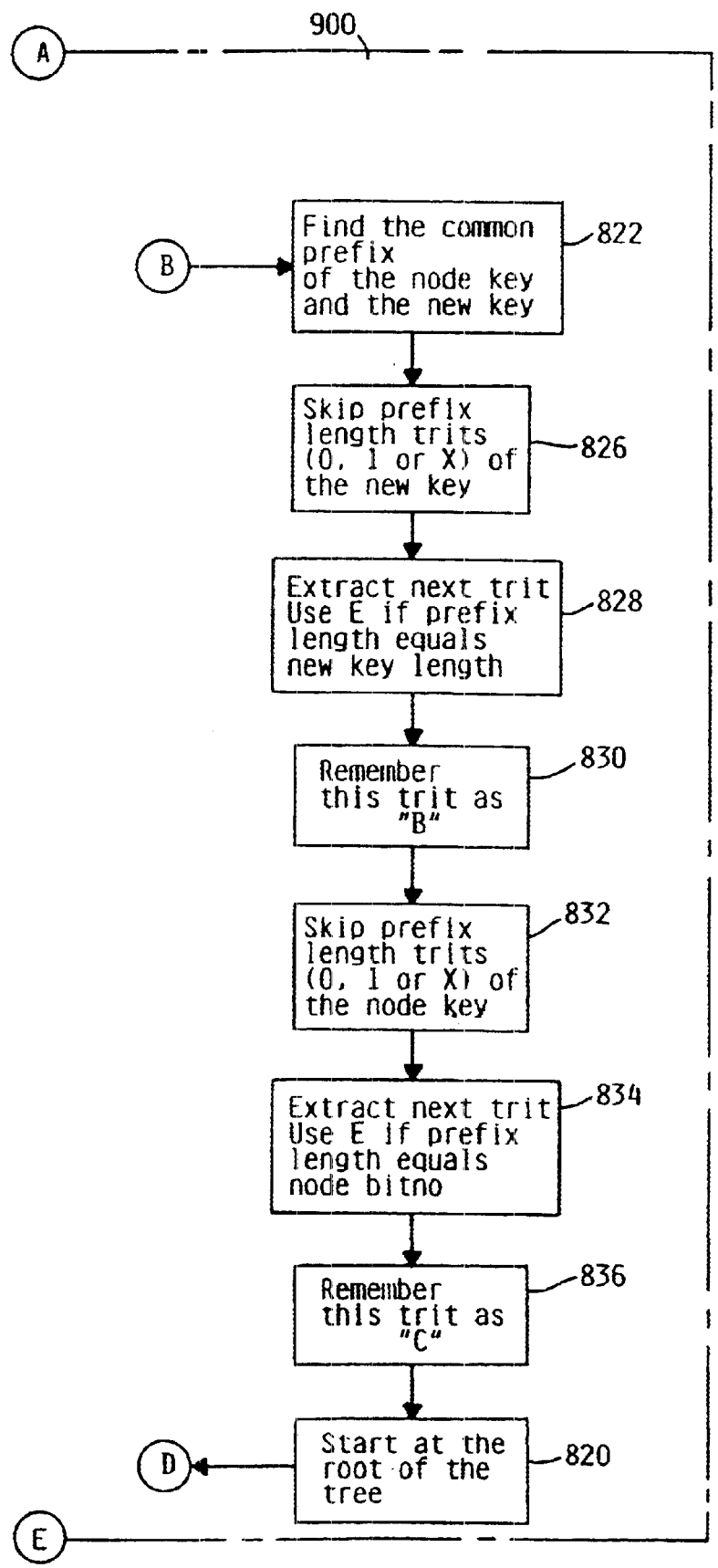
Figure 20C:
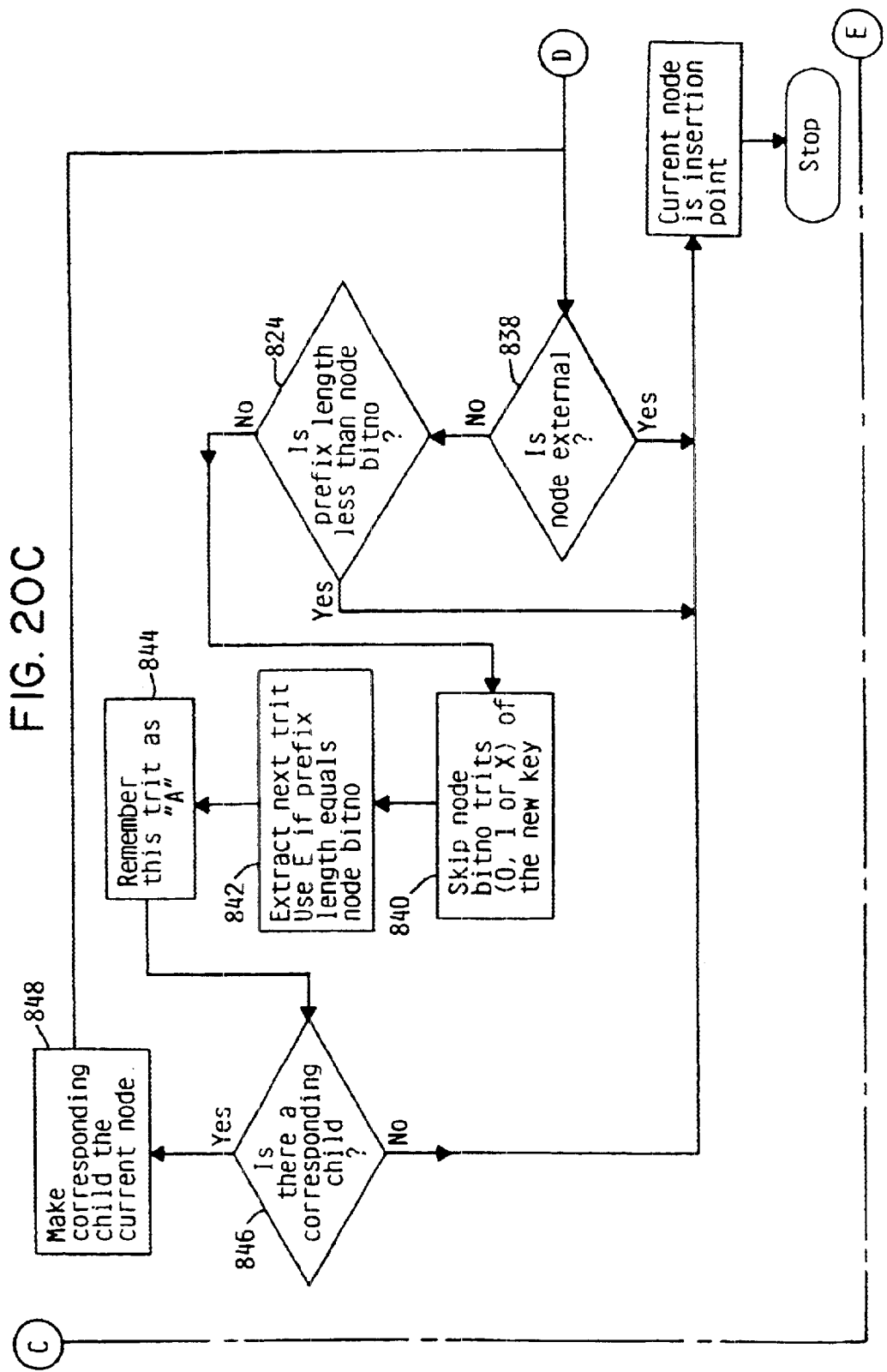

FIG. 20 is an illustration 900 of an alternative procedure of the process outlined in section 880 from FIG. 19 for locating the point of insertion of a new key data string into an existing tree where key strings are stored only at external nodes. In this situation, typical of Patricia trees, a common prefix can only be computed at an external node. It is necessary to find some relevant external node, compute the prefix, then find the relevant node closest to the root whose bit number is not less than the length of the prefix. Since FIG. 20 outlines portion 880 of FIG. 19, this procedure of FIG. 19 accounts for steps 802–810 and 850–870. A test is conducted to determine if the node is an external node 904. If the answer to 904 is positive, the common prefix of the node key string and the new data string is ascertained. Steps 824 and 826–836 are conducted to determine the "B" and "C" values. However, if the current node is internal 904, the node bit number is compared to the length of the new data string 906. If the node bit number is smaller, the process skips that many bits of the new key string 908, extracts the next ternary value in the new data string 910, and if there is a corresponding child 912, the corresponding child becomes the current node 914. Thereafter, a return to 904 is conducted. However, if the node bit number is not less than the new data string length 906 or there is no corresponding child 912, the process immediately traverses to an arbitrary external descendant. At each iteration, one child (922, 924, 926, 928) will be visited until an external node is reached. At the external node, the common prefix of the new key string and the node key string is computed 822 and the "B" and "C" values for determining the point of insertion into the existing tree are found. The remainder of the steps illustrated in FIG. 20 follow with corresponding numerically identified steps of FIG. 19. Accordingly, FIG. 20 outlines portion 880 of FIG. 19 for determining the point of insertion for new data strings into an existing table where key strings are stored only at external nodes.

Figure 21:
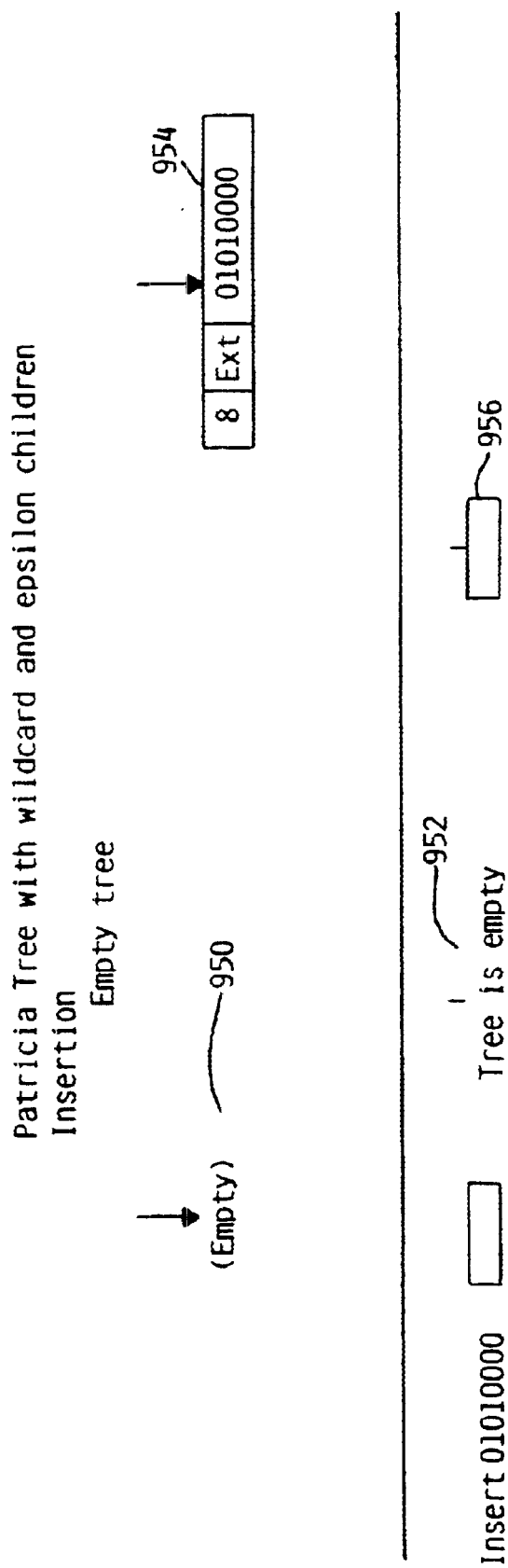
FIG. 21 is an example of a method of inserting data into an empty modified Patricia Tree of FIG. 1 with wildcard and epsilon children.

FIGS. 21–28 are examples of the process for inserting a new data string into a modified Patricia Tree of the preferred embodiment with wildcard and epsilon children. FIG. 21 illustrates an empty tree 950 and a new data string "01010000". In this example, a new external node with the new data string is created, the external node reference count is set to one during the creation to prevent other parties from read-copy access, and the external node is then marked as read-copy valid as the update to the tree has been completed. Since the tree is initially empty 950, 952, the new external node becomes the root of the tree 954, 956.

Figure 22A:
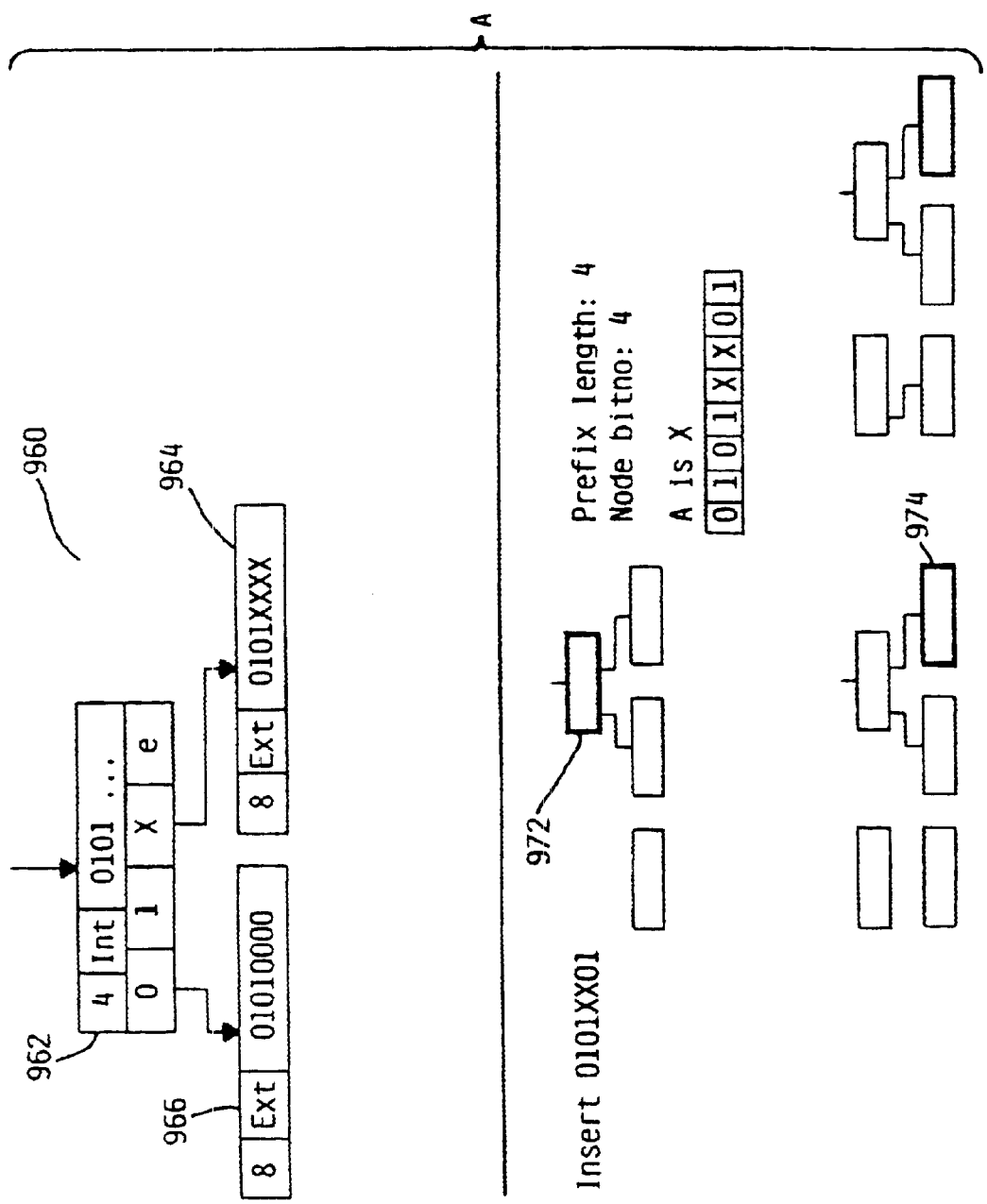
FIG. 22 is an example of a method of inserting data into the modified Patricia Tree of FIG. 1 with wildcard and epsilon children wherein the prefix length is less than the node bit number.
Figure 22B:
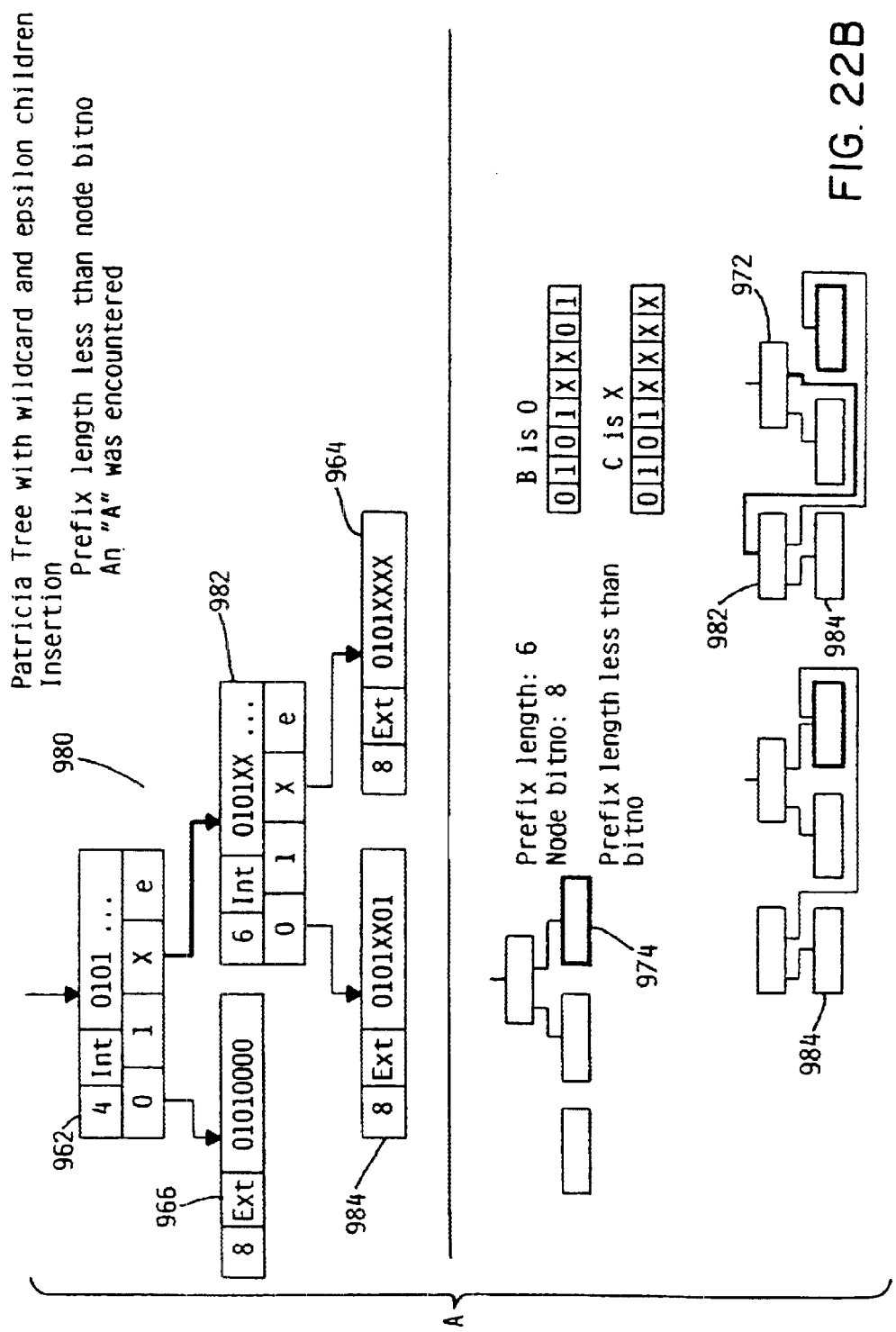

FIG. 22 is another insertion example wherein the new data string is "0101xx01" and the prefix length is equal to the node bit position of the root of the tree. An illustration of the tree prior to any modifications is shown at 960, and the tree following insertion of new data strings is shown at 980. An examination of the root node determines that the tree is not empty, and the insertion process starts at the root of the tree 962, 972. The common prefix between the node key string and the new data string is ascertained as "0101", and the prefix length is equal to the node bit position of the root 962, 972, which in this example is the four position. In addition, the current node is not external, and therefore the node bit position of the new data string is skipped and the next bit value "x" of the new data string is extracted and remembered as "A". The root of the tree 962, 972 does have a corresponding wildcard "x" child, and this child 964, 974 is made the current node. The common prefix of the current node key string and the data string is ascertained, however, the prefix length of the wildcard child 964, 974 is less than the node bit position. As such, the prefix length of the new data string is skipped and the next ternary bit value is extracted, "0" and remembered as "B", and a wildcard "x" is remembered as "C". Since the prefix length is six and the node bit position is eight, a new internal node is created with the prefix length as the node bit position, i.e. new internal node number six. Therefore, the "0101xx01" data string is inserted under the new internal node six 982 as the new external node 984 of the zero child and the old external node 964, 974 is linked to the new internal node 982. Finally, since there was an "A", the new internal node 982 is linked to the root of the tree 962, 972 as the wildcard child 982 to complete the insertion process.

Figure 23A:
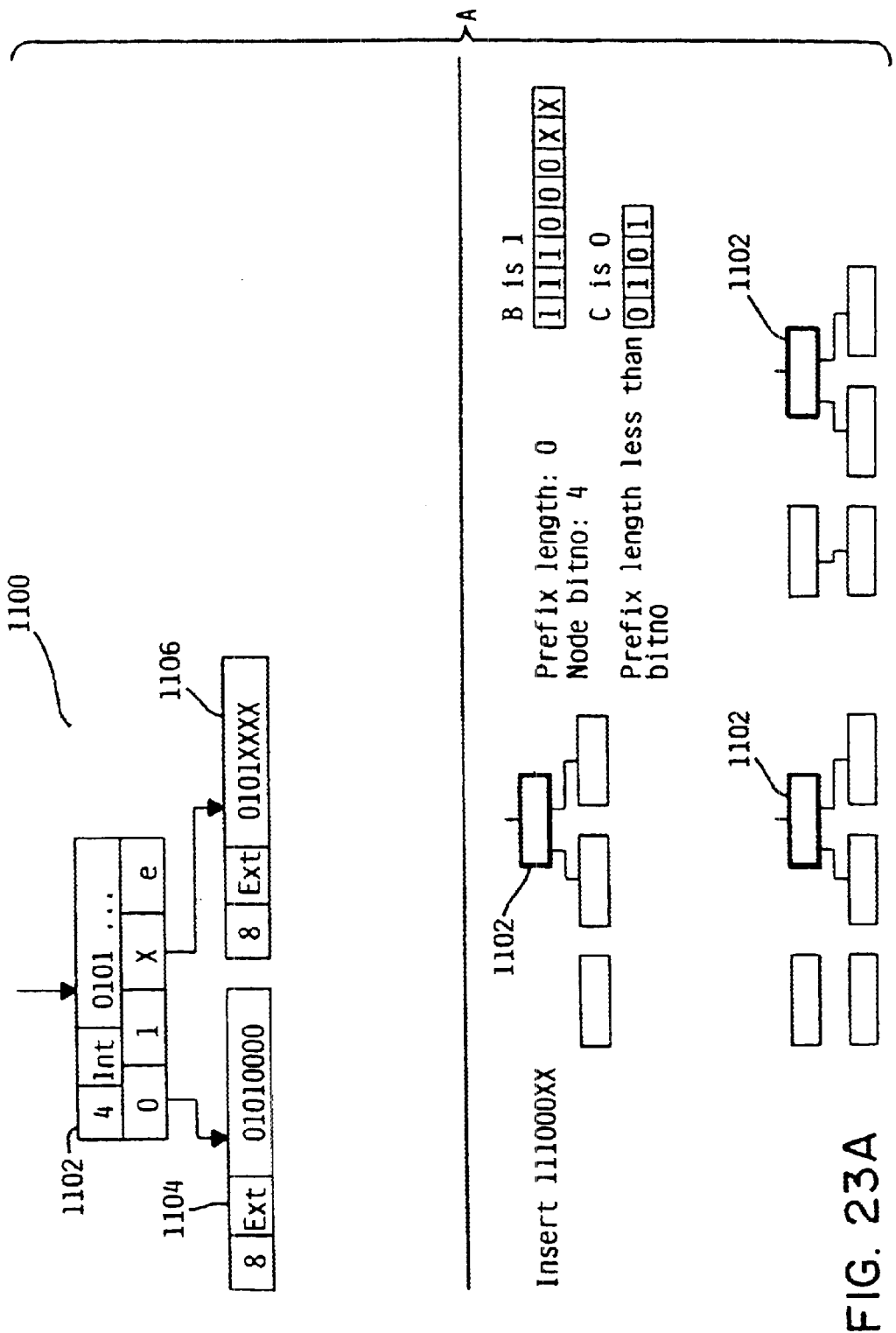
FIG. 23 is an example of a method of inserting data into the modified Patricia Tree of FIG. 1 with wildcard and epsilon children wherein the prefix length is less than the node bit number.
Figure 23B:
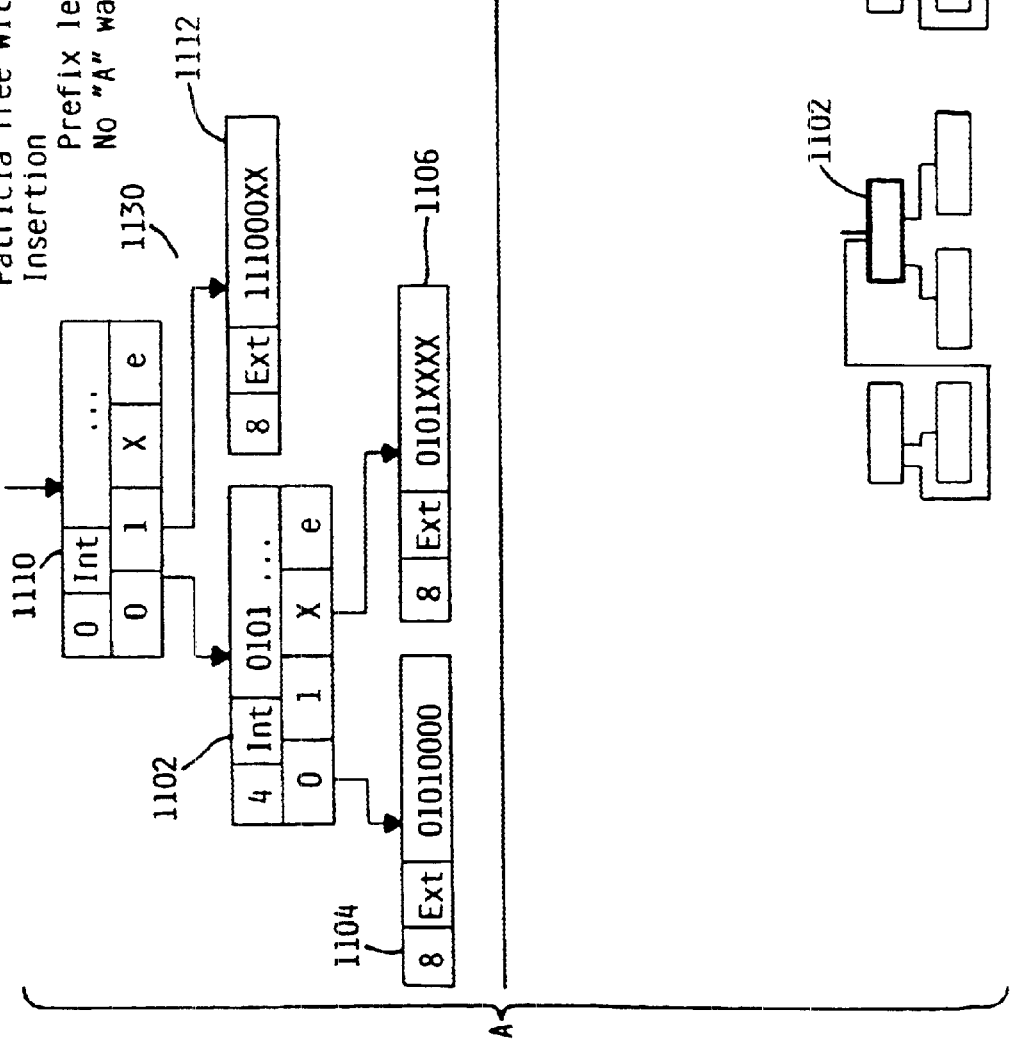

FIG. 23 is another insertion example wherein the new data string is "111000xx" and the prefix length, which is zero in this example, is less than the node bit position of the root of the tree 1102. An illustration of the tree prior to any modifications is shown at 1100, and the tree following insertion of new data strings is shown at 1130. It is determined that the tree is not empty and thereafter the insertion process starts at the root of the tree 1102. There is no common prefix between the node key string and the new data string. Therefore, the next ternary bit value "1" is extracted from the data string and remembered as "B", and the prefix length of the current node string is skipped and the new ternary bit value "0" is extracted and remembered as "C" which becomes the designation of the current node. Since the prefix length is zero and the node bit position is four, a new internal node 1110 is created with the prefix length zero as the node bit position, i.e. new root of the tree 1110. Therefore, the, new external node 1112 is linked to the new root of the tree 1110 as "B" and the current node 1102 is linked to the new root of the tree 1110 as "C" node. Accordingly, the new external node 1112 and the current node 1102 are now both linked to the new root of the tree 1110 as children of the root.

Figure 24A:
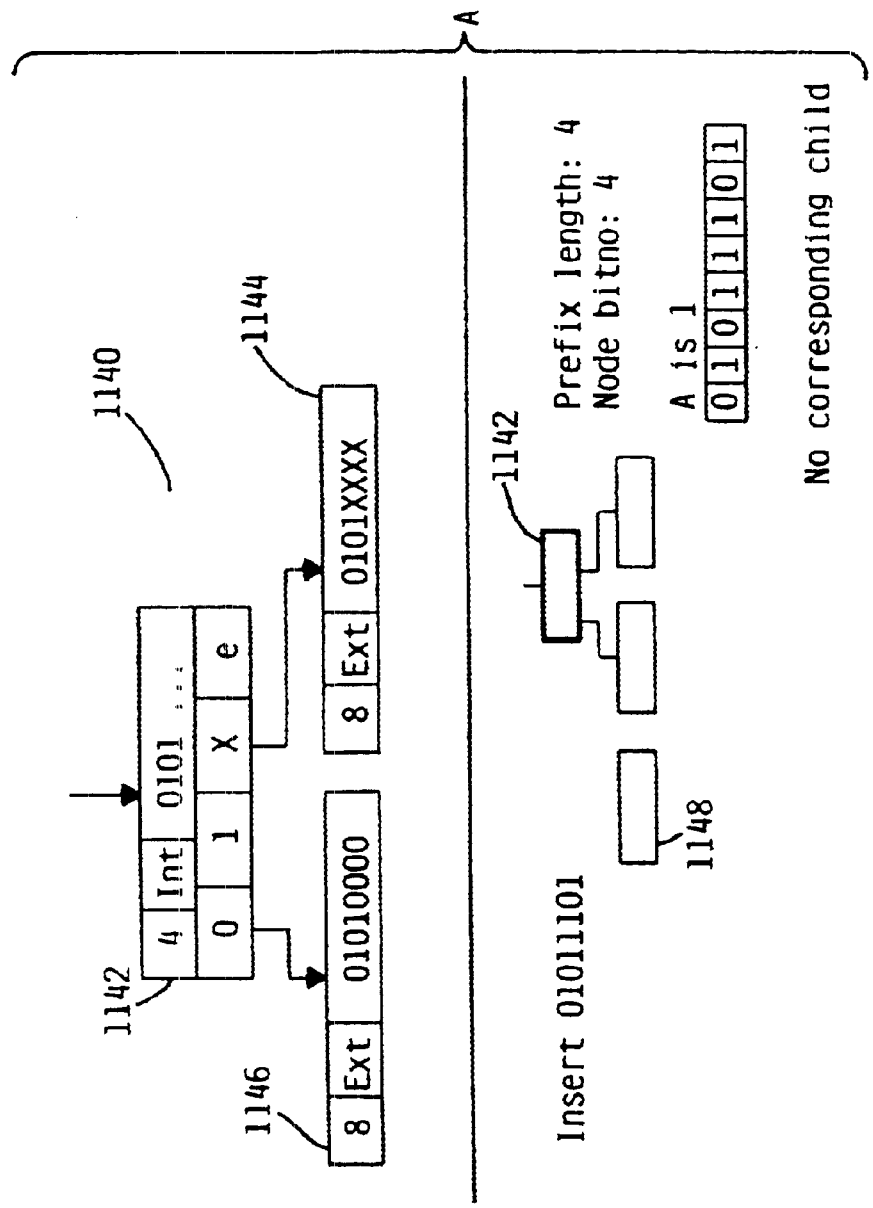
FIG. 24 is an example of a method of inserting data into the modified Patricia Tree of FIG. 1 with wildcard and epsilon children wherein the prefix key length is equal to the node bit number.
Figure 24B:
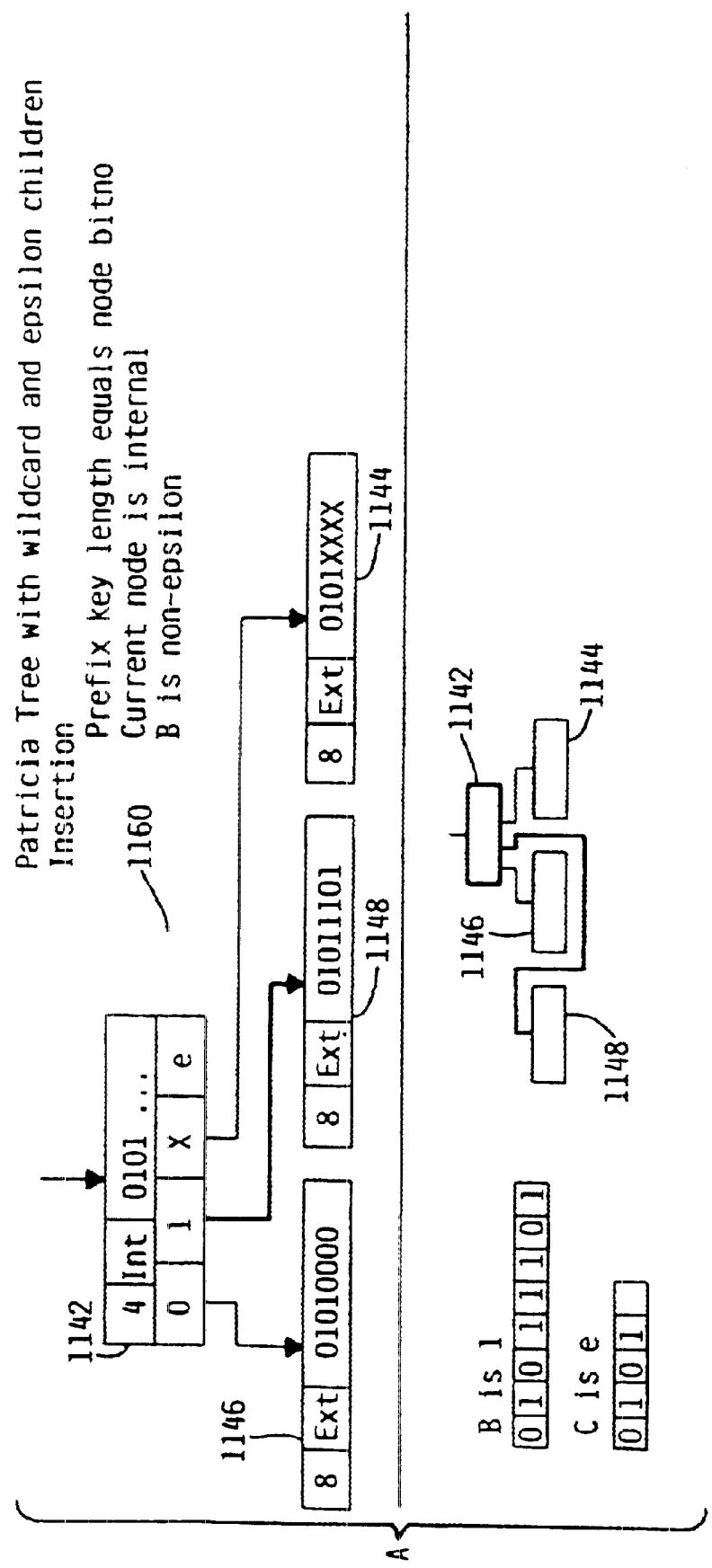

FIG. 24 is another insertion example wherein the new data string is "01011101". An illustration of the tree prior to any modifications is shown at 1140, and the tree following insertion of new data strings is shown at 1160. It is determined that the tree is not empty, and the insertion process starts at the root of the tree 1142. The common prefix between the node key string and the new data string is ascertained as "0101", and the prefix length is equal to the node bit position of the root of the tree 1142, which in this example is four. In addition, the current node is not external, and therefore the node bit position of the new data string is skipped and the next bit value "1" of the new data string is extracted and remembered as "A". The root of the tree 1142 does have a corresponding child in the form of a wildcard 1144, as such the wildcard child is not made the current node. The prefix length of the new data string is skipped and the next ternary bit value is extracted, "1", and remembered as "B", and the prefix length of the current node key string is skipped and the next ternary bit value "e" is remembered as "C". Since the prefix length of the data string is equal to the node bit position of the root of the tree 1142 number and the current node is an internal node, the new external node is linked to the current node as a "B" child, i.e. the new data string is linked to the root of the tree 1142 as the "1" child, and the zero and wildcard children remain unchanged.

Figure 25A:
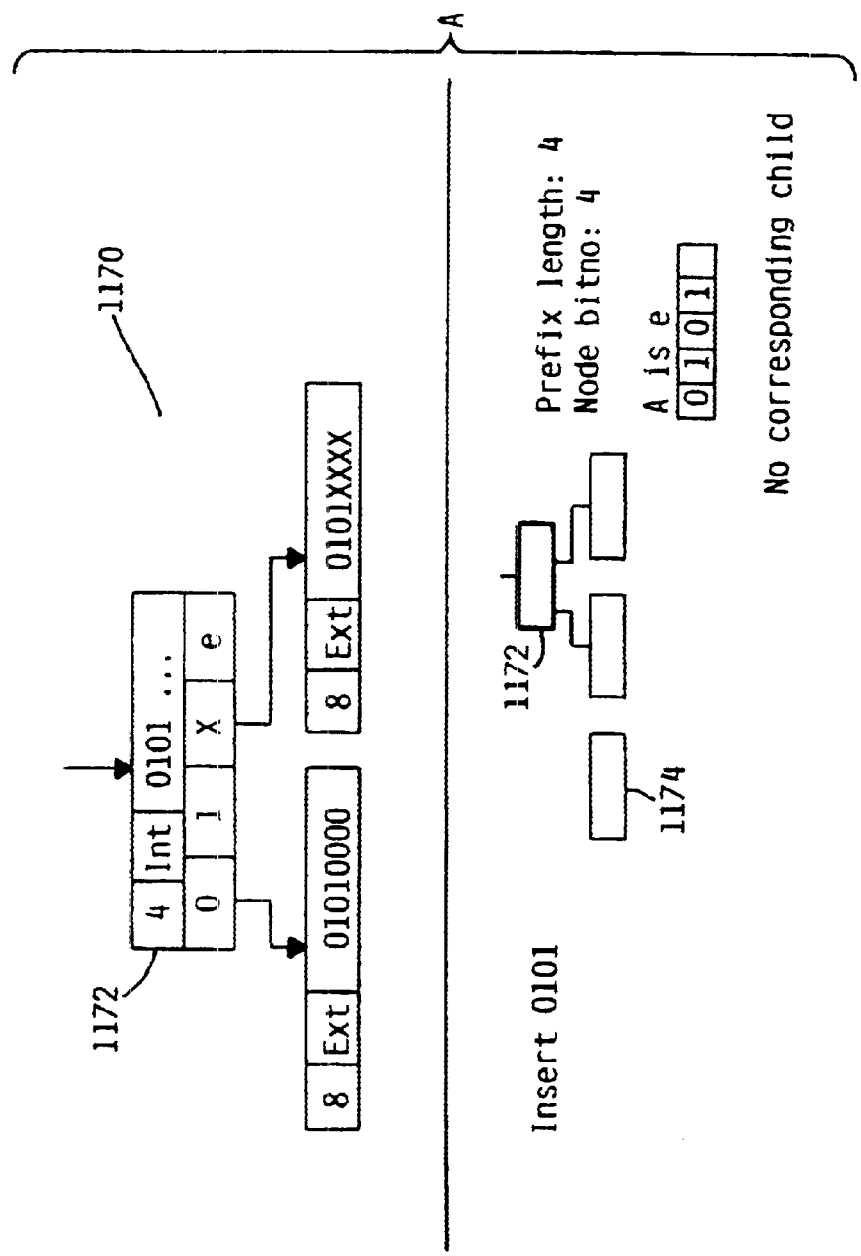
FIG. 25 is an example of a method of inserting data into the modified Patricia Tree of FIG. 1 with wildcard and epsilon children wherein the prefix key length is equal to the node bit number.
Figure 25B:
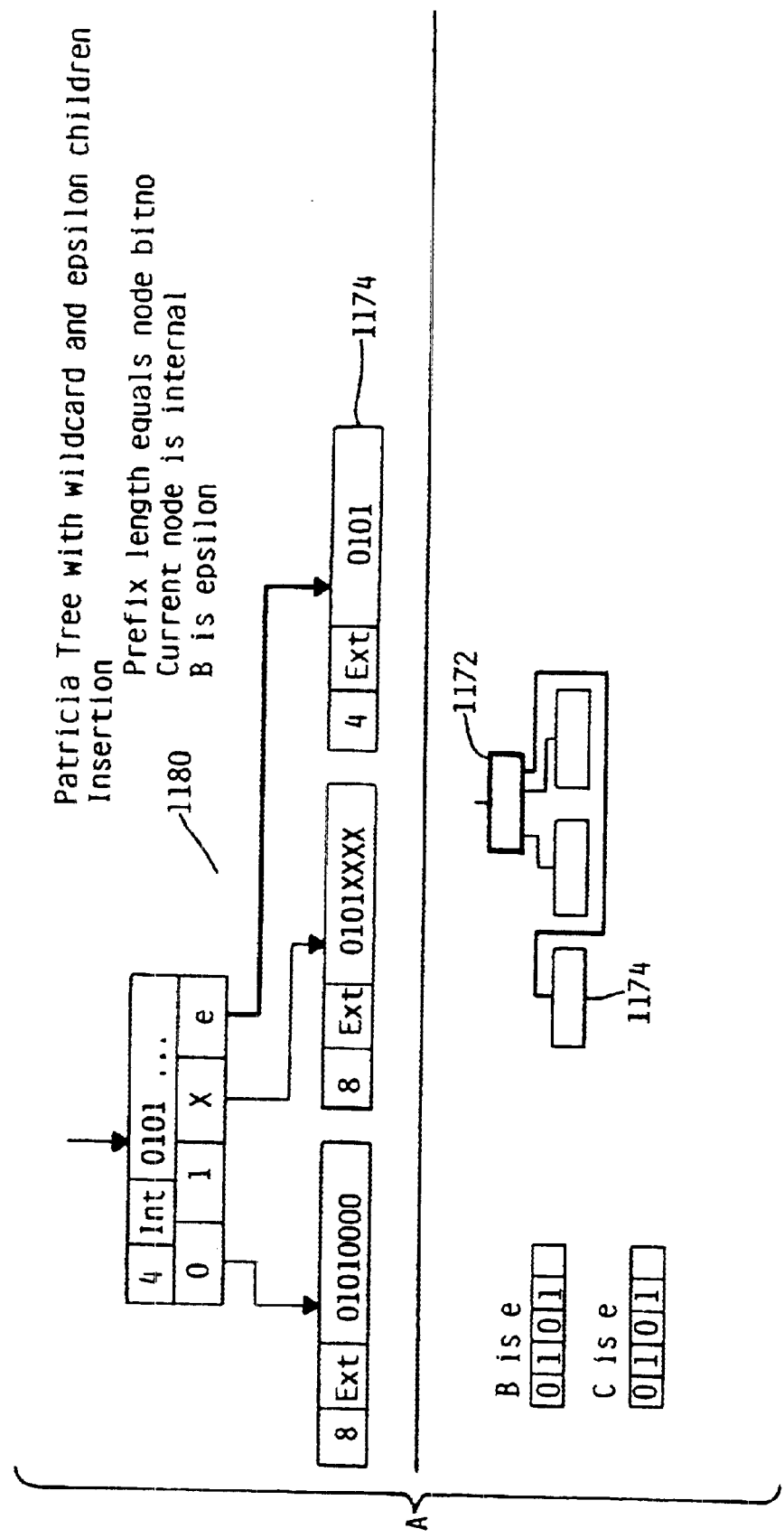

FIG. 25 is another insertion example wherein the new data string is "0101". An illustration of the tree prior to any modifications is shown at 1170, and the tree following insertion of new data strings is shown at 1190. It is determined that the tree is not empty, and the insertion process starts at the root of the tree 1172. The common prefix between the node key string and the new data string is ascertained as "0101", and the prefix length is equal to the node bit position of the root of the tree 1172, which in this example is four. In addition, the current node is not external, and therefore the node bit position of the new data string is skipped and the next ternary bit value is extracted and remembered as "A". In this example, there are no more bit values on the string, and as such "A" is an epsilon value, "B" is an epsilon value, and "C" is an epsilon value. Since the prefix length of the data string is equal to the node bit position of the root of the tree 1172 and the current node is an internal node, the new external node 1174 is linked to the root of the tree 1172 as an epsilon child, i.e. the new data string is linked to the root of the tree 1172 as the epsilon child, and the zero and wildcard children remain.

Figure 26A:
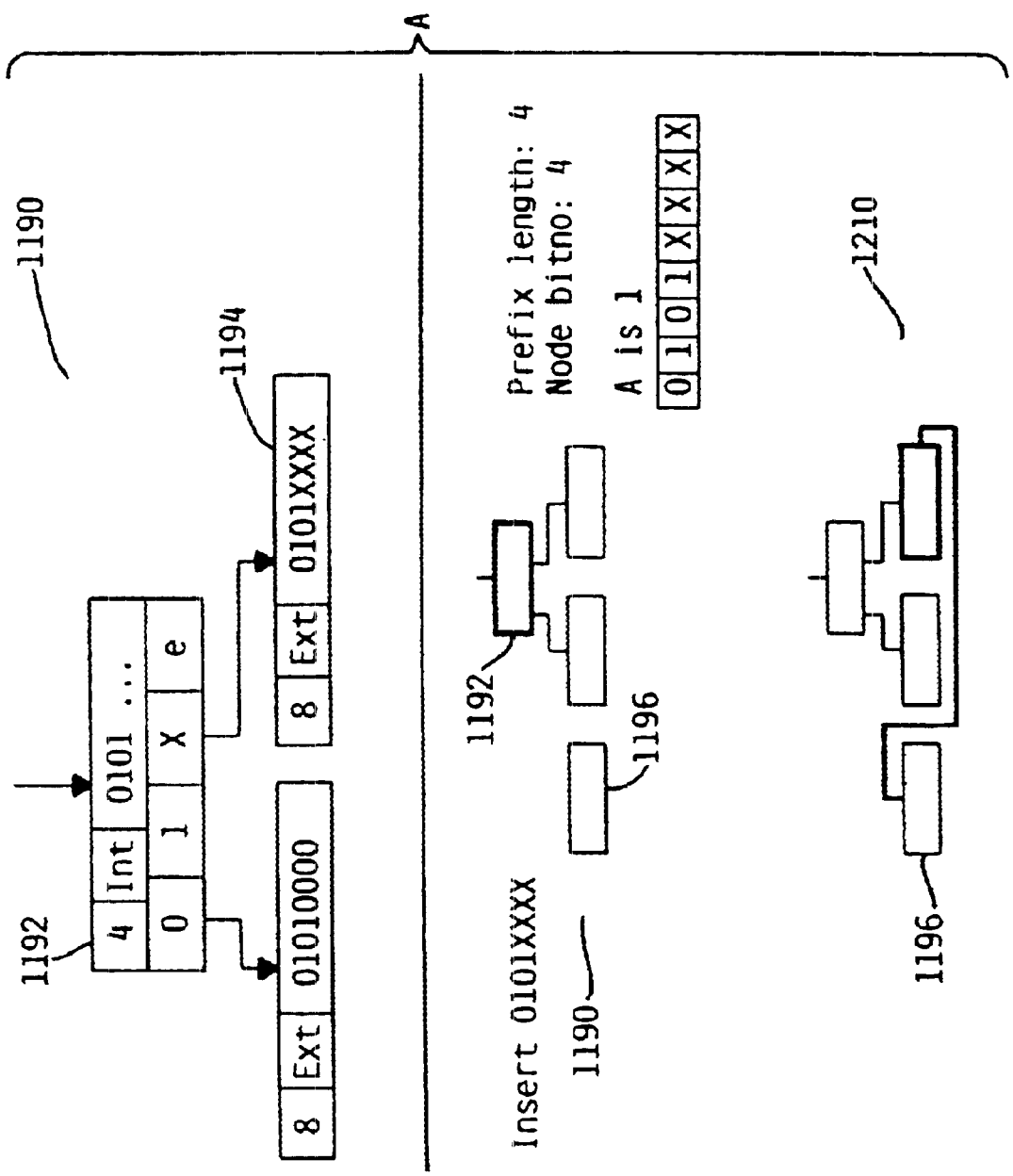
FIG. 26 is an example of a method of inserting data into the modified Patricia Tree of FIG. 1 with wildcard and epsilon children wherein the prefix key length is equal to the node bit number, the current node is external and the prefix length is equal to the new data key length.
Figure 26B:
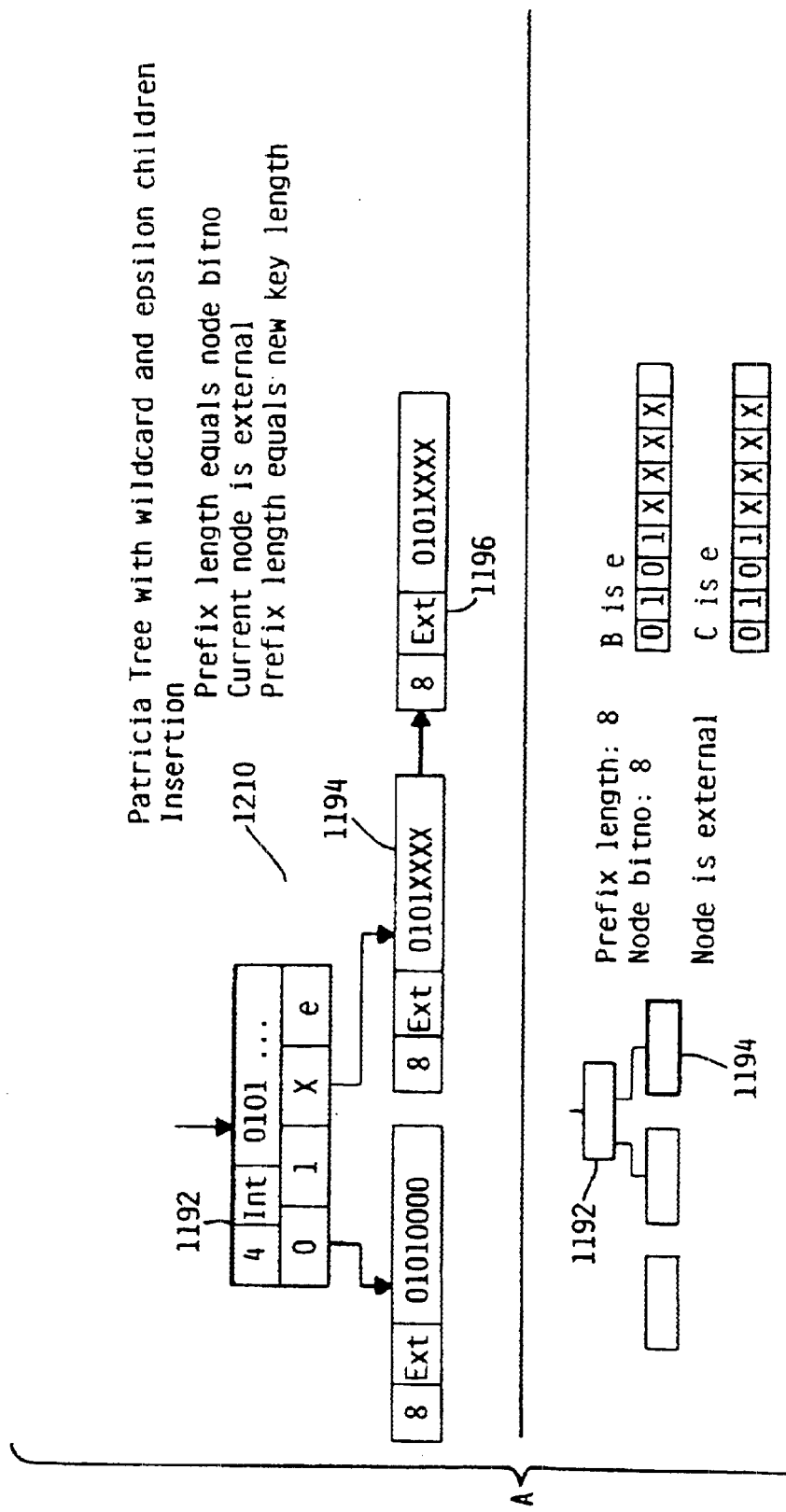

FIG. 26 is another insertion example wherein the new data string is "0101xxxx". An illustration of the tree prior to any modifications is shown at 1190, and the tree following insertion of new data strings is shown at 1210. It is determined that the tree is not empty, and the insertion process starts at the root of the tree 1192. The common prefix between the node key string and the new data string is ascertained as "0101", and the prefix length is equal to the node bit position of the root of the tree, which in this example is four. In addition, the current node is not external, and therefore the node bit position of the new data string is skipped and the next ternary bit value is extracted and remembered as "A". In this example, all the remaining bit values are wildcard values, and as such "A" is a wildcard, for which the current node has a wildcard child. As such, the corresponding child becomes the current node 1194, and the algorithm returns to find the common prefix. At external node eight emanating from the wildcard child of the root of the tree 1192, the prefix length is equal to the node bit position and the current node 1194 is external. As such, the "B" and "C" ternary bit values are extracted, which in this case are both the epsilon values since this is the end of the data string. Since the prefix length is also equal to the new key length, the new key string 1196 is linked to the current node 1194 as a sibling 1196 of that node. As shown herein, sibling nodes allow multiple entries for the same value in the tree under the same child when acting as a wildcard child as multiple entries of the same value can occur with the use of wildcards.

Figure 27A:
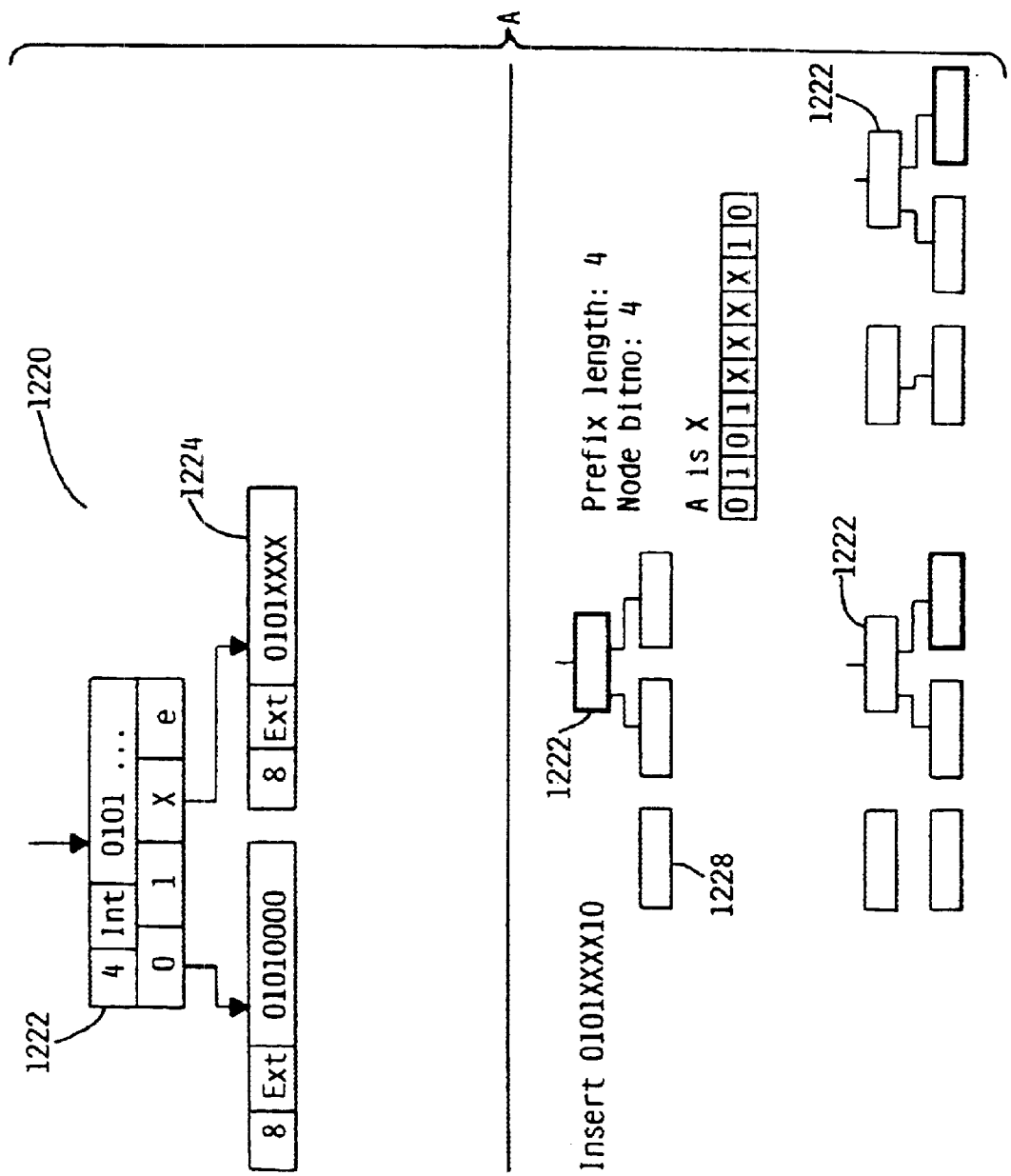
FIG. 27 is an example of a method of inserting data into the modified Patricia Tree of FIG. 1 with wildcard and epsilon children wherein the prefix key length is equal to the node bit number, the current node is external and the prefix length is less than the new data key length.
Figure 27B:
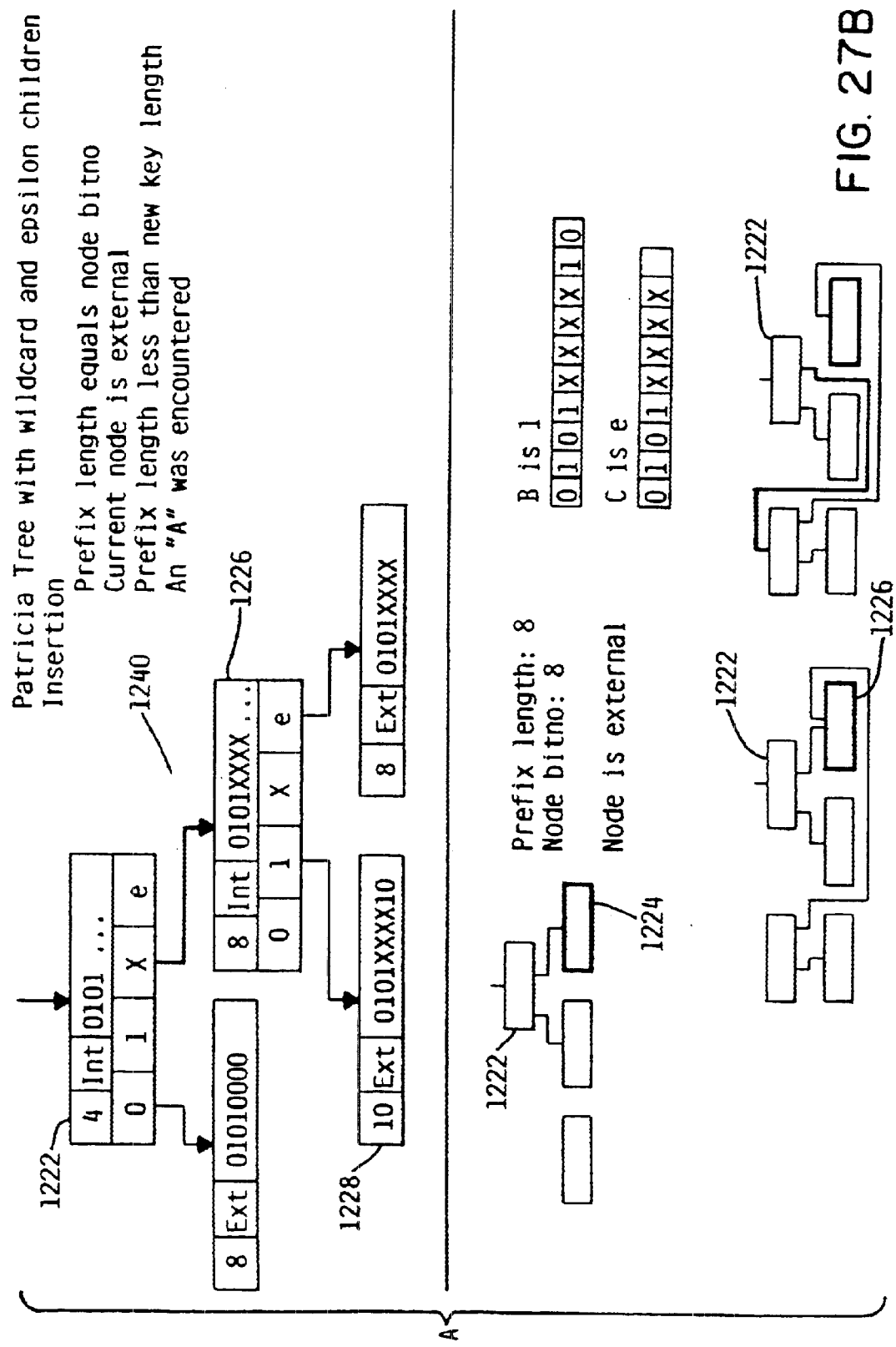

FIG. 27 is another insertion example wherein the new data string given is "1001xxxx10". An illustration of the tree prior to any modifications is shown at 1220, and the tree following insertion of new data strings is shown at 1240. It is determined that the tree is not empty, and the insertion process starts at the root of the tree 1222. The common prefix between the node key string and the new data string is ascertained as "0101" and the prefix length is equal to the node bit position of the root 1222 of the tree 1220, which in this example is four. In addition, the root of the tree 1222 is not external, and therefore the node bit position of the new data string is skipped and the next ternary bit value is extracted and remembered as "A". In this example "A" is a wildcard value "x". The root of the tree 1222 has a corresponding child for the wildcard value 1224, and as such the corresponding child 1224 becomes the current node and the algorithm for insertion returns to find the common prefix of the new node key string and the new key string. The prefix length of the new node key string is eight and the node bit position is also eight. However, since the new node is an external node, the "B" and "C" ternary bit values are extracted. The "B" value is the next ternary bit value following the prefix length, which is a "1" in this example, and the "C" is an epsilon value. Since the prefix length is equal to the node bit position at 1224, the current node is external and the prefix length is not equal to the new key length, a new internal node 1226 is created with the prefix length as the node bit position. The new external node 1228 is linked to the new internal node 1226 as a "B" child, in this example the "1" child, and the current node is linked to the new internal node 1226 as the "C" child, in this example the epsilon child. Finally, the new internal node 1226 is linked to the parent of the current node, i.e. the root of the tree 1222, as the "A" child, which in this example makes the new internal node 1226 a wildcard child of the root 1222 of the tree 1240.

Figure 28A:
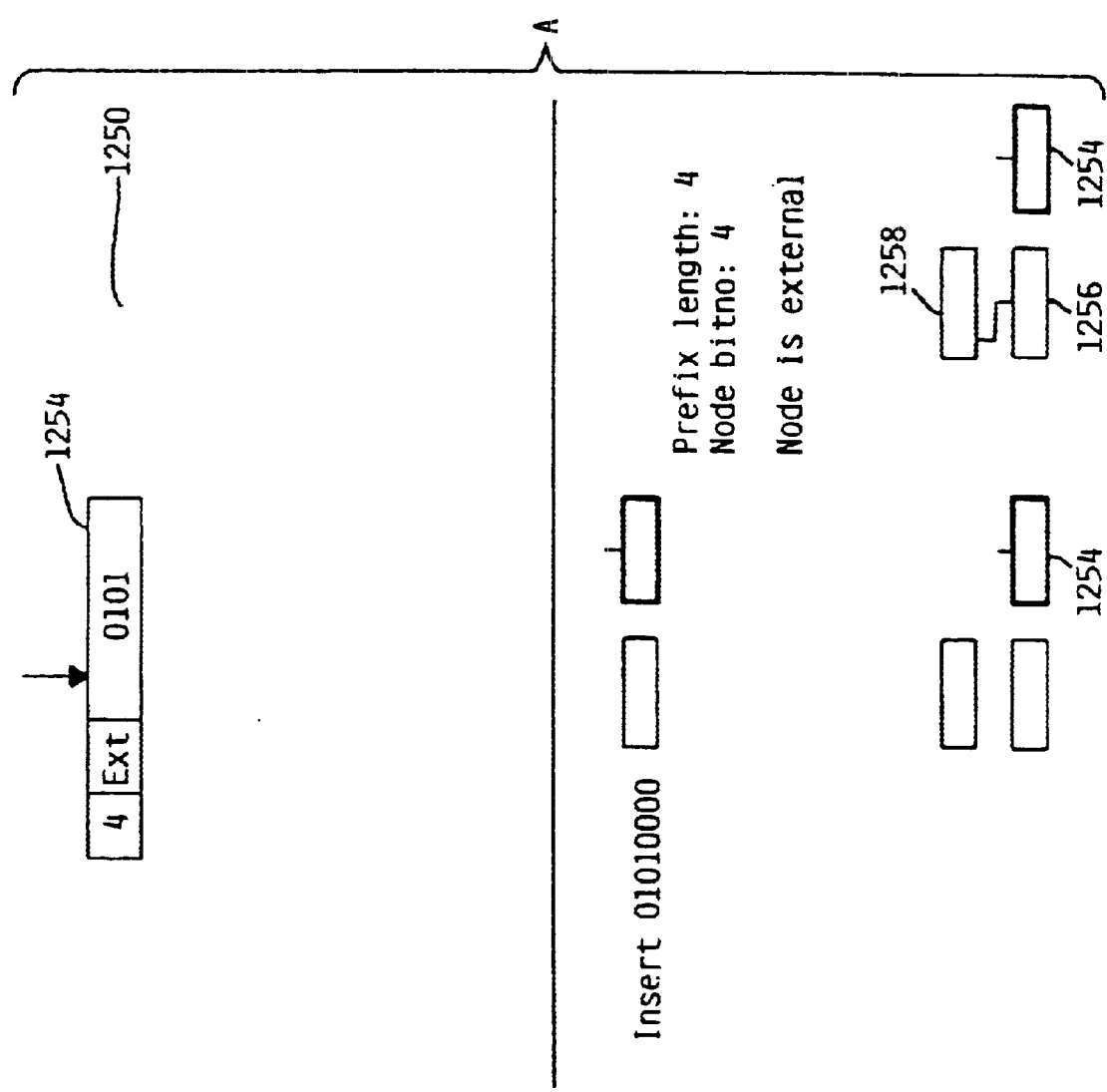
FIG. 28 is an example of a method of inserting data into the modified Patricia Tree of FIG. 1 with wildcard and epsilon children wherein the prefix key length is equal to the node bit number, the current node is external and the prefix length is less than the new data key length.
Figure 28B:
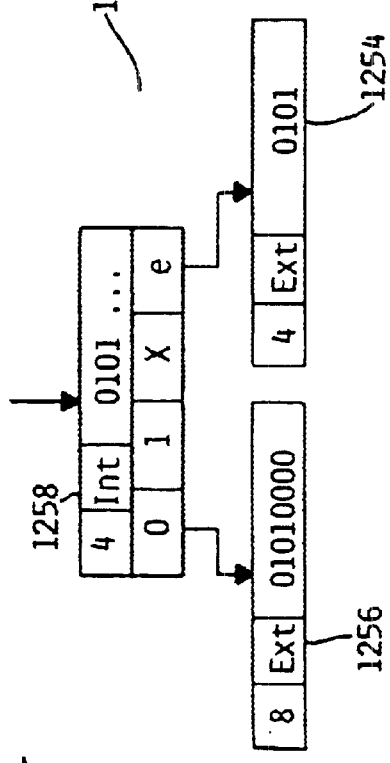
Figure 28B:
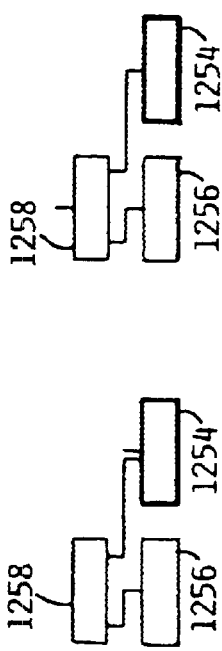

FIG. 28 is a final example of an insertion example wherein the new data string is "01010000". An illustration of the tree prior to any modifications is shown at 1250, and the tree following insertion of new data strings is shown at 1270. It is determined that the tree is not empty, and the insertion process starts at the root of the tree 1254. The common prefix between the node key string and the new data string is ascertained as "0101", and the prefix length is equal to the node bit position of the root 1254 of the tree 1250, which in this example is four. In addition, the current node 1254 is external. Therefore, the "A" ternary bit value is skipped, and the procedure continues to determine the "B" and "C" ternary bit values. In this example, "B" is a "0" bit value and "C" is an epsilon value. The prefix length is equal to the node bit position, which in this example is four, and the node is an internal node. In addition, the prefix length is not equal to the new key length. As such, a new internal node 1258 is created with the prefix length as the node bit position. A link is established with the new external node 1256 branching from the new internal node 1258 as a "B" child, and the current node 1254 branches from the new internal node 1258 as a "C" child. Since the "A" child was not encountered in this example, the new internal node is made the root of the tree as an atomic action.

Figure 38:
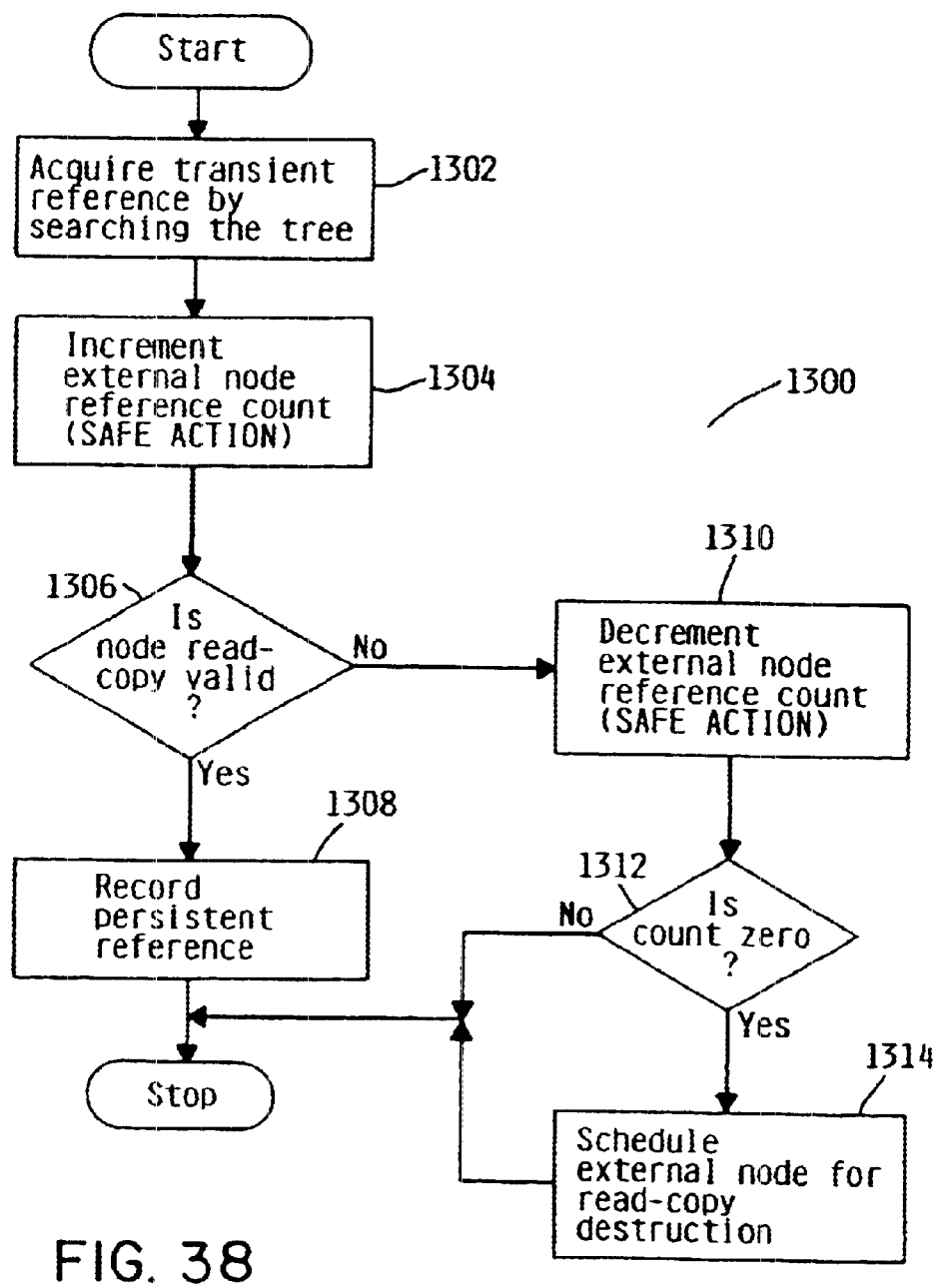
FIG. 38 is a flow chart illustrating a method of acquiring a persistent reference to an external node of the modified Patricia Tree of FIG. 1 with wildcard and epsilon children.
Figure 39:
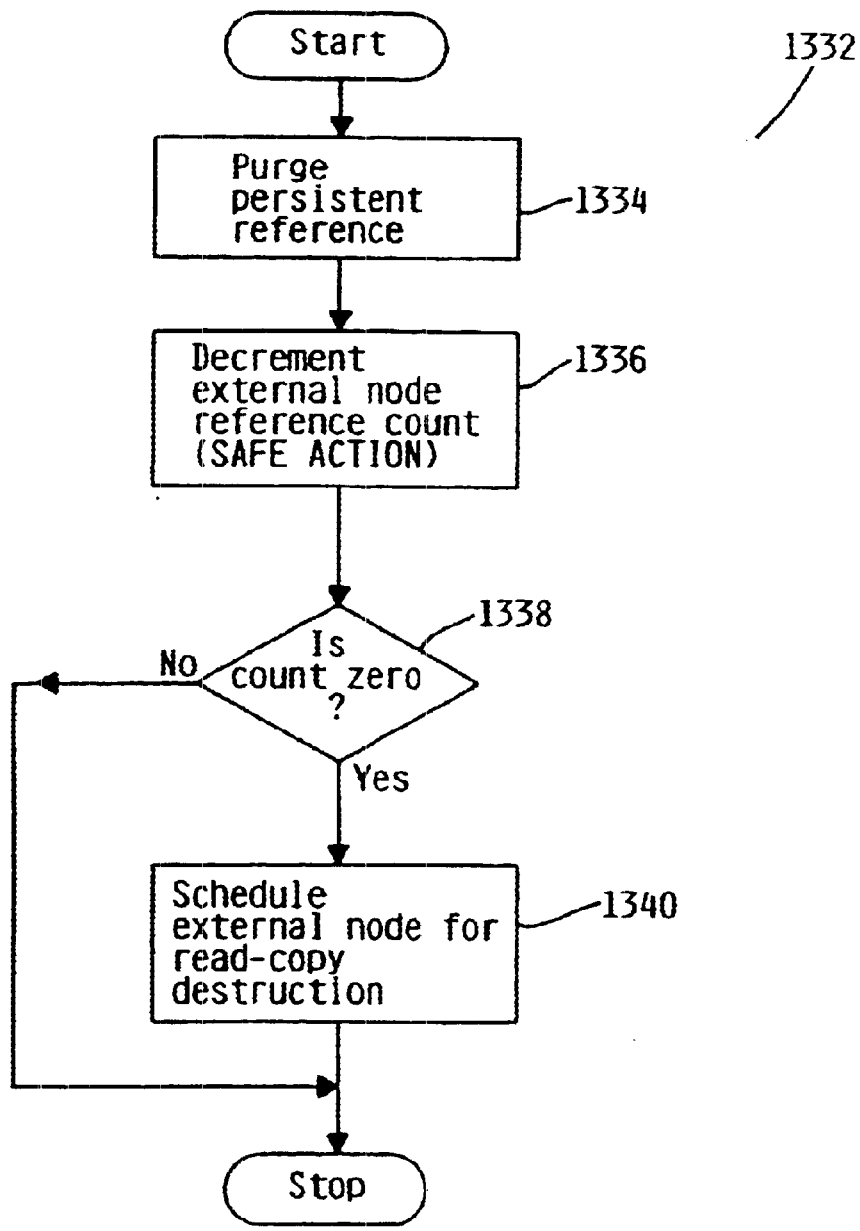
FIG. 39 is a flow chart illustrating a method of releasing a persistent reference to an external node of the modified Patricia Tree of FIG. 1 with wildcard and epsilon children.
Figure 40:
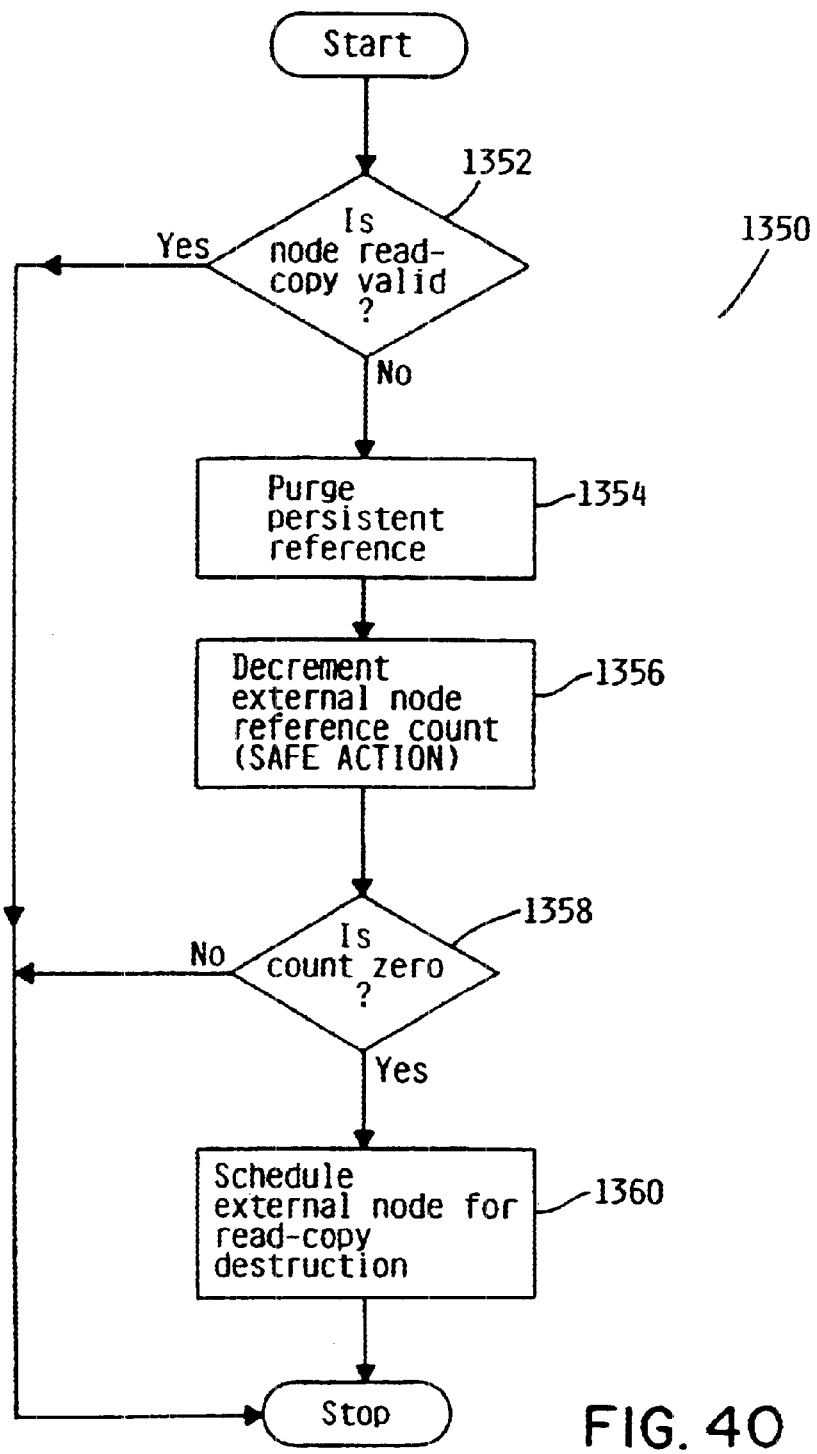
FIG. 40 is a flow chart illustrating a method of validating a persistent reference to an external node of the modified Patricia Tree of FIG. 1 with wildcard and epsilon children.

As noted and discussed above, modifications to the novel Patricia tree of the preferred embodiment is a critical process that directly impacts upon the efficiency of any search being conducted. As discussed above, FIGS. 21–28 are illustrations of the method of modifying the Patricia Tree in the form of inserting new nodes. Consequently, drawing FIGS. 29–37 are illustrative of how an existing node is removed from a tree. However, just as with the addition of new data strings to the tree structure, removing a node must maintain the integrity of the data structure and preserve a stable and coherent view of the table for concurrent readers. More specifically, the deletion process removes the node data as an atomic action while maintaining two of four way branching and preserves contents of the node for a period of time. Once it has been determined that a node is no longer in active use its contents are destroyed. FIGS. 38–40 illustrate the method of acquiring, releasing and validating if a particular node is in active use.

FIG. 38 is a flow chart 1300 outlining how an external data node within the modified Patricia Tree of the preferred embodiment becomes identified as a persistent data reference thereby preventing any user from attempting to destroy the node until the persistent reference is removed. In general, users can traverse a Patricia Tree on a one time basis never intending to reuse the route. However, if the user decides to reuse the route, they must save the route into persistent data so that the route is maintained until they have released the route. When first searching the tree, a transient reference is acquired 1302 such that the reference is safe for a short time period. The external node reference count is incremented 1304 as an atomic action. A query is then conducted to determine if the external node is read-copy valid 1306. This ensures that the data has not been removed from the tree during the time lapse from step 1302 to 1306. If the external node is read-copy valid than it is recorded as persistent data 1308 and cannot be destroyed until the reference is released. However, if the external node is not read-copy valid, it is apparent that the node has been removed from the tree during the time lapse from step 1302 to step 1306. As such, the external node reference count is decreased 1310 as this process cannot obtain a persistent reference to the node. If the external node reference count reaches zero 1312, then the node is scheduled for read-copy destruction 1314. Otherwise, the node remains undestroyed until all persistent reference acquisitions have been removed. Accordingly, the chart of FIG. 38 illustrates the steps for acquiring persistent references on specific external nodes.

FIG. 39 is a chart 1332 outlining the procedure for releasing a persistent reference count to an external node. When an external node has been acquired as a persistent data reference it cannot be destroyed until all persistent references have been removed thereby allowing the external node reference count to reach zero. The first step in removing a persistent reference from an external node is to purge the persistent reference 1334. The external node count is then decreased 1336 as an atomic action. If the reference count for the node becomes zero 1338, then the external node may be scheduled for read-copy destruction 1340. Otherwise, the node remains undestroyed. Accordingly, the release of an external node from persistent data allows the node to be prepared for destruction by placing a counter on the node, and only at such time as the counter has a zero balance may the node be actually scheduled for destruction.

Finally, FIG. 40 illustrates 1350 how a persistent reference is validated so as to avoid use of data removed from the search tree. The first step determines if the node is read-copy valid 1352. If the answer to step 1352 is positive, then the external node is still present in the search tree and may be used for the remainder of a safe reading interval. However, if the answer to 1352 is negative, then the persistent reference to the external is released 1354 and the external node reference count is decreased 1356 as an atomic action. If the count on the external reference node becomes zero 1358, then the node is scheduled for read-copy destruction 1360. Accordingly, the steps outlined in FIG. 40 demonstrate how a persistent reference to an existing external node is verified and maintained, or alternatively, how the external node may be set for destruction in the event the reference count is empty. After releasing a persistant reference because the referenced node is no longer valid 1352, the process is free to follow the procedure of FIG. 38 to acquire a fresh persistent reference.

Figure 29A:
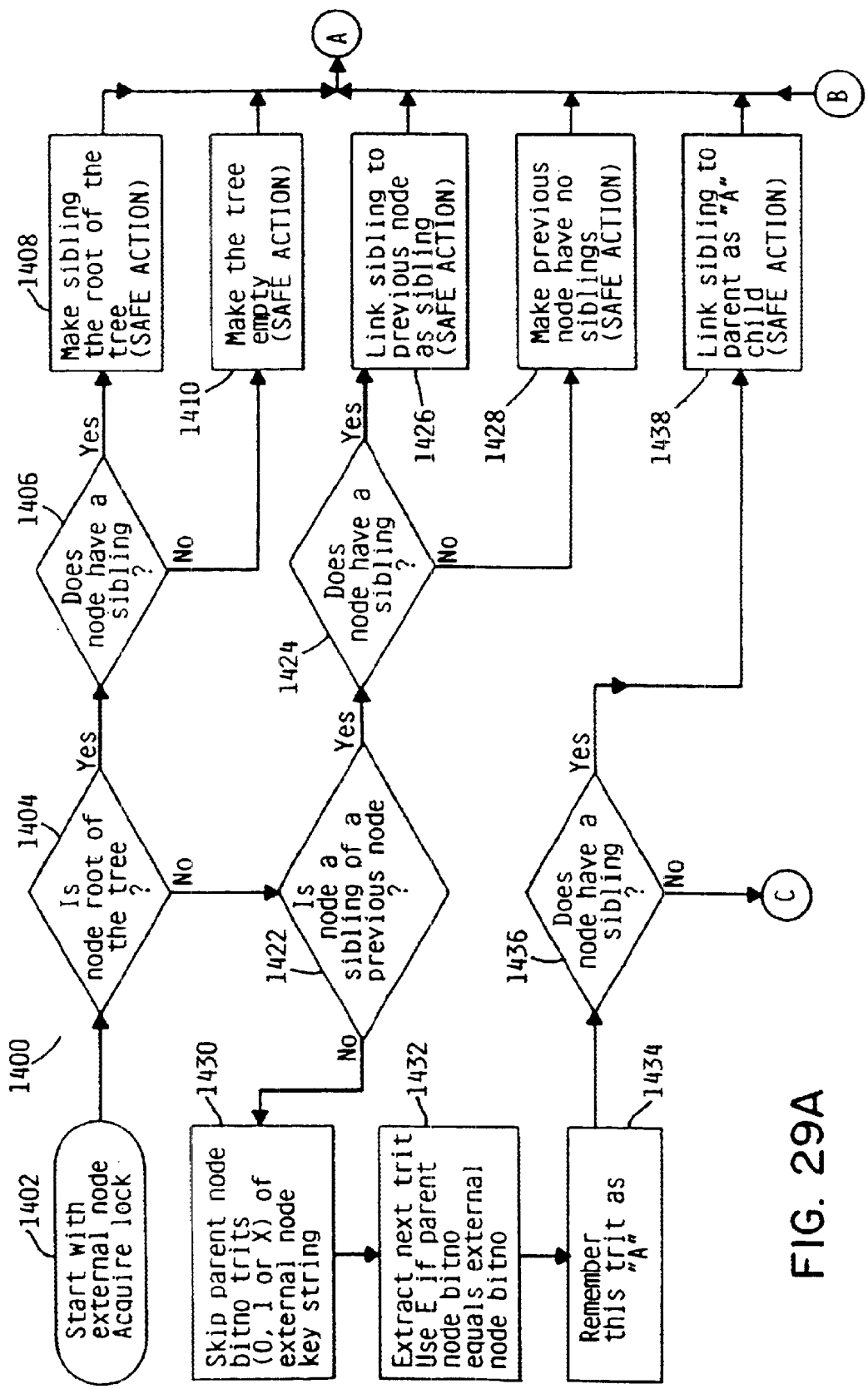
FIG. 29 is a flow chart illustrating a method of removing data nodes from the modified Patricia Tree of FIG. 1 with wildcard and epsilon children.
Figure 29B:
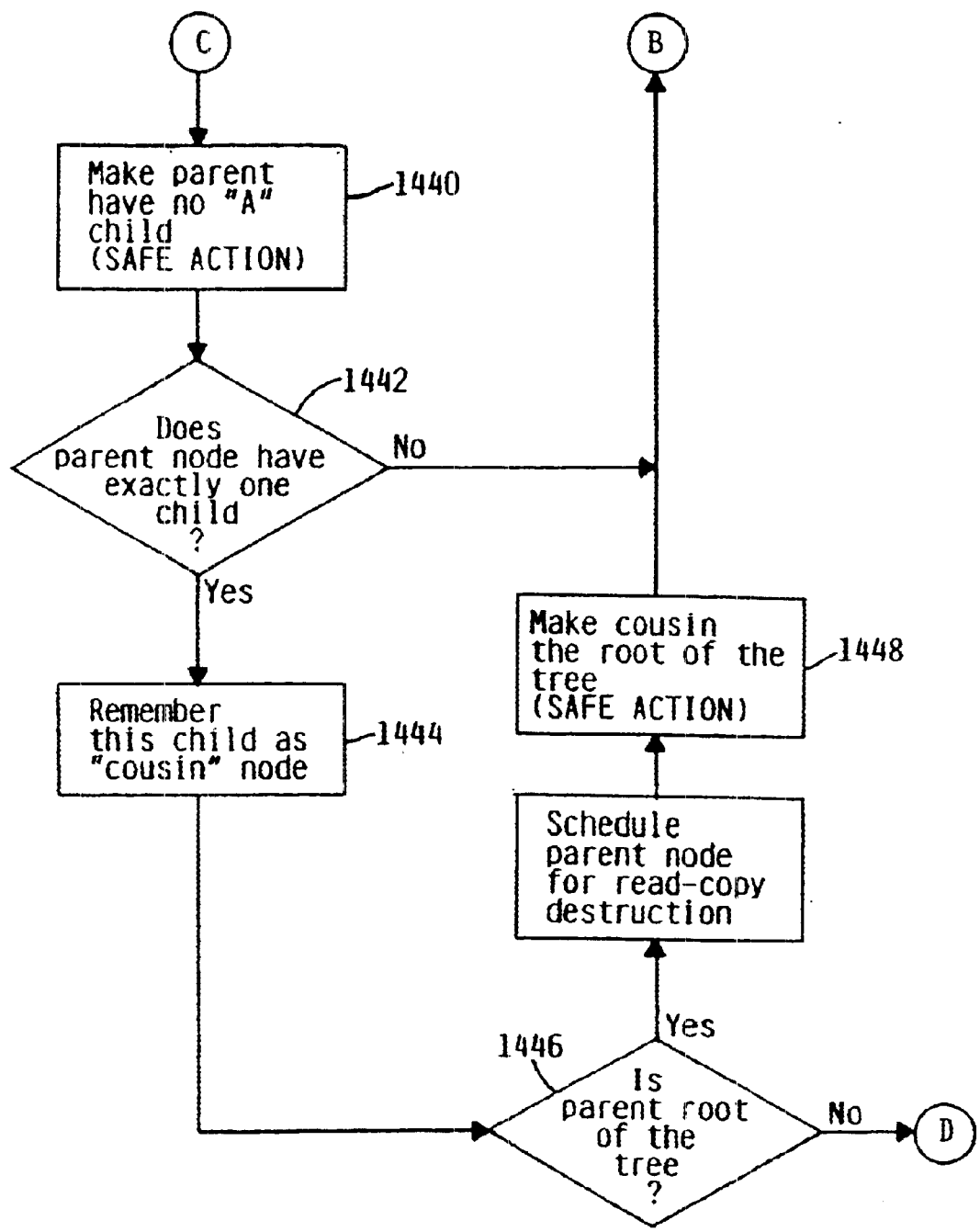
Figure 29C:
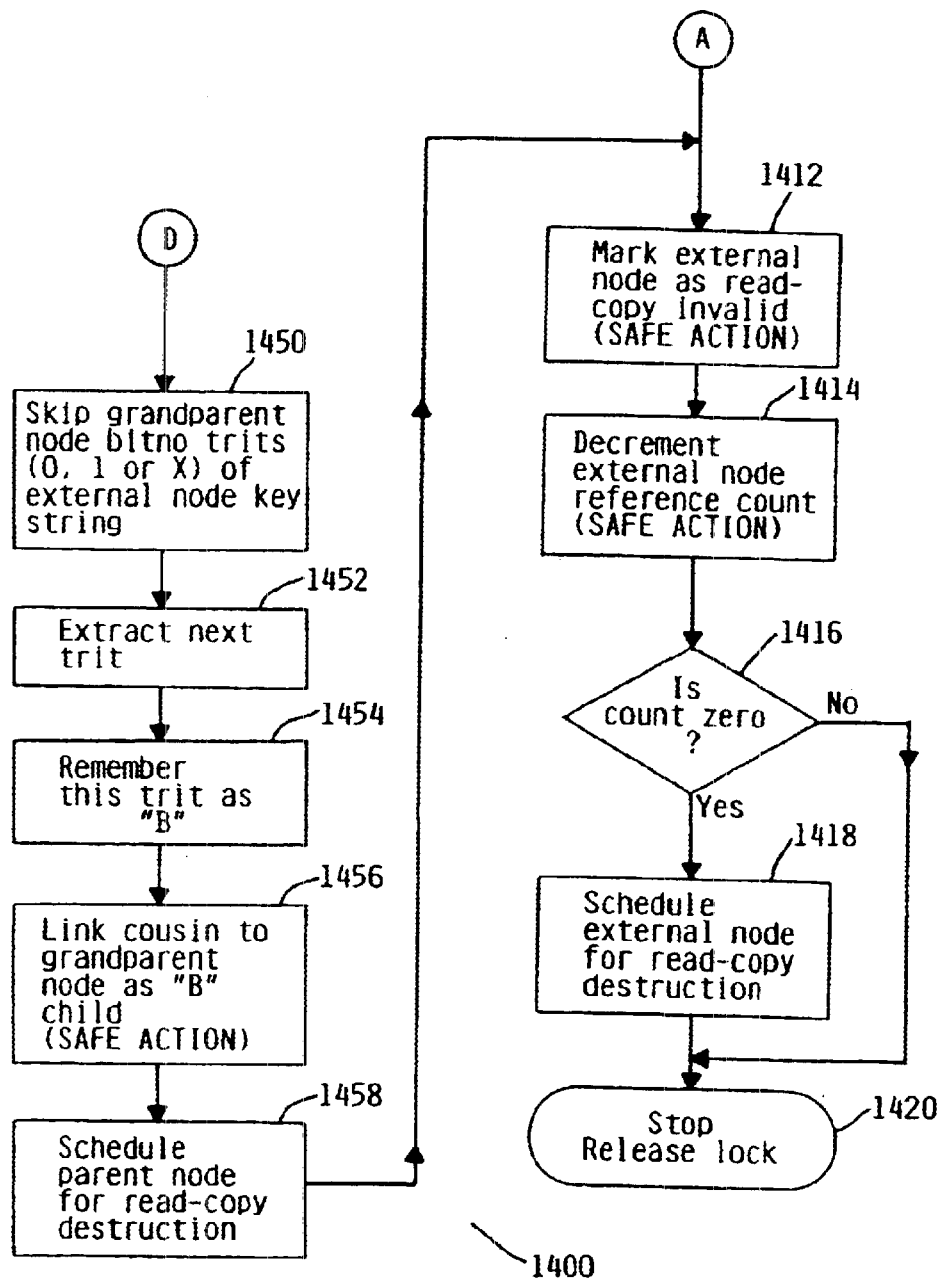

FIG. 29 is a flow chart 1400 illustrating the method of removing nodes from the modified Patricia Tree of the preferred embodiment and, as such, modifying the data structure. All deletions begin at external nodes and a lock must be acquired 1402 to serialize modifications to the data structure. A query is conducted to determine if the node is the root of the tree 1404. If the node is the root of the tree, it must be determined if the node has a sibling 1406. In the event the node has a sibling, the sibling is made the root of the tree 1408. Step 1408 is an atomic action. Alternatively, if following step 1406 it is determined that the node does not have a sibling, the tree is made empty 1410 in an atomic action. Following steps 1408 and 1410 the external node is marked as read-copy invalid 1412 through an atomic action, and the external node reference count is decreased 1414 through an atomic action. As illustrated in FIGS. 38–40, if the reference count is zero 1416, the node is scheduled for read-copy destruction 1418. However, if the reference count is not zero 1416, the node cannot be scheduled for read-copy destruction until the reference count has reached zero. In either case 1416, the lock on the table is released after the node has been removed.

Alternatively, if the external node set for removal is not the root of the tree, it must be determined 1422 if the node is a sibling of a previous node. If the answer to 1422 is positive, it must then be determined 1424 if the current node has a sibling. In the event the answer to 1424 is positive, then the current node's sibling is linked to the previous node as a sibling 1426 through an atomic action and the process proceeds to step 1412. Otherwise, the previous node is made to have no siblings 1428 through an atomic action and the process proceeds to step 1412. If at 1422, it is determined that the node set for deletion is not the root of the tree and it is not a sibling of a previous node, then the process skips a number of bits of the external node key string equal to the parent node bit number 1430 and extracts the next ternary value 1432, using the epsilon value if the parent node bit number is equivalent to the external node bit number. This ternary value is then remembered as "A" 1434, and if the node to be removed has a sibling 1436, then the sibling is linked to the parent as an "A" child 1438. However, if the node to be removed does not have a sibling, then the parent is made to have no "A" child 1440.

Subsequent to 1440, it must be determined if the parent node has only one child remaining 1442. If the parent node does not have exactly one child, then the process proceeds to steps 1412–1420. However, if the parent node does have exactly one child, then this child must be remembered as a cousin node 1444, and it must be determined if the parent is the root of the tree 1446. If at 1446, it is determined that the parent is the root of the tree, then the parent node is scheduled for destruction, the cousin is made the root of the tree 1448 as an atomic action, and the process for deletion proceeds to steps 1450–1458.

It is the proper functioning of any Patricia Tree to require that all internal nodes of the tree provide us with at least two choices, with the modified Patricia Tree of the preferred embodiment providing between two and four choices. In order to maintain a proper structure of the Patricia Tree, the process of deleting external nodes must also insure that no internal node remains with only one child. Therefore, if the parent is not the root of the tree, the process proceeds with the bit number of the grandparent node, i.e. the parent node of the parent node, skipping a number of bits of the external node key string equal to the grandparent node bit number 1450, extracting the next ternary value 1452, remembering this ternary value as "B" 1454, linking the cousin to the grandparent node as the "B" child 1456, scheduling the parent node for read-copy destruction and proceeding to steps 1412–1420 for removal of the external node from the tree.

Figure 30:
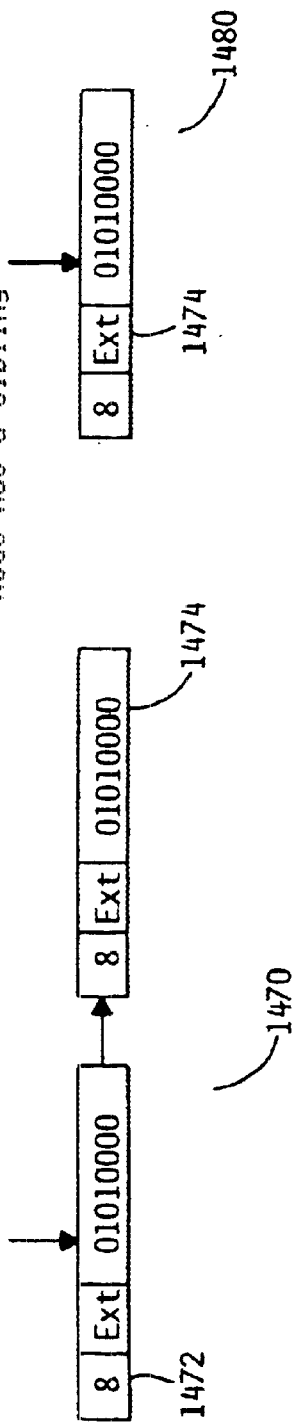
FIG. 30 is an example of a method of removing data from the modified Patricia Tree of FIG. 1 with wildcard and epsilon children, wherein the node is the root of the tree and the node has a sibling.

FIG. 30 is an example of removing an external node from a tree. The node set for removal 1472 is an external node with a sibling 1474. An illustration of the tree prior to any modifications is shown at 1470, and the tree following deletion of 1472 is shown at 1480. It is determined that the external node 1472 is not the root of the tree, and the external node 1472 has a sibling 1474. The sibling becomes the root of the tree 1474, and the external node 1472 is marked as read-copy invalid, the external node reference count is decreased, preparing the external node 1472 for removal and destruction.

Figure 31:
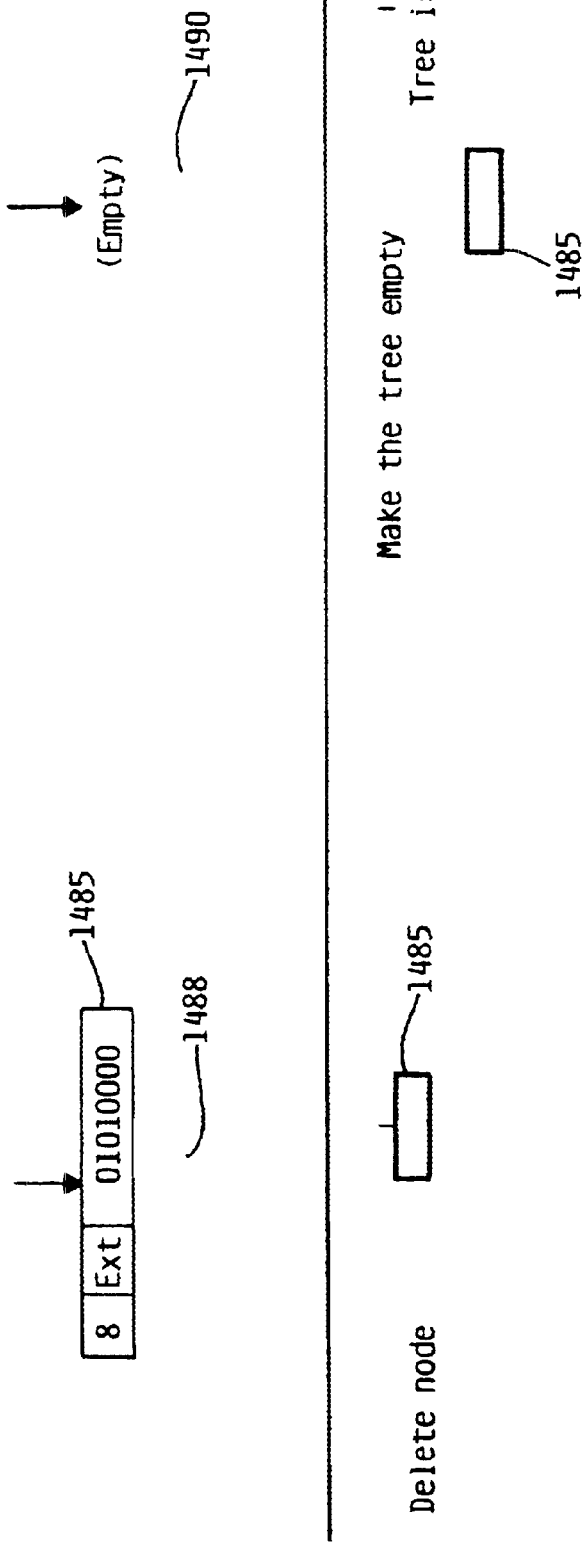
FIG. 31 is an example of a method of removing data from the modified Patricia Tree of FIG. 1 with wildcard and epsilon children, wherein the node is the root of the tree and the node does not have a sibling.

FIG. 31 is another example of removing an external node from a tree. The node set for removal is an external node 1485, which does not have a sibling. An illustration of the tree prior to any modifications is shown at 1488, and the tree following deletion of the external node 1485 is shown at 1490. It is determined that the external node 1485 is the root of the tree, and the external node 1485 does not have a sibling. The tree is marked as empty, as shown at 1490, the external node 1485 is marked as read-copy invalid, and the external node reference count is decreased, preparing the node for removal and destruction.

Figure 32:
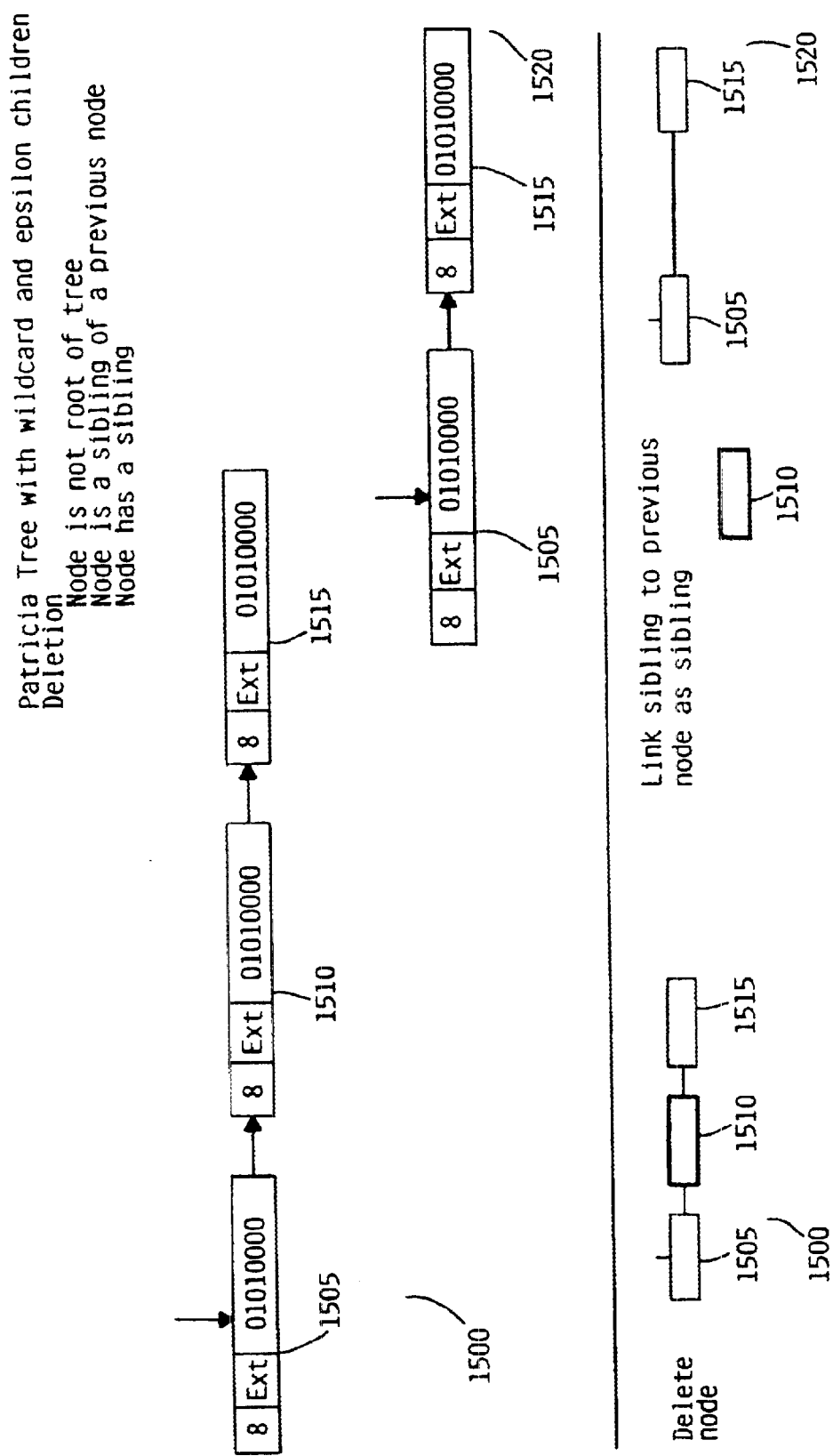
FIG. 32 is an example of a method of removing data from the modified Patricia Tree of FIG. 1 with wildcard and epsilon children, wherein the node is not the root of the tree, the node is a sibling of a previous node, and the node has a sibling.

FIG. 32 is another example of removing an external node from a tree. The node set for removal is an external node 1510 with two siblings. An illustration of the tree prior to any modifications is shown at 1500, and the tree following deletion of the external node 1510 is shown at 1520. It is determined that the external node 1510 is not the root of the tree, and the external node 1510 has two siblings 1505 and 1515. The external node 1510 is a sibling of a previous node 1505, and the node 1510 has a sibling 1515. The sibling 1515 is linked to the previous node 1505 as a sibling, and the external node 1510 is marked as read-copy invalid, and the external node reference count is decreased preparing the external node 1510 for removal and destruction.

Figure 33:
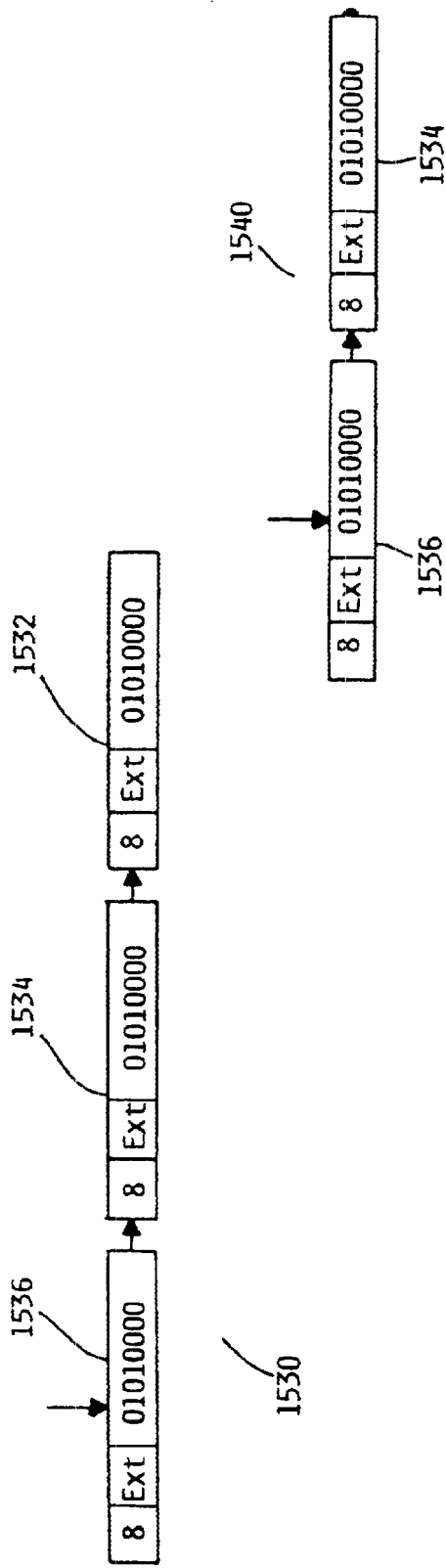
FIG. 33 is an example of a method of removing data from the modified Patricia Tree of FIG. 1 with wildcard and epsilon children, wherein the node is not the root of the tree, the node is a sibling of a previous node, and the node does not have a sibling.
Figure 33:

FIG. 33 is another example of removing an external node from a tree. The node set for removal is an external node 1532 with two siblings 1534 and 1536. An illustration of the tree prior to any modifications is shown at 1530, and the tree following deletion of external node 1532 is shown at 1540. It is determined that the external node 1532 is not the root of the tree, and the external node 1532 has two siblings 1534 and 1536. The external node 1532 is a sibling of a previous node 1534, and the node does not have a subsequent sibling. Therefore, the external node 1532 is marked as read-copy invalid, and the external node reference count is decreased preparing the external node 1532 for removal and destruction.

Figure 34A:
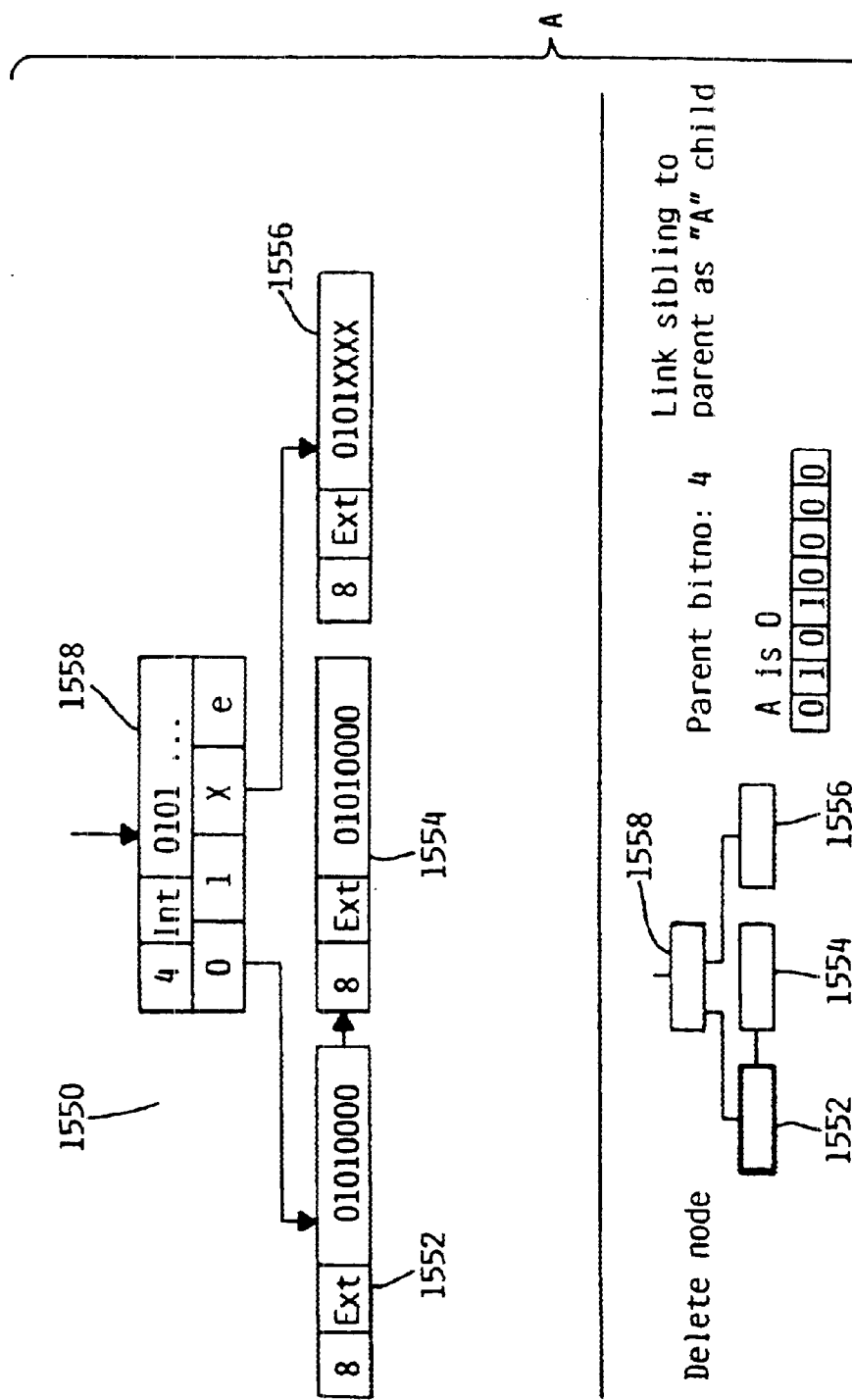
FIG. 34 is an example of a method of removing data from the modified Patricia Tree of FIG. 1 with wildcard and epsilon children, wherein the node is not the root of the tree, the node is not a sibling of a previous node, and the node has a sibling.
Figure 34B:
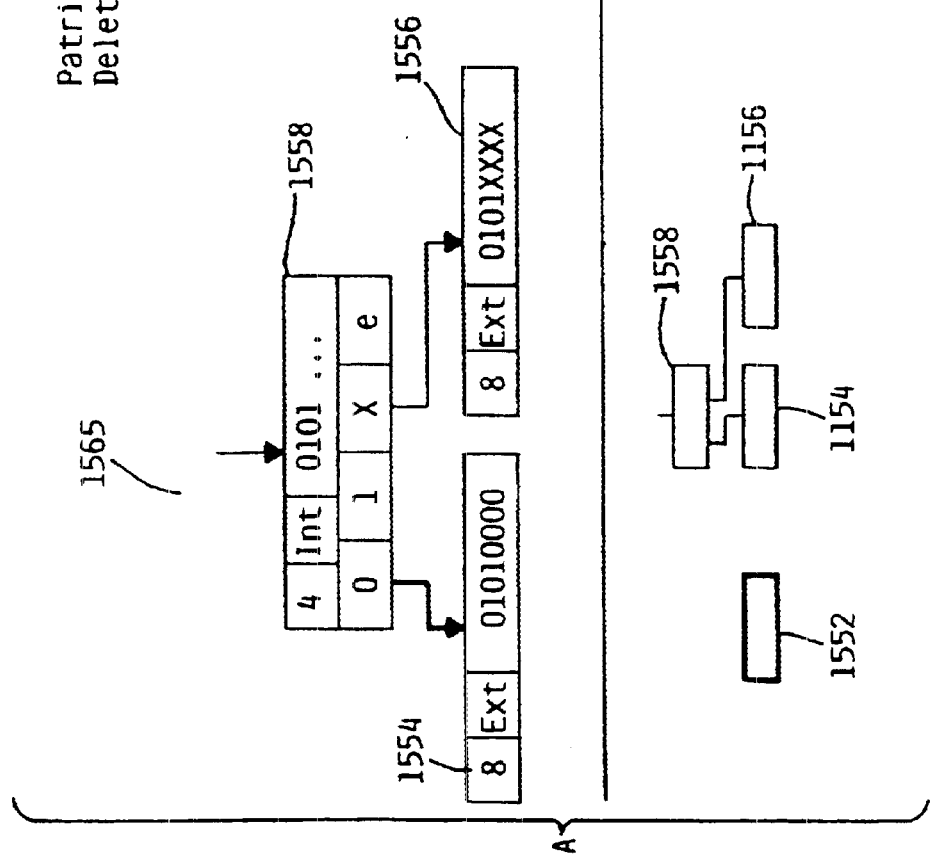

FIG. 34 is another example of removing an external node from a tree. The node set for removal is an external node 1552 with a sibling. An illustration of the tree prior to any modifications is shown at 1550, and the tree following deletion of external node 1552 is shown at 1565. It is determined that the external node 1552 is not the root of the tree, external node 1552 is not a sibling of a previous node. The parent node bit position of ternary bits of the external node key string is skipped, the next ternary bit value is extracted and remembered as "A", which in this example is 0. The external node 1552 has a sibling 1554. The sibling 1554 is linked to the parent 1558 as an "A" child. The external node 1552 is marked as read-copy invalid, and the external node reference count is decreased preparing the external node 1552 for removal and destruction.

Figure 35A:
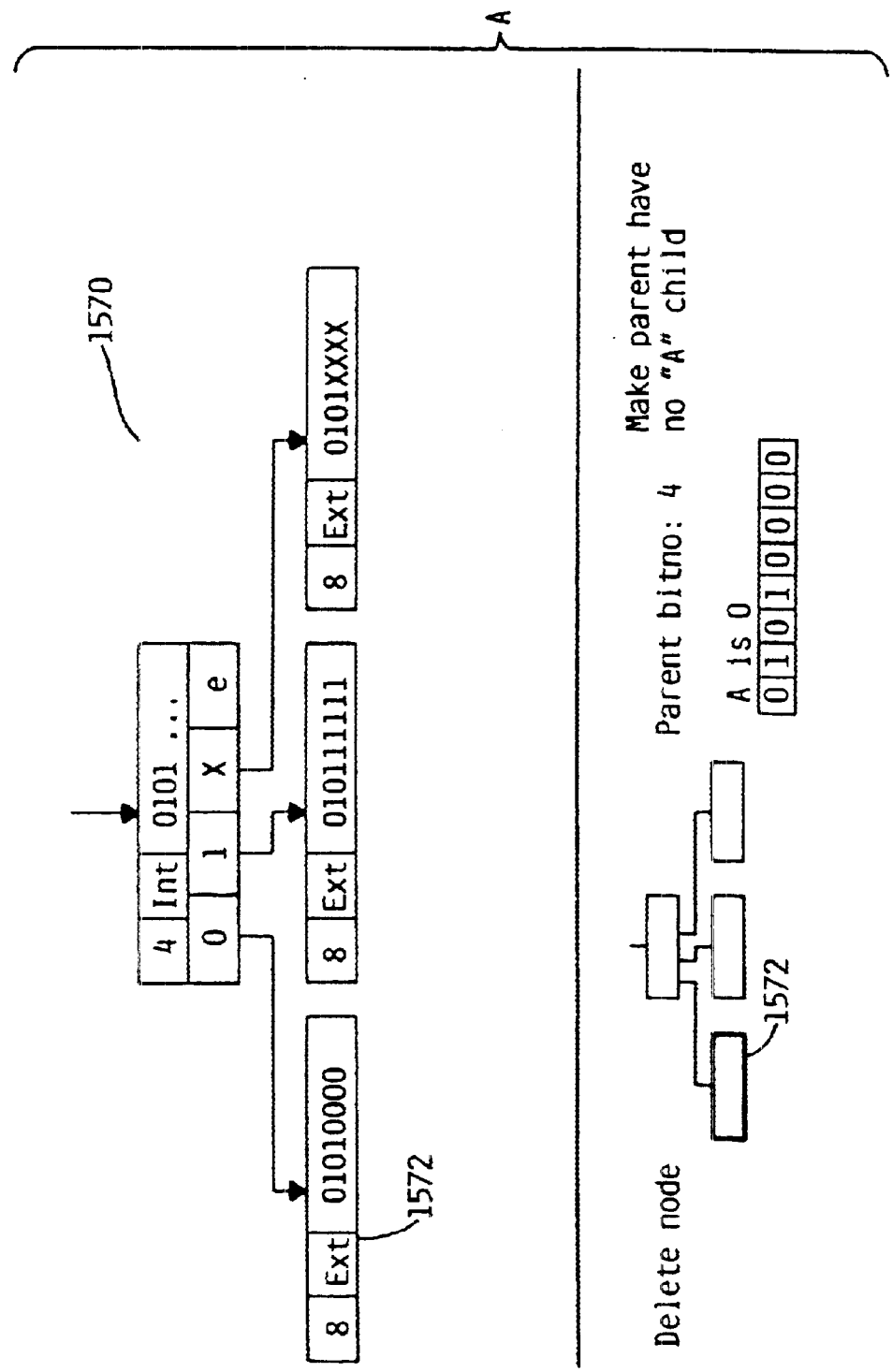
FIG. 35 is an example of a method of removing data from the modified Patricia Tree of FIG. 1 with wildcard and epsilon children, wherein the node is not the root of the tree, the node is not a sibling of a previous node, the node does not have a sibling, and the parent node has multiple remaining children.
Figure 35B:
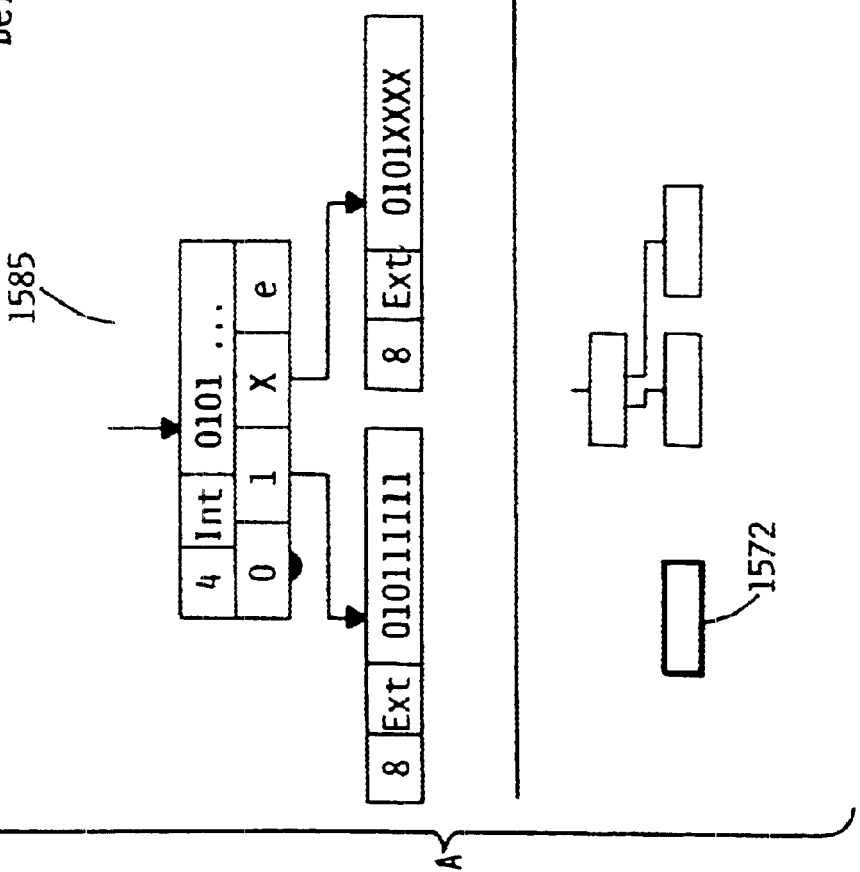

FIG. 35 is another example of removing an external node from a tree. The node set for removal is an external node 1572 with no siblings. An illustration of the tree prior to any modifications is shown at 1570, and the tree following deletion of external node 1572 is shown at 1585. It is determined that the external node 1572 is not the root of the tree and is not a sibling of a previous node. The parent node bit position of ternary bits of the external node key string is skipped, the next ternary bit value is extracted and remembered as "A", which in this example is "0". Since the node 1572 does not have a sibling, the parent is made to have no "A" child. In addition, since the parent has more than one child remaining after the marked deletion, the external node 1572 is then marked as read-copy invalid, and the external node reference count is decreased preparing the external node 1572 for removal and destruction.

Figure 36A:
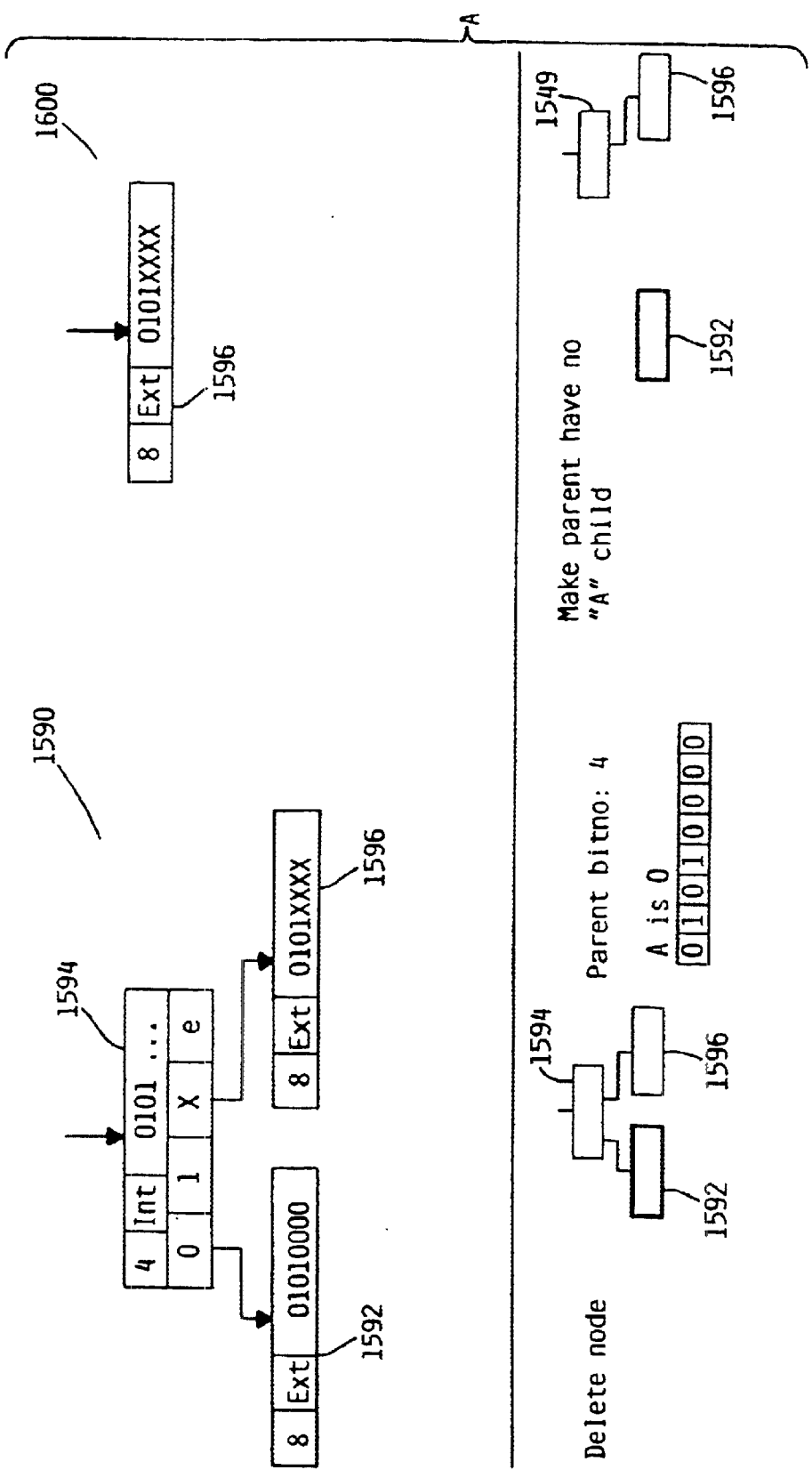
FIG. 36 is an example of a method of removing data from the modified Patricia Tree of FIG. 1 with wildcard and epsilon children, wherein the node is not the root of the tree, the node is not a sibling of a previous node, the node does not have a sibling, the parent node has a single remaining child and the parent node is the root of the tree.
Figure 36B:
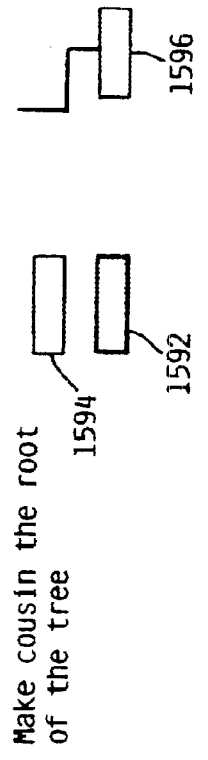

FIG. 36 is another example of removing an external node from a tree. The node set for removal is an external node 1592 with no siblings. An illustration of the tree prior to any modifications is shown at 1590, and the tree following deletion of external node 1592 is shown at 1600. It is determined that the node 1592 is not the root of the tree, not a sibling of a previous node, and the node does not have a sibling of its own. The parent node bit position of ternary bits of the external node key string is skipped, the next ternary bit value is extracted and remembered as "A", which in this example is "0". Since the node 1592 does not have a sibling, the parent is made to have no "A" child. In addition, since the parent 1594 has exactly one child 1596, this child is remembered as a cousin node 1596. The parent node 1594 is then also scheduled for destruction as there is only one node remaining to descend from the parent node, and the cousin node 1596 is made the root of the tree through an atomic action. The external node 1592 and the parent node 1594 are marked as read-copy invalid, and the external node reference count is decreased preparing the external and parent nodes 1592 and 1594, respectively, for removal and destruction.

Figure 37A:
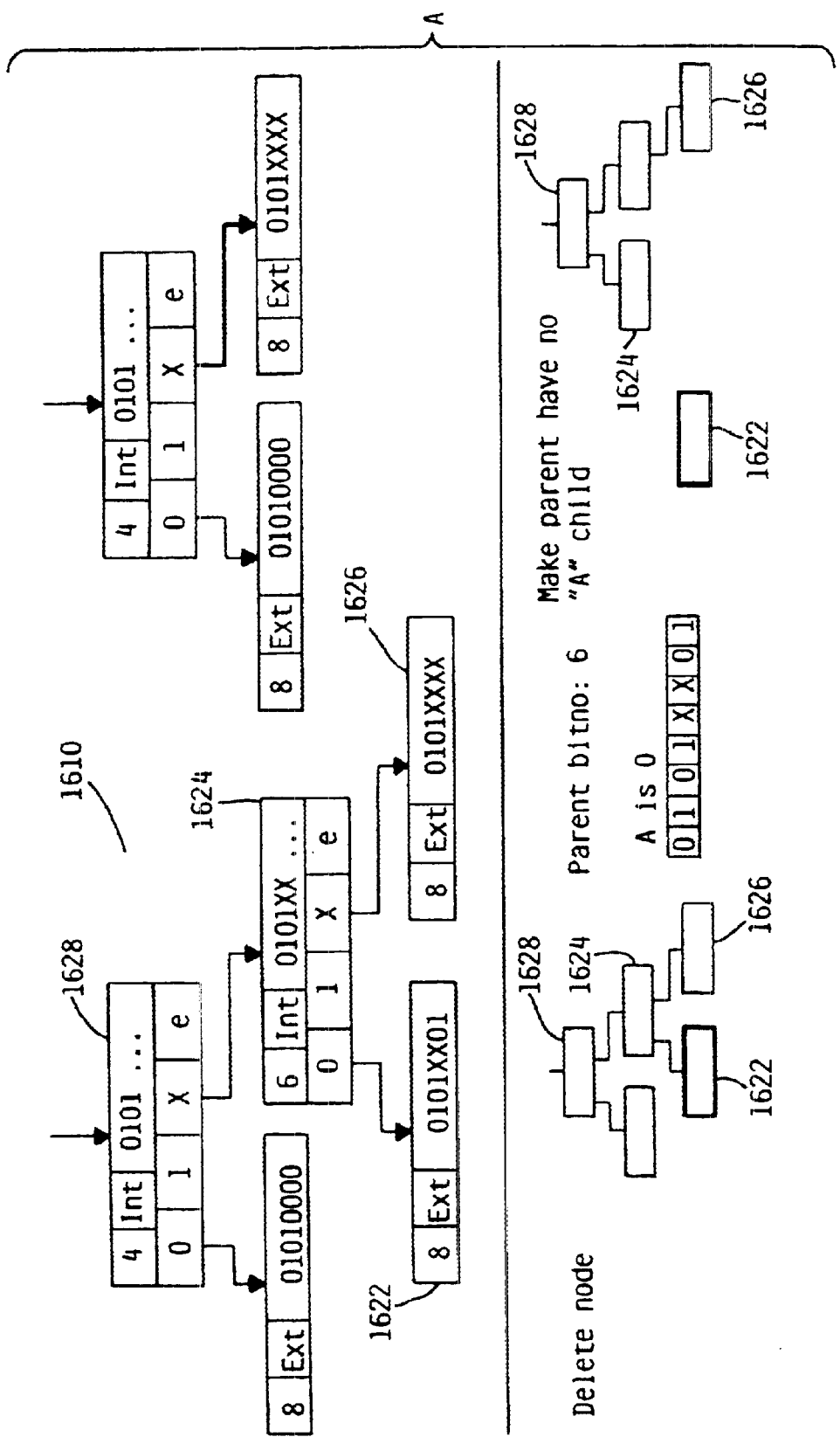
FIG. 37 is an example of a method of removing data from the modified Patricia Tree of FIG. 1 with wildcard and epsilon children, wherein the node is not the root of the tree, the node is not a sibling of a previous node, the node does not have a sibling, the parent node has a single remaining child, and the parent node is not the root of the tree.
Figure 37B:
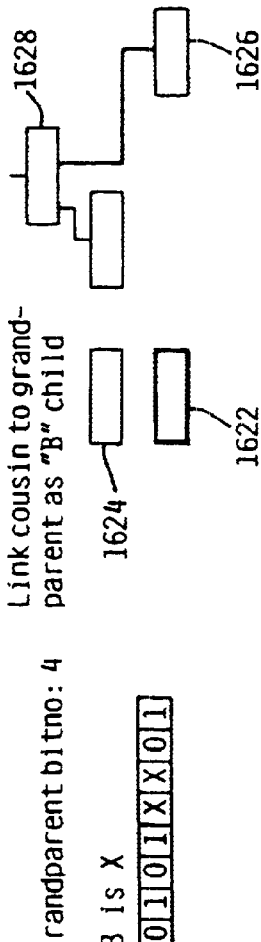

FIG. 37 is another example of removing an external node from a tree. The node set for removal is an external node 1622 with no siblings. An illustration of the tree prior to any modifications is shown at 1610, and the tree following deletion of the external node 1622 is shown at 1620. It is determined that the external node 1622 is not the root of the tree, not a sibling of a previous node, and does not have a sibling of its own. The parent node bit position of ternary bits of the external node key string is skipped, the next ternary bit value is extracted and remembered as "A", which in this example is 0. Since the node 1622 does not have a sibling, the parent is made to have no "A" child. In addition, since the parent node 1624 has exactly one child, this child is remembered as a cousin node 1626. Since the parent is not the root of the tree and there is a cousin node 1626 as the only child of that parent node 1624, the grandparent node bit position of ternary bits of the external node key string, i.e. four, is skipped and the next ternary bit is extracted and remembered as "B". The cousin node 1624 is then linked to the grandparent node 1628 as a "B" child through an atomic action. Both external node 1622 and internal node 1624 are then removed. External node 1622 was removed as this was the intended action, and internal node 1624 was removed to maintain the proper tree structure as it is a requirement that each internal node provide at least two of four way branching, which ceased to be the case when the external node 1622 was removed. Accordingly, in the present example, the external node 1622 and the internal node 1624 are marked as read-copy invalid, and the external node reference count is decreased preparing the external and internal nodes 1622 and 1624, respectively, for removal and destruction.

Advantages over the Prior Art

The purpose of the modified data structure is to build efficient and enhanced routing tables to manage electronic transfer of messages. The invention utilizes a read-copy update technique within the searching algorithms of the data structure. This technique generally uses a small set of atomic operations, i.e. indivisible actions or operations that occurs in an indivisible time increment, to ensure that the users reading the tables do not look at a corrupt or inconsistent version of the data structure.

In general, the read-copy update technique ensures that the readers are searching an accurate table and that writers are not modifying routes that may be currently in use. A data structure is only safe for use and/or modification during short time intervals. A reader cannot procrastinate or otherwise release the processor during one of these intervals. In addition, a reader can only follow specific designated links between nodes and can only read designated values once during a safe period. Readers can not retain any links to the data structure once the safe period has ended unless special action are taken during the safe period. A writer must atomically update the designated links and values if any changes are deemed necessary. In general, this requires the writer to make a copy of part of the data structure, fill the copy in completely, and atomically change one link to redirect the overall data structure from the old portion of the data structure to the modified portion of the data structure. However, the process does not permit destruction of the old part of the data structure until all readers have been verified to have finished their respective safe periods and no persistent references are outstanding. Accordingly, the read-copy update technique ensures that there are no active readers accessing the data structure during an update of the data structure.

High performance routing tables obtain optimized performance for searching at the expense of expensive and complex update procedures. This may be appropriate for some router situations, but it is not acceptable for larger server computers with frequently changing table entries for their client computers. Accordingly, the modified Patricia Tree of the preferred embodiment provides stability and potential concurrent use by readers thereby increasing search performance while recognizing that fully optimized search performance must be curtailed so that read-copy procedures may continue to be implemented in an efficient manner.

Alternative Embodiments

In addition to applying the search, insert and delete procedures to routing tables, the wildcard search tables of the preferred embodiment can be applied to related networking tasks. A computer must frequently and quickly check a network address against a list of its own addresses and a list of broadcast addresses using various searching criteria. The search tree and methods of the invention can also be used to accelerate address list search. And in addition to routing tables, the wildcard tables of the preferred embodiment can be used for access controls in network firewalls and NFS mount point export tables where address and ranges of addresses are utilized, and transport-level demultiplexing where the data strings concatenate address, protocol and port/SAP and where each component can be wildcarded independently to support broadcast or universal services. In fact, by applying the wildcard tables of the preferred embodiment to transport-level demultiplexing, increased one step demultiplexing through several layers of the OSI network reference model is permitted. Finally, since the keys are not tied to networking and the symbol alphabet need not be binary, the search and methods of the invention can be applied to fast lookup of many types of structured string data. For example, a table of book ISBN number which use variable length fields to encode language, publisher and per-publisher sequence numbers could have entries for different groupings. In general, wildcard search tables according to this invention may be substituted in place of standard Patricia Trees in any situation where ancillary binary, alphanumeric or other alphabetic data strings may be utilized, including using a text with wildcards within the text and searching fore strings that fill in the wildcard portions and/or otherwise match the missing text.

It will be appreciated that, although specific embodiments of the invention have been described herein for purposes of illustration, various modifications may be made without departing from the spirit and scope of the invention. In particular, the application of the wildcard search tables may be applied to various searching techniques, including alternative binary and/or alpha numeric data strings. Accordingly, the scope of protection of this invention is limited only by the following claims and their equivalents.

I claim:

1. A computer-readable medium having stored thereon a search tree data structure usable for classifying data in a computer system, the search tree comprising:
   a plurality of internal nodes, each internal node including:
   at least two pointer fields corresponding to specific alphabetic values;
   a wildcard pointer field corresponding to all of the alphabetic values;
   an epsilon pointer field corresponding to the end of a data string at a specific length; and
   pointers in at least two of the pointer fields, such that the tree guarantees two of four way branching at each internal node.

2. The search tree data structure of claim 1, wherein the internal nodes point at keys of possible children in the form of arbitrary descendants.

3. The search tree data structure of claim 1, wherein at least some of the pointers points to external nodes.

4. The search tree data structure of claim 3, wherein the external nodes include pointers to siblings.

5. The search tree data stricture of claim 1, wherein the search tree is a quaternary search tree;
   wherein the internal nodes include two alphabetic value pointer fields referencing binary bit values; and
   wherein the search tree guarantees at least two of four way branching at each internal node.

6. A method for classifying data, comprising the steps of:
   creating the search tree data structure of claim 5; and
   traversing the search tree.

7. A method for classifying data, comprising the steps of:
   creating a quaternary search tree data structure comprising a plurality of internal nodes, each internal node including:
   two pointer fields corresponding to bit values;
   a wildcard pointer field corresponding to both bit values;
   an epsilon pointer field corresponding to the end of a data string at a specific length; and
   pointers in at least two of the pointer fields, such that the search tree guarantees two of four way branching at each internal node; and
   traversing the search tree.

8. The method of claim 7, further comprising the step of returning multiple data string matches upon completion of the traversing step.

9. The method of claim 8, wherein the data string matches include partial data string matches.

10. The method of claim 7, wherein the step of traversing includes:
    controlling tightness of data string matches using a flag; and
    searching prefixes and suffixes of a data string using a filter.

11. The method of claim 10, wherein the flag is a best; and wherein the step of traversing selects matches more specific than any other matches.

12. The method of claim 10, wherein the filter is a long filter; and wherein the step of traversing the tree searches for a key data string having a length greater than the search data string.

13. The method of claim 10, wherein the filter is a short filer; and wherein the step of traversing the tree searches for a key data string having a length shorter than the search data string.

14. The method of claim 10, wherein the filter is a not equal filter; and wherein the step of traversing the tree searches for a key data string having a length not equal to the search data string.

15. The method of claim 10, wherein the filter is a long or short filer; and wherein the step of traversing the tree searches for a key data string having a length longer or shorter than search data string.

16. The method of claim 7, further comprising the step of inserting a node into the search tree.

17. The method of claim 16, wherein the step of inserting a node includes the steps of:

creating a new external node with the new key string;

determining an insertion location for the external node; and adding the new external node to the tree while maintaining two of four way branching at each internal node of the search tree and while maintaining consistency of concurrent traversals of the search tree.

18. The method of claim 7, further comprising the step of deleting a node from the search tree.

19. The method of claim 18, wherein the step of deleting a node includes the steps of:

removing the external node from the search tree while maintaining two of four way branching at each internal node of the search tree and while maintaining consistency of concurrent traversals of the search tree; and destroying the removed external node upon completion of all references to it.

20. An article comprising:

a computer-readable signal-bearing medium;

means in the medium for creating a search tree data structure usable for classifying data in a computer system, the search tree comprising a plurality of internal nodes, each internal node including:

at least two pointer fields corresponding to specific alphabetic values;

a wildcard pointer field corresponding to all of the alphabetic values;

an epsilon pointer field corresponding to the end of a data string at a specific length, and pointers in at least two of the pointer fields, such that the tree guarantees two of four way branching at each internal node; and means in the medium for traversing the tree of the data structure.

21. The article of claim 20, further comprising means in the medium for returning data string matches upon completion of the traversal of the tree.

22. The article of claim 21, wherein the data string matches are returned to a transmission routing device.

23. The article of claim 20, wherein the medium is a recordable data storage medium.

24. The article of claim 20, wherein the medium is a modulated carrier signal.

25. A computer system having a computer-readable medium comprising:

a quaternary search tree data structure comprising a plurality of internal nodes, each internal node including:

at least two pointer fields corresponding to specific alphabetic values;

a wildcard pointer field corresponding to all of the alphabetic values;

an epsilon pointer field corresponding to the end of a data string at a specific length; and pointers in at least two of the pointer fields, such that the search tree guarantees two way branching at each internal node; and tree traversal logic responsive to a search data string and to the search tree; and tree modification logic responsive to a modify data string and to the search tree.

26. The system of claim 25, father comprising a search flag; wherein the tree traversal logic controls the tightness of a match between the search data string and a node data string in response to the search flag.

27. The system of claim 26, wherein the flag is selected from the group consisting of matching all bit values; matching only exact bit values;

matching the best from a list of values; and combinations thereof.

28. The system of claim 25, further comprising a search filter;

wherein the tree traversal logic searches prefix and suffix data string in response to the search filter.

29. The system of claim 28, wherein the search filter is selected from the group consisting of: data of equal length to the search data string; data strings having a length greater than the search data string; data strings having a length shorter than the search data string; data strings having a length not equal to the search data string; and data strings shorts or longer than the search data strings.

30. The system of claim 25, further comprising:

a search flag; and a search filter;

wherein the tree traversal logic controls the tightness of a match between the search data string and a node data string in response to the search flags; and wherein the tree traversal logic searches prefix and suffix data of the data string in response to the search filter.

31. The system of claim 25, further including a routing device, response to data string matches returned by the tree traversal logic, for routing data transmissions between telecommunication nodes represented by the data string matches.

* * * * *